(12) United States Patent
BiFulco

(10) Patent No.: US 8,307,762 B1
(45) Date of Patent: Nov. 13, 2012

(54) MEAT CUTTING ASSEMBLY

(76) Inventor: Phil BiFulco, Parkland, FL (US)

( * ) Notice: Subject to any disclaimer, the term of this patent is extended or adjusted under 35 U.S.C. 154(b) by 780 days.

(21) Appl. No.: 12/321,323

(22) Filed: Jan. 20, 2009

(51) Int. Cl.
*A22C 18/00* (2006.01)

(52) U.S. Cl. .......................................... 99/537; 452/160

(58) Field of Classification Search .................... 99/537, 99/538; 452/141–145, 127, 129, 153, 160
See application file for complete search history.

(56) References Cited

U.S. PATENT DOCUMENTS

| | | | | |
|---|---|---|---|---|
| 1,941,118 A | * | 12/1933 | Thompson et al. | 452/123 |
| 1,942,500 A | * | 1/1934 | Spang | 452/142 |
| 2,051,207 A | | 8/1936 | Ferry | |
| 2,118,119 A | * | 5/1938 | Spang | 83/69 |
| 2,149,407 A | * | 3/1939 | Spang | 452/143 |
| 2,380,371 A | * | 7/1945 | Spang | 452/142 |
| 2,492,997 A | * | 1/1950 | Herceg | 452/143 |
| 3,222,712 A | | 12/1965 | Deckert | |
| 3,222,713 A | | 12/1965 | Stein et al. | |
| 3,556,185 A | * | 1/1971 | Lykkeberg | 83/418 |
| 3,716,893 A | * | 2/1973 | Vogelsang | 452/142 |
| 3,786,536 A | | 1/1974 | Deckert | |
| 7,682,227 B1 | | 3/2010 | Bifulco | |
| 2005/0034581 A1 | * | 2/2005 | Bortone et al. | 83/469 |

* cited by examiner

*Primary Examiner* — Vishu K. Mendiratta
(74) *Attorney, Agent, or Firm* — Malloy & Malloy, P.L.

(57) ABSTRACT

A cutting assembly for cutting a meat or food product passing along a path of travel and comprising a blade assembly including a cutting roller having a plurality of cutting blades radially mounted thereon and movable relative to the path of travel. A mating assembly interacts with the plurality of cutting blades to accomplish a multipoint cutting procedure which is facilitated by the concurrent rotation of the cutting roller and cutting blades as well as a linear reciprocal travel thereof transverse to the path of travel. A stabilizing assembly is provided to restrict the dimensional variance of the spacing between the cutting roller and mate roller through which the meat product travels and an ejecting assembly to remove cut portions from between the cutting blades and back onto the path of travel. The cutting assembly preferably includes a modular construction disposal within and removal from an operative position along a processing line associated with the path of travel.

20 Claims, 39 Drawing Sheets

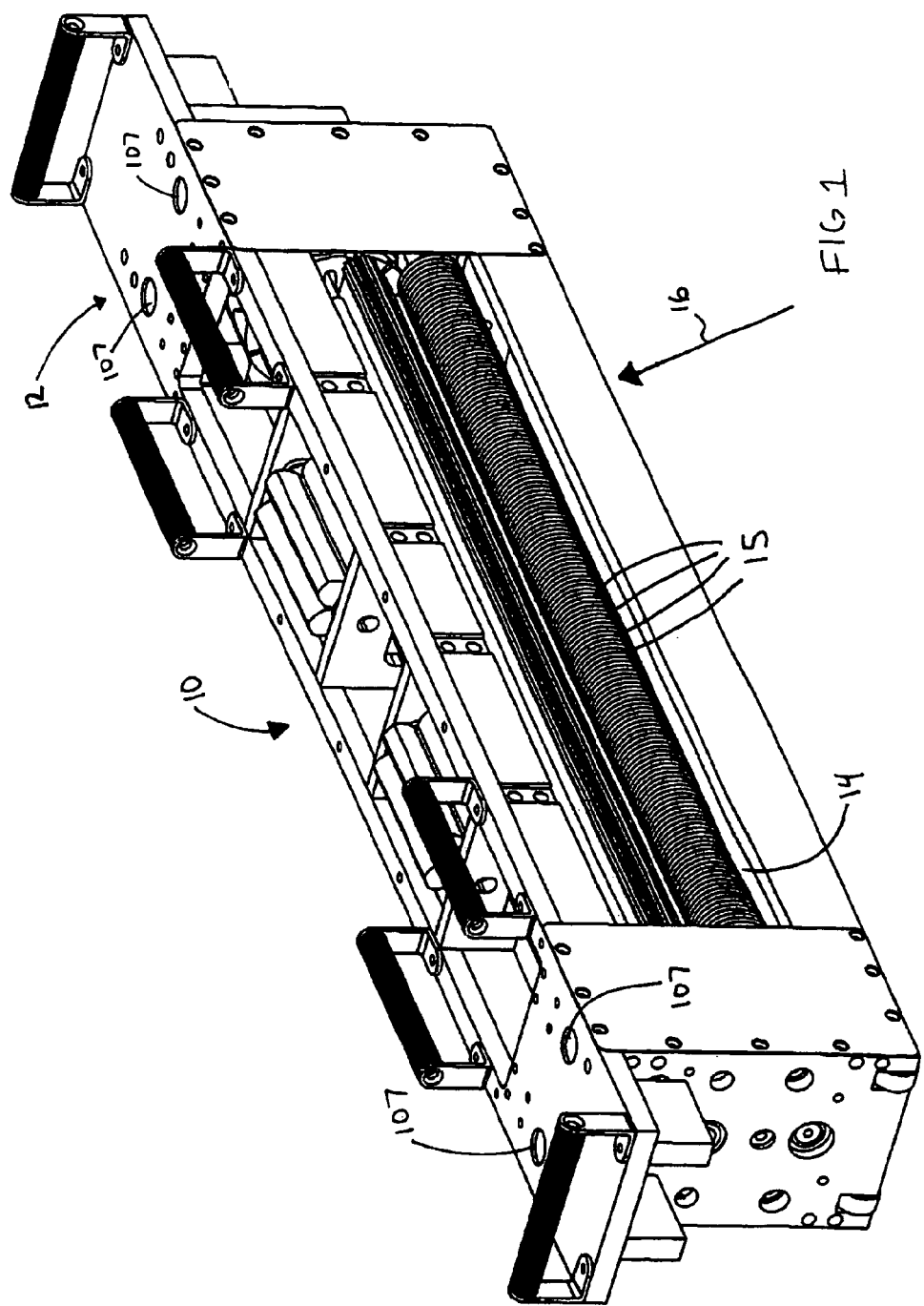

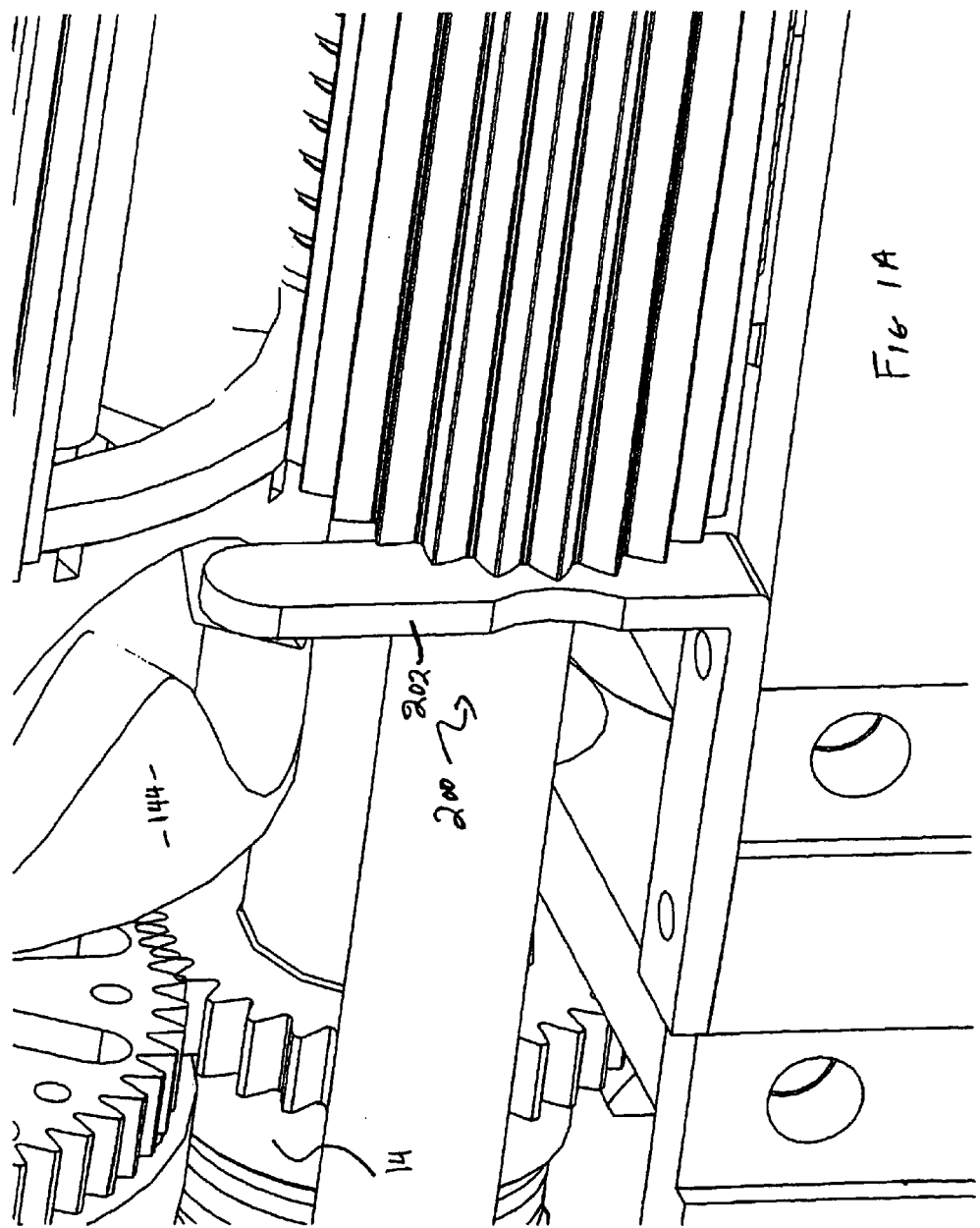

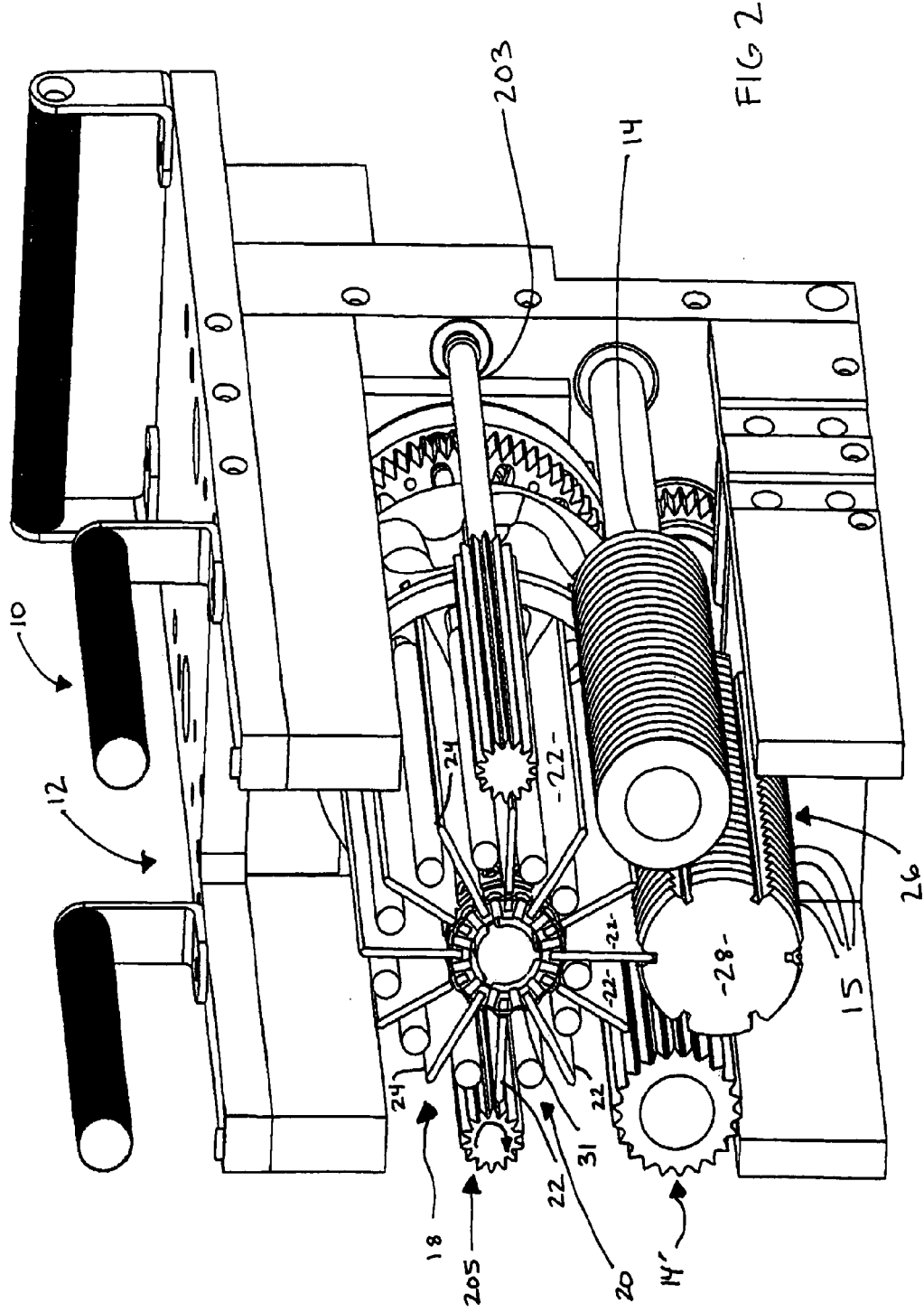

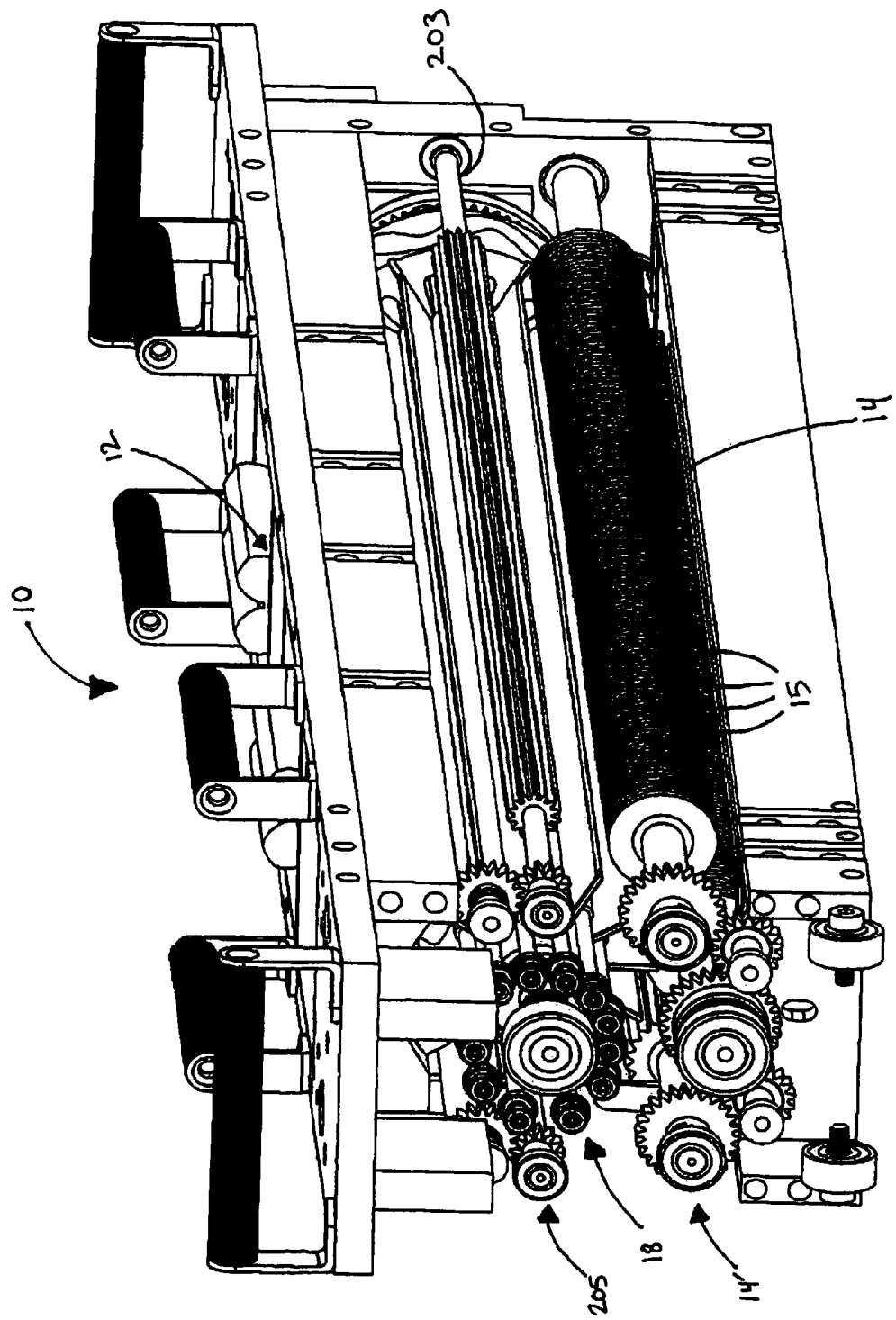

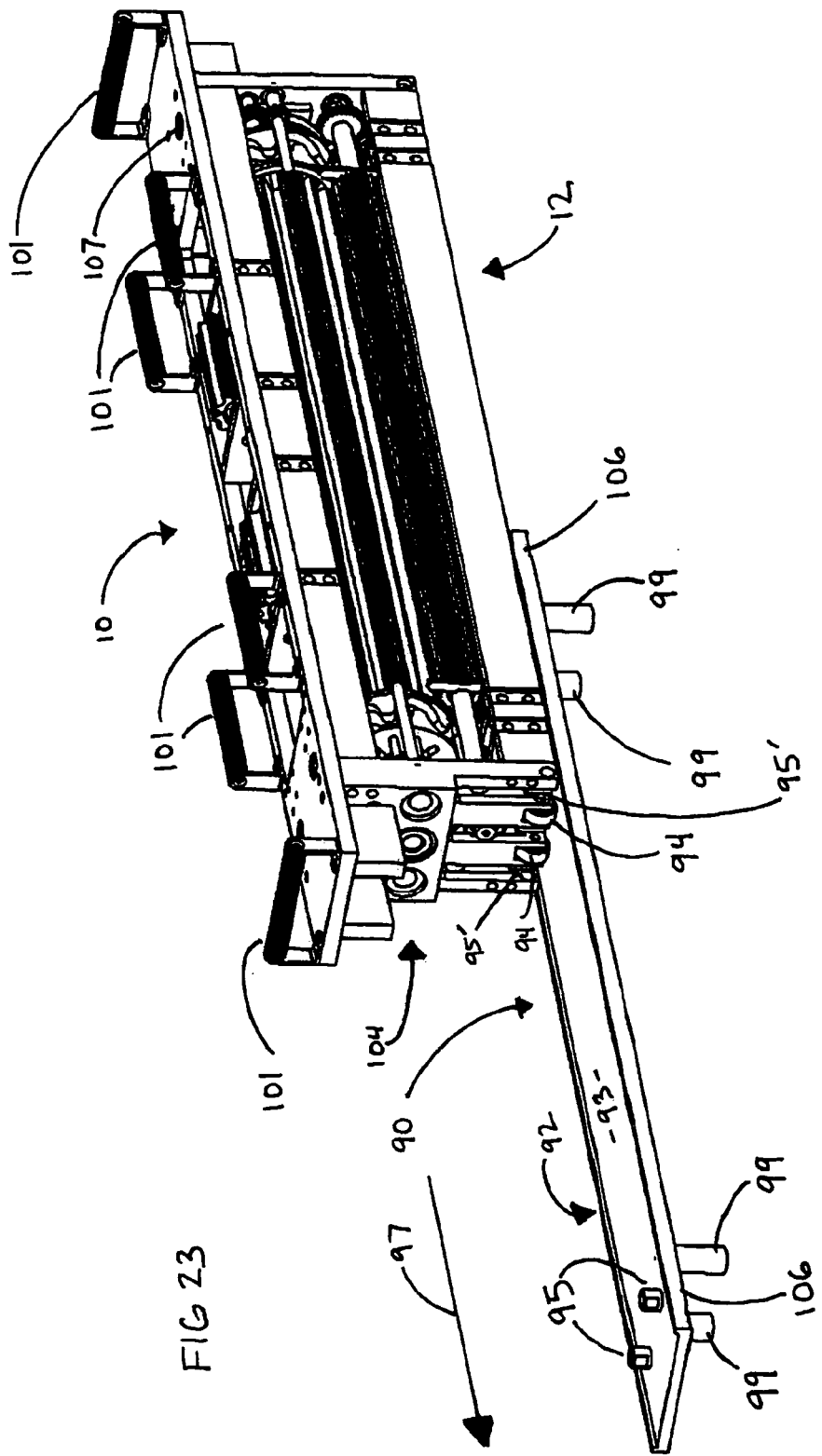

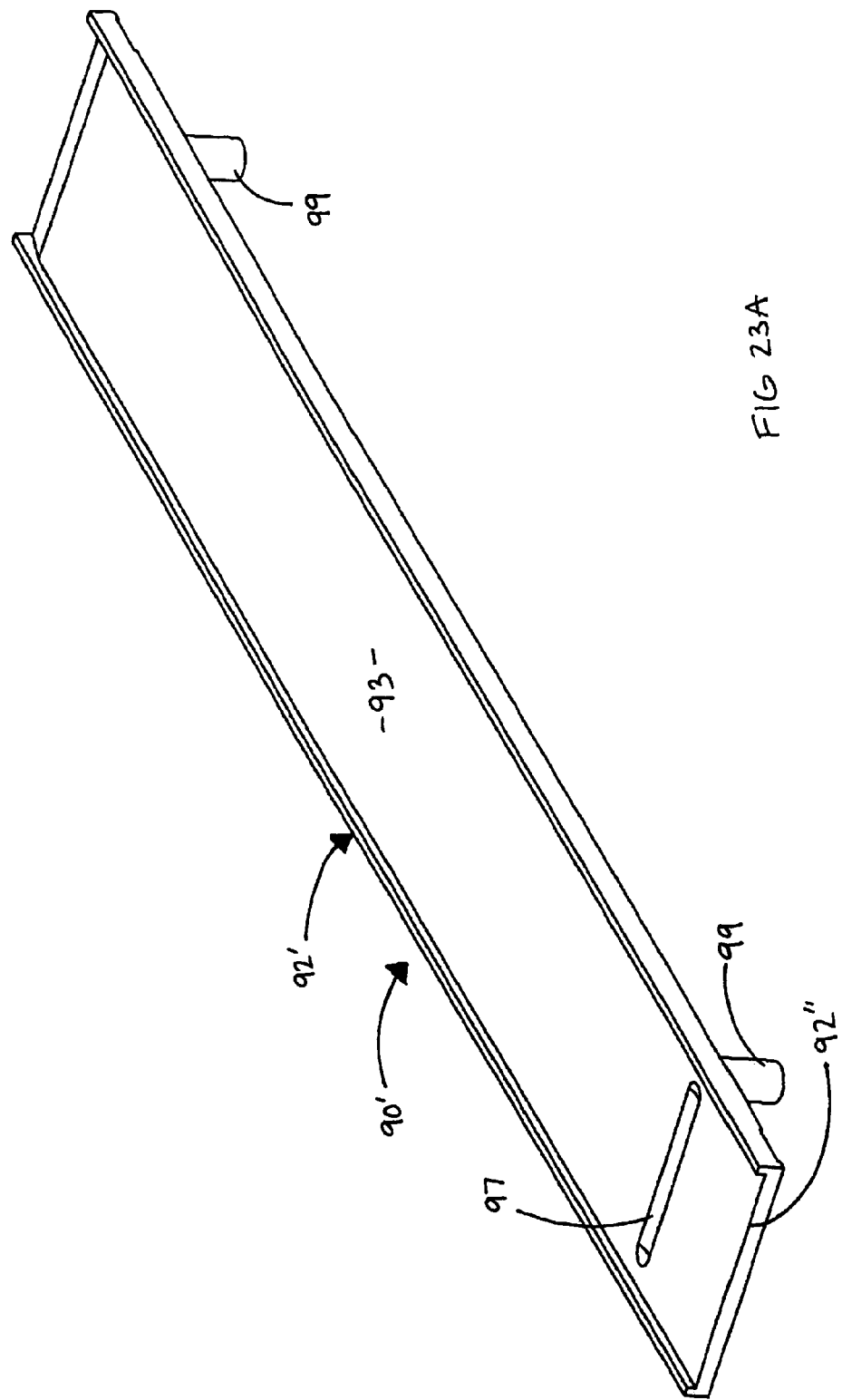

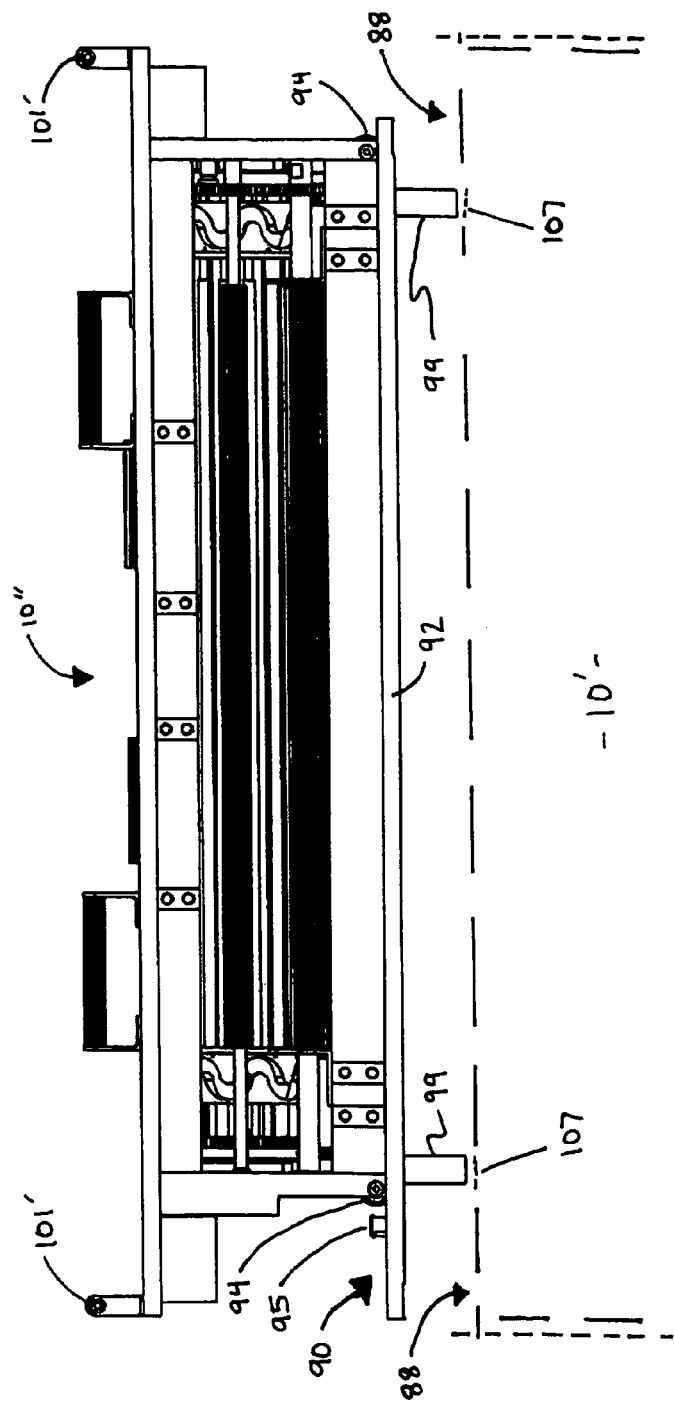

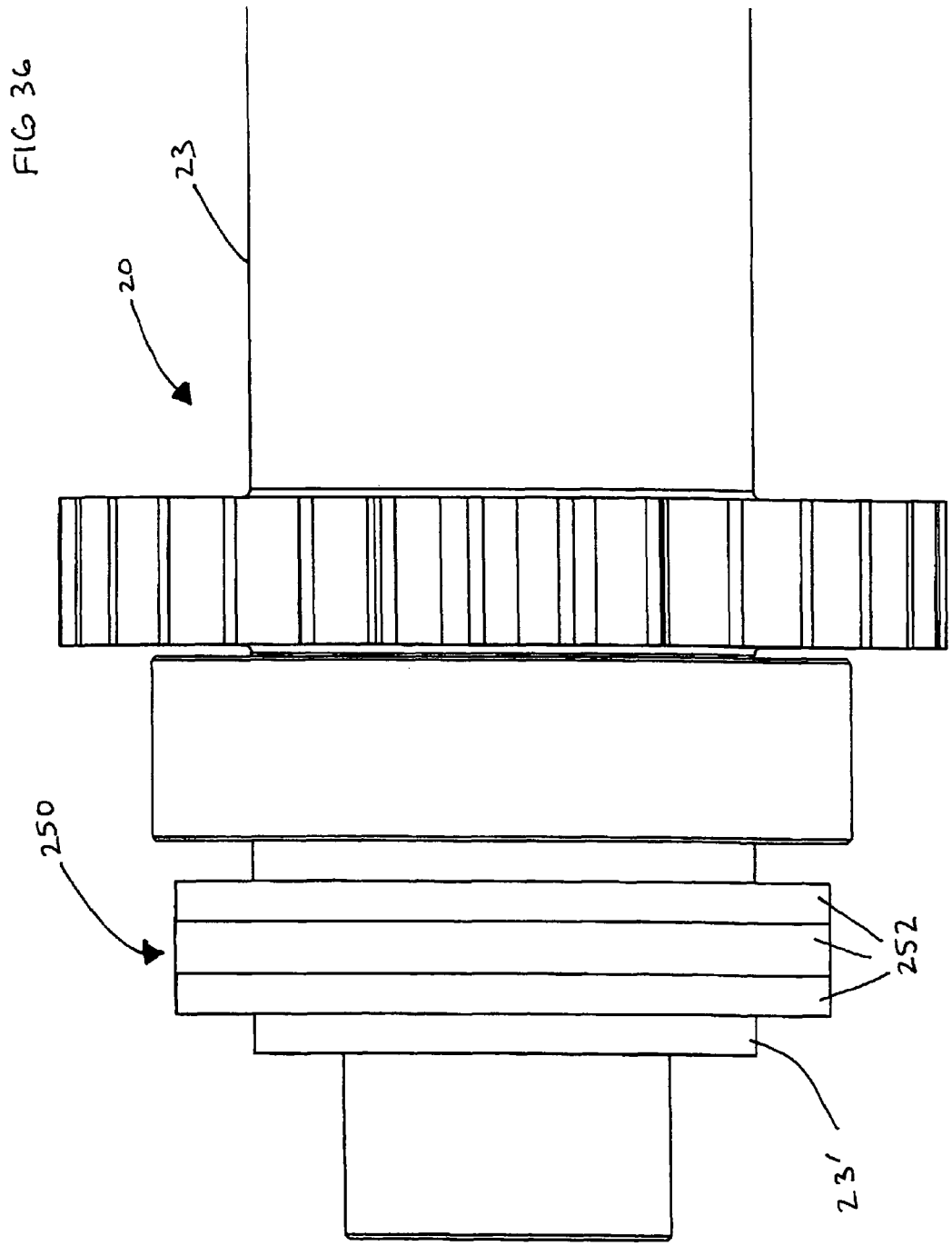

MEAT CUTTING ASSEMBLY

BACKGROUND OF THE INVENTION

1. Field of the Invention

This invention relates to a cutting assembly for meat or other appropriate food products passing along a path of travel and comprises a modular cutting unit capable of being added to or removed from a processing line. The modular cutting assembly includes a blade assembly and a mating assembly which interact to perform a multipoint cutting procedure as the product passes along the path of travel and through a predetermined spacing between the blade and mating assemblies. A stabilizing assembly is structured to restrict displacement of the blade and mating assemblies relative to one another and an extracting assembly removes cut portions from between the cutting blades of the blade assembly once the cutting procedure has been completed.

2. Description of the Related Art

For many years, the food industry has relied on manual cutting for the cutting and other processing of meat products, wherein a larger piece of meat was reduced to smaller pieces of various sizes and configurations, dependent at least in part on the intended use of such reduced meat portions. However, it is well recognized that the manual cutting and processing of meat products is time consuming, labor intensive and lacks consistency in the size, shape, etc. of the final product.

Such inconsistencies are particularly common to smaller pieces or chunks of meat products when cut from a larger meat portion, wherein the smaller, typically cube-like pieces are used for different applications. Despite the recognized skill, an experience many butchers and like processing personnel demonstrate, there is still an overall lack of consistency in terms of size, weight, and other desirable characteristics of the smaller meat piece product. In addition to the disadvantages and problems as generally set forth above, processing personnel and butchers utilizing manual cutting techniques necessarily handle the food product extensively. These procedures frequently result in inherent sanitation problems and at least some dangers to the processing personnel.

In order to overcome problems of the type set forth above, attempts have been made to create automated cutting and/or meat/food processing systems which are structured to perform cutting and a variety of other processing features. While at least some of these automatic machines and/or systems are considered to be at least minimally operative for their intended purpose, consistency problems still exist in terms of the size, weight, shape, cut characteristics, etc. of the final product. Included in the aforementioned problems associated with known automated machines is the general inability to cut through heavy gristle and/or like muscle membrane. This inability frequently results in the processed pieces or portions still remaining attached by virtue of the failure to cut completely through existing gristle. Accordingly, many of the disadvantages associated with manual processing have been alleviated by such known automated processing equipment. However, problems still remain relating to the efficiency and reliability at which conventional automatic equipment performs as well as the consistency of the final product.

Therefore, there is a long recognized need in the food processing industry and more specifically in the area of meat cutting and processing for an efficient and effective automated processing assembly. Such an improved cutting assembly should be capable of accurately cutting meat into the desired shapes and sizes on a consistent basis while eliminating the above noted disadvantages associated with manual labor. Further, an improved and proposed cutting assembly should be structured so as to reliably and efficiently cut through heavy gristle, muscle membrane, etc., thereby eliminating any inconsistency problems and/or disadvantages commonly associated with known or conventional automatic cutting assemblies. Further, such an improved and proposed meat cutting assembly should be capable of timely processing large quantities of meat and other appropriate food products such as by passing the product along a defined path of travel. The versatility of such an improved cutting assembly would allow it to be an operative component of a more extensive processing line, where other processing steps may be performed on the product.

In addition, a preferred and proposed meat cutting assembly could be automated while being constructed into a modular unit efficiently disposable into and out of an operative position along the aforementioned path of travel, as a part of a processing line of other operative components. The modular meat cutting assembly as proposed and improved should include various self-contained operative features including a stabilizing assembly interconnected to various operative components of the modular cutting assembly so as to maintain accurate cutting of the food product being processed. In addition, such a preferred and proposed modular cutting assembly should be capable of accomplishing a preferred multipoint cutting procedure in order to facilitate an accurate cut and consistency in the cut meat product.

Finally, such a proposed and improved meat cutting assembly should include an overall design and structure which enables a continued functioning of the cutting assembly even under relatively harsh operating conditions.

SUMMARY OF THE INVENTION

The present invention is directed to an assembly for cutting meat or other appropriate food products while such products pass along a predetermined path of travel, during which other processing steps may be performed. As such, at least one preferred embodiment of the cutting assembly of the present invention comprises a substantially modular construction which facilitates it being efficiently disposed in and removed from a predetermined operative position along a processing line, which also defines the path of travel. The various components of the cutting assembly at least partially define the path of travel in that meat products being cut pass continuously through the cutting assembly and may be further processed by other portions of the processing line disposed upstream or downstream of the cutting assembly.

Accordingly, the cutting assembly of the present invention includes a blade assembly comprising a plurality of cutting blades extending radially outward from the cutting roller preferably in an equally or other predetermined spaced relation to one another. The cutting blades and cutting roller extend transverse to the path of travel and have a sufficiently elongated configuration to extend along at least a majority of the entire width of the path of travel. As will be set forth in greater detail hereinafter, a primary drive assembly is connected in driving relation to the blade assembly and is disposed and structured to cause its rotation. In addition, a secondary drive assembly is also operatively connected to the cutting roller and structured to impart a linear, reciprocal motion to the cutting blades, transverse to the path of travel, and concurrent to the rotation of the cutting roller. Accordingly, as the cutting roller and the plurality of cutting blades connected thereto rotate they also simultaneously reciprocate in a linear direction in order to impart a "slicing" action on the meat or food product being processed.

An in-feed assembly, preferably comprising an in-feed roller, is disposed in receiving relation to the meat product passing along the path of travel and is disposed and structured to deliver or feed the meat product to the cutting roller and the cutting blades associated therewith. As such, the cutting roller and the in-feed roller concurrently engage the meat product forcing into the modular cutting assembly while performing at least a first of a multipoint cutting procedure, which will be described in greater detail hereinafter. In addition to the above, a mating assembly is movably disposed along the path of travel in receiving relation to the meat product, which has been forced along the path of travel, at least in part, due to the penetrating engagement of the cutting blades and concurrent engagement with the rotating in-feed roller. The mating assembly includes a mate roller which is disposed in direct interactive relation to each of the plurality of cutting blades associated with the cutting roller. As briefly set forth above, one feature of the meat cutting assembly of the present invention is the cutting of the meat product into portions having a predetermined size and/or configuration utilizing a multipoint cutting procedure. Therefore, the mate roller of the mating assembly is disposed and configured to receive and interact with the plurality of cutting blades thereby continuing the multipoint cutting procedure on the meat product as it passes between the mate roller and the cutting roller.

Additional structural features specifically relating to the mate roller is the provision of a plurality of transversely oriented, elongated mate slots extending along at least a majority of the length of the mate roller and substantially corresponding to the lengths of the cutting blades. Each of the mate slots of the mate roller are disposed, dimensioned and configured to receive and interact with a correspondingly disposed cutting blade during concurrent and synchronized rotation of the cutting roller and mate roller. More specifically, the overall structure of the mate slots as well as their mating reception correspondingly oriented ones of the plurality of cutting blades, serve to position the mate slots and cutting blades into corresponding cutting orientations. In turn, such corresponding cutting orientations facilitate an efficient and effective performance of the aforementioned multipoint cutting procedure of the meat. Further, the cooperative operation and structuring of the cutting blades and the mating slots accomplish the multipoint cutting procedure without derogatorily affecting the structure and operation, specifically including the sharpness, of the cutting blades.

As described, primary and secondary drive assemblies are cooperatively structured to impart a concurrent rotational and reciprocal motion to the cutting roller and the plurality of cutting blades associated therewith. Accordingly, exterior surface portions of both the in-feed roller and the mate roller are structured to restrict lateral displacement of the meat as it is acted upon by the reciprocating cutting blades. More specifically, due to the continuous reciprocal motion of the cutting blades and the resulting slicing action on the meat product, there is a tendency of the meat product to be laterally displaced relative to the outer surfaces of the in-feed roller and/or mate roller. Such lateral displacement is substantially overcome by structuring at least a portion of the outer surfaces of both the in-feed roller and mate roller to include a plurality of elongated grooves extending in a direction corresponding to the direction of the path of travel and transverse to the reciprocating motion of the cutting blades.

As set forth above and in greater detail hereinafter, the cutting roller, as well as the plurality of cutting blades mounted thereon, have an elongated configuration which extends along substantially the entire width of the path of travel. As such, any meat product or other product passing along the path of travel will be engaged by and be subjected to a predetermined cutting procedure such as the aforementioned multipoint cutting procedure. In that the plurality of cutting blades are disposed radially outward on the cutting roller, adjacent pairs of the cutting blades have a substantially diverging relation to one another as they extend outwardly from a base of the cutting roller to an outer most longitudinal end of the cutting blade. Accordingly, during the cutting procedure, each of the plurality of cutting blades successively engages the product passing along the path of travel and performs the aforementioned cutting procedure thereon. However, upon completion of the cutting procedure and due, at least in part to the open divergent spacing between adjacent ones of the cutting blades, cut pieces of the meat will have a tendency to be lodged or retained between adjacent ones of the blades.

However, the intended operation of the processing line, with which the cutting assembly of the present invention is associated requires the meat product, once being cut, be continuously passed along the path of travel, beyond the meat cutting assembly of the present invention for further processing and eventual removal from the path of travel such as for packaging, dispensing, etc.

Accordingly an additional structural and operative feature of the meat cutting assembly of the present invention includes the provision of an ejecting assembly preferably comprising a plurality of ejecting members rotationally movable with the cutting roller and concurrently movable into and out of an ejecting orientation relative to the plurality of cutting blades. More specifically, the plurality of ejecting members are disposed between adjacent ones of the plurality of cutting blades and are positionable into and out of the ejecting orientation as they rotate with the cutting roller along predetermined portions of the path of travel. Moreover, each of the plurality of ejecting members is reciprocally positioned between a different adjacent pair of the plurality of cutting blades. As such, the ejecting members are reciprocally disposable between a retracted position and an outwardly extended position between the corresponding adjacent pairs of cutting blades. Further, the ejecting orientation of each of the plurality of ejecting members corresponds to the outwardly extended position thereof relative to the corresponding adjacent pairs of cutting blades.

Therefore, when in the outwardly extended, ejecting orientation, each of the ejecting members is disposed substantially adjacent the outer ends or outer, elongated cutting edges of adjacent pairs of cutting blades. The ejecting orientation of the ejecting members will thereby force any cut meat portion to be forced outwardly from between the adjacent cutting blades and back onto the path of travel, for further processing. Accordingly, the plurality of ejecting members are reciprocally movable in a radial direction on the cutting roller, while concurrently rotating therewith as the cutting roller and cutting blades perform the preferred multipoint cutting procedure, as set forth above.

In order to perform such a concurrent reciprocal and rotational movement of the plurality of ejecting members, the ejecting assembly includes both a guide assembly and an ejecting drive assembly. More specifically, the guide assembly is fixedly disposed relative to the cutting roller and configured to force the plurality of ejecting members reciprocally between the extended position and retracted position, wherein the extended position corresponds to the ejecting orientation. In at least one preferred embodiment, the guide assembly includes a guide track fixedly mounted on the frame or housing of the modular cutting assembly and is thereby fixed relative to the rotation of the cutting roller. Further each of the plurality of ejecting members are movably connected to the guide track and structured to travel along the continuous length of the thereof concurrent to the rotation of the cutting roller.

The aforementioned ejecting drive assembly is connected to the cutting roller and rotatable therewith while being concurrently connected in driving relation to the plurality of ejecting members. Moreover, upon rotation of the cutting roller, the plurality of ejecting members are rotationally driven by the cutting roller and thereby concurrently forced to travel along the continuous length of the guide assembly or guide track. In addition, the guide track includes a continuous, predetermined eccentric configuration which determines when each of the plurality of ejecting members are in the retracted position or outwardly extended, ejecting orientation. Further, the disposition and eccentric configuration of the guide track corresponds to the location along the path of travel where it is determined that the previously cut and currently lodged meat pieces must be ejected from between the blades and disposed back onto the path of travel so as to continue along the processing line as intended.

Yet another structural and operative feature of at least one preferred embodiment of the cutting assembly of the present invention is the inclusion of a stabilizing assembly. As set forth above, a cutting of the meat product or other product passing along the path of travel is accomplished utilizing a preferred multipoint cutting procedure. As such, the meat product passes into and through a "predetermined spacing" between the cutting roller and the mate roller. This predetermined spacing is maintained so as to facilitate an accurate interaction of each of the cutting blades with a corresponding one of the mate slots formed in and extending along the outer surface of the mate roller. As the meat passes through the predetermined spacing between the cutting roller and mate roller and is engaged successively by the cutting blades, pressure is exerted on both the mating roller and the cutting roller which has a tendency to enlarge or otherwise alter the dimension of the predetermined spacing. Accordingly the stabilizing assembly of the present invention is disposed in displacement restricting relation to the cutting roller, predetermined ones of the cutting blades as well as the mate roller. Therefore the stabilizing assembly and its various components, to be described in greater detail hereinafter, is disposed and structured to restrict "dimensional variance" of the predetermined spacing at least during the cutting of the meat and passage thereof through the predetermined spacing, which also at least partially defines the path of travel.

In a preferred embodiment, the stabilizing assembly comprises a plurality of stabilizing structures collectively disposed in displacement restricting engagement with both the cutting roller and the mate roller. Further, in at least one preferred embodiment at least one of a plurality of stabilizing structures comprises one or more pressure rollers each having a plurality of pressure slots. The pressure roller(s) is rotationally driven in synchronized relation to the cutting roller such that each of the slots receives a successive one of the plurality of cutting blades and exerts a displacement restricting pressure thereon in order to inhibit the outward flexing or displacement of the cutting roller as the cutting blades engage and perform the multipoint cutting procedure on the meat product passing through the predetermined spacing between the cutting roller and the mate roller.

The stabilizing assembly also includes a support assembly which includes one or more support members disposed in displacement restricting engagement with the mate roller. Further, the stabilizing assembly also includes a first and second stabilizing segments each connected to and rotatable with a different one of the cutting roller and mate roller. These first and second stabilizing segments are disposed in rotational engagement with one another. As such, the combined placement of the first and second stabilizing segments along with the one or more support members engaging the mate roller serve to restrict displacement of either the cutting roller or mate roller relative to the predetermined spacing and path of travel disposed therebetween. In doing so, a predetermined spacing is substantially maintained and the interactive alignment between outer end or cutting edge of each of the cutting blades with corresponding ones of the mate slots on the mate roller is maintained.

In order to increase the versatility of the cutting assembly of the present invention, at least one embodiment thereof comprises a substantially modular construction. As such, the insertion and/or removal of the entire modular cutting unit of the cutting assembly into an operative position along a processing line and path of travel is facilitated. As also set forth herein, the path of travel extends into, through and beyond the modular cutting unit of the cutting assembly of the present invention and extends upstream and downstream of the processing line. As will be apparent, the processing line as referred to herein may comprise a number of assemblies and/or processing equipment intended to perform further processing of the meat or other food product being cut. Such additional processing steps may vary dependent at least in part on the meat or other product being processed and its intended use. Accordingly, the modular cutting unit of the cutting assembly of the present invention may be considered an important, operative component of the processing line. However, the remainder of the components comprising the processing line are not, per se, considered a part of the present invention.

Accordingly, the modular construction of the meat cutting assembly includes a housing or frame disposed in surrounding, containing and/or supporting relation to the various operative components of the modular cutting unit. As such, the frame is fixed and serves as a containing structure for the insertion, removal and overall transport of the entire cutting assembly of the present invention. Therefore, in general terms the various operative components including the blade assembly, in-feed assembly, mating assembly, extraction assembly and stabilizing assembly, are all operatively contained on or within the housing or frame and are therefore considered a part of the modular cutting unit construction of the cutting assembly of this preferred embodiment of the present invention.

In order to facilitate placement in and removal from the intended operative position in the processing line and along the aforementioned path of travel, at least one preferred embodiment of the present invention includes a delivery assembly preferably in the form of a support platform. The support platform facilitates transport and positioning of the modular cutting unit as it is installed within its intended operative position along the path of travel and the rest of the processing line. Such a support platform may have an elongated construction and be generally dimensioned and configured to support the entire modular cutting unit thereon. In addition, the frame of the modular cutting unit includes a wheel assembly including a plurality of wheels, rollers or other structures which facilitates movement and/or intended positioning and orientation of the modular cutting unit on the outer supporting surface of the support platform. When so positioned the modular cutting unit may be efficiently and effectively oriented relative to its operative placement along the processing line and path of travel.

To this end, the frame or housing of the modular cutting unit also includes a handle assembly preferably including a plurality of handles specifically disposed in an accessible location so as to facilitate the carrying or positioning thereof in different orientations, as it is being positioned for placement within and removal from its operative position within the processing line. Further, the handle assembly and the various handle structures associated therewith facilitate the handling by a minimal number of workers, wherein the modular cutting unit may be carried, lifted, supported and/or selectively positioned from either the same side of the processing line or an opposite side thereof.

As set forth above, the cutting roller and the plurality of cutting blades connected thereto are rotationally driven as the collection of cutting blades extend transversely along the width of the path of travel and the direction of the meat products traveling there along. In order to accomplish the preferred multipoint cutting procedure, the cutting roller and plurality of cutting blades are also reciprocally driven in a linear direction transverse to the path of travel, wherein such reciprocal travel of the cutting roller and cutting blades is concurrent to the rotation thereof. In order to effectively accomplish such concurrent rotational and reciprocal motion of the cutting roller and cutting blades, the modular cutting unit of the cutting assembly of the present invention preferably includes the aforementioned primary and secondary drive assemblies cooperatively structured to accomplish such a concurrent cutting motion.

Moreover, the primary drive assembly is connected in driven relation to a power take off which may be typically, but not necessarily, associated with the processing line and/or the preferred modular construction of the meat cutting assembly itself. Further, the primary drive assembly is connected in rotationally driving relation to the cutting roller. In at least one preferred embodiment, the primary drive assembly includes a drive shaft, preferably including an elongated configuration, and interconnected to the cutting roller so as to rotate therewith. Further, an attachment assembly is disposed in interconnecting relation between the drive shaft and the cutting roller and is cooperatively structured to move linearly along a length of the drive shaft concurrent to rotating therewith, along with the cutting roller. The attachment assembly includes at least one but in certain embodiments a plurality of attachment members each rotational with both the drive shaft and the cutting roller and reciprocally movable along the length of the drive shaft. Further, the one or more attachment members are rotationally driven by the drive shaft and concurrently disposed in driving engagement with the cutting roller so as to cause its rotation. Accordingly, the disposition and structure of the attachment assembly facilitates the reciprocal movement of the cutting roller relative to and along a length of the drive shaft concurrent to the rotation of the cutting roller and the drive shaft.

The secondary drive assembly is disposed and structured to accomplish the linearly reciprocal movement of the cutting roller in transverse relation to the path of travel. Moreover, the secondary drive assembly includes a movable portion connected to and rotatable with the cutting roller and a fixed portion fixedly disposed relative to the cutting roller such as, but not limited to, a fixed connection or disposition on the frame of the modular cutting unit. The fixed portion of the secondary drive assembly is disposed in moving, driving engagement with the movable portion thereof concurrent to the rotation of the cutting roller caused by operation of the primary drive assembly, as set forth above.

In at least one preferred embodiment, the movable portion comprises at least one drive track assembly fixedly connected to the cutting roller and thereby being rotatable and reciprocal therewith. In cooperation therewith, the fixed portion of the secondary drive assembly comprises at least one drive member fixedly positioned relative to the cutting roller and disposed to travel along the continuous length of the drive track assembly in driving engagement therewith, concurrent to the rotation of the cutting roller. Furthermore, the drive track assembly preferably comprises a predetermined configuration which is determinative of the linear, reciprocal movement of the cutting roller concurrent to the rotation of the cutting roller. The preferred, predetermined configuration of the drive track assembly is at least partially defined by a substantially continuous sinusoidal configuration. In cooperation therewith, the at least one drive member of the fixed portion is disposed in driving engagement with the drive track assembly and most preferably is at least partially disposed within an elongated, continuous channel which at least partially defines the guide track assembly. Therefore, the fixed portion is at least partially disposed within the elongated, continuous sinusoidal channel and is otherwise structured to pass along the continuous length thereof in driving relation to the cutting roller concurrent to the rotation of the cutting roller.

Therefore, upon forced rotation of the cutting roller, due to operation of the primary drive assembly, the fixed drive member of the secondary drive assembly is disposed in movable, driving engagement with the drive track assembly or channel. As a result the aforementioned preferred sinusoidal configuration of the guide track assembly or channel forces the continuous, linear reciprocal movement of the cutting roller and the cutting blades during rotation of the cutting roller. Accordingly, as each of the cutting blades engages the meat product being cut, there will be both a forwardly penetrating or piercing engagement into the meat product as the plurality of cutting blades rotate with the cutting roller, as well as a simultaneous "slicing" action on the meat product due to the aforementioned linear reciprocal movement of the cutting blades.

Further structural features of the secondary drive assembly include at least one but preferably a plurality of the aforementioned track assemblies fixedly connected to the cutting roller spaced relation to one another, such as at opposite ends thereof. In addition the fixed portion of the secondary drive assembly may include a first plurality of drive members each fixedly connected in spaced relation to one another relative to the cutting roller, wherein each of the first plurality of drive members are disposed in driving engagement with a correspondingly positioned one of the track assembly and/or continuous channel. In addition, a second plurality of drive members are similarly fixed relative to the cutting roller and disposed in driving engagement with the drive track assembly or continuous channel of the other of the preferably two drive track assemblies or continuous channels. Therefore, the first and second plurality of drive track members will exert a substantially evenly distributed driving force causing the aforementioned linear reciprocal movement of cutting roller concurrent to its rotation.

These and other objects, features and advantages of the present invention will become clearer when the drawings as well as the detailed description are taken into consideration.

BRIEF DESCRIPTION OF THE DRAWINGS

For a fuller understanding of the nature of the present invention, reference should be had to the following detailed description taken in connection with the accompanying drawings in which:

FIG. 1 is a perspective view of a preferred embodiment of the meat cutting assembly of the present invention.

FIG. 1A is a detailed view in partial cutaway of additional structural features associated with at least the intake portion of the cutting assembly of the present invention.

FIG. 2 is a perspective view in partially unassembled form of the embodiment of FIG. 1.

FIG. 3 is a perspective view of the embodiment of FIGS. 1 and 2 with exterior frame portions thereof deleted.

FIG. 23 is a perspective view of the embodiments of FIGS. 20 and 21 at least partially mounted on a delivery assembly comprising least one preferred embodiment of the present invention.

FIG. 23A is a perspective view of yet another preferred embodiment associated with a delivery assembly similar to but distinguishable from the embodiments of FIGS. 20, 21 and 23.

FIG. 24A is a side view similar to the embodiment of FIG. 24 wherein the modular cutting unit and delivery assembly are supported in a stacked orientation on an upper portion of another modular cutting unit already installed within the processing line of FIG. 22.

FIG. 36 is a detailed view in partial cutaway of a damping assembly connected to and operatively associated with one or more of the rollers of the cutting assembly of the present invention.

Like reference numerals refer to like parts throughout the several views of the drawings.

DETAILED DESCRIPTION. OF THE PREFERRED EMBODIMENT

Figure 22:
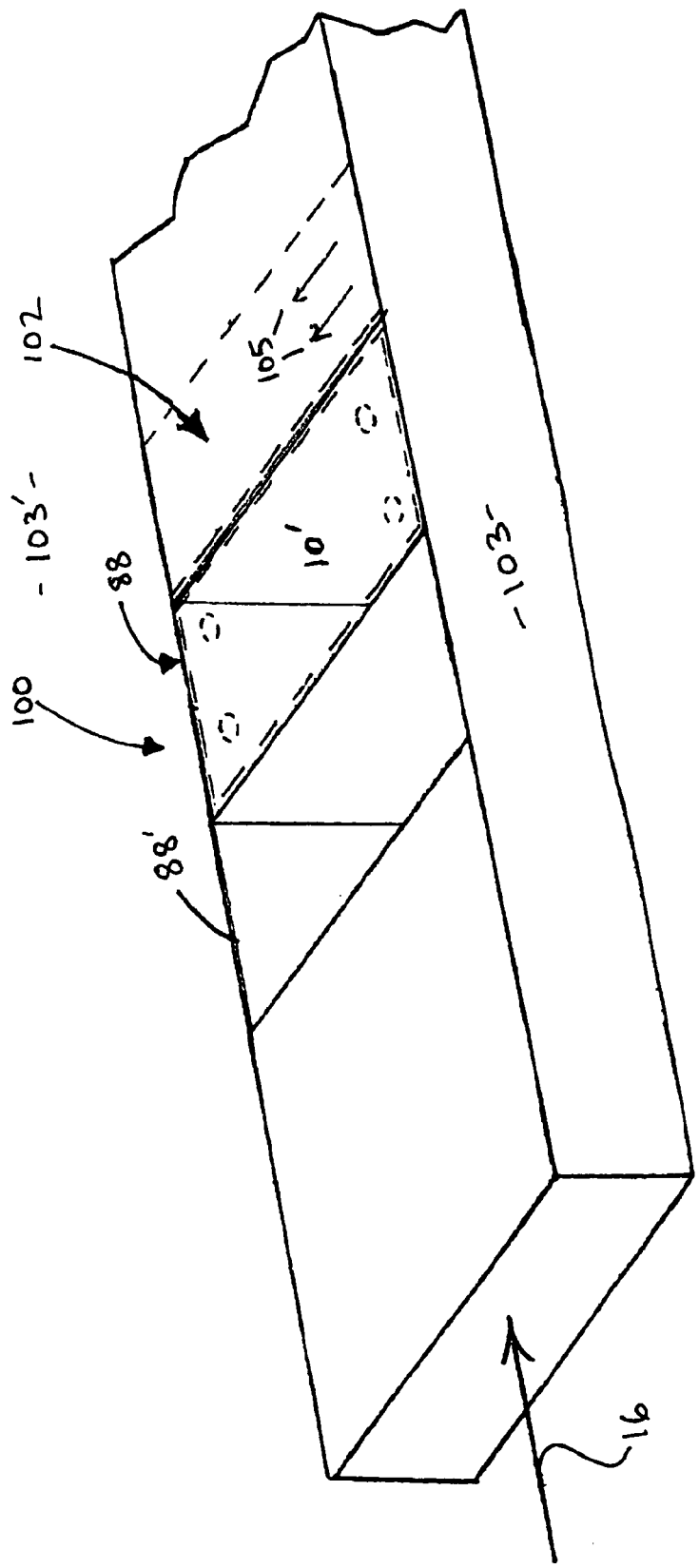
FIG. 22 is a schematic perspective view in partial cutaway of a processing line including an operative position in which a modular cutting unit of the cutting assembly of the present invention may be installed.

As shown in the accompanying drawings, the present invention is directed to a cutting assembly and more specifically a meat cutting assembly generally indicated as 10. In at least one preferred embodiment the meat cutting assembly 10 is constructed into a substantially self-contained modular unit wherein the plurality of operative and structural components associated with the operation of the cutting assembly 10 are housed within, mounted on or otherwise connected to a housing or frame generally indicated as 12. As such, the cutting assembly 10 may be accurately described and referred to herein as a "modular cutting unit". The represented modular construction facilitates the efficient disposition of the modular cutting unit 10 within an operative position 88 of a processing line 100, as schematically represented in FIG. 22 to be described in greater detail hereinafter. In addition, the cutting assembly or modular cutting unit 10 also extends along and at least partially defines a path of travel 16 extending along a remainder of the processing line 100.

However, while a preferred embodiment of the cutting assembly 10 is represented as the aforementioned modular cutting unit, it is emphasized that the operative components of the cutting assembly 10 can be installed and operate within a processing line 100 or other operative environment in an intended fashion without being incorporated in a modular construction. In either application, the represented processing line 100 extends along and at least partially defines the path of travel along which the meat to be cut or otherwise processed travels. Accordingly, the processing line may include a plurality of different cutting and/or processing assemblies intended to interact with the meat product as it passes along the processing line.

Accordingly with primary reference to FIGS. 1-3, the cutting assembly 10 includes an in-feed assembly including an in-feed roller 14 which contacts the incoming meat product traveling along the path of travel schematically represented by directional arrow 16. In addition, the path of travel 16 of the meat product passes through the cutting assembly 10 subsequent to initially engaging the in-feed roller 14. The in-feed roller 14 is disposed in adjacent, communicating and at least partially interactive relation with a blade assembly generally indicated as 18 and comprising a cutting roller 20. The cutting roller 20 includes a plurality of spaced apart radially oriented cutting blades 22. Each of the cutting blades 22 has an inner end connected to a core or base 23 of the cutting roller 20 and extending radially outward therefrom so as to terminate in an outward, longitudinal cutting edge 24 extending along the length of each of the plurality of cutting blades 22. The inlet roller 14 and the cutting roller 20 each have an elongated configuration transversely oriented to the path of travel 16 and extending along substantially the entire width of the path of travel 16 or along at least a majority of the width thereof.

With reference to FIG. 1A, additional structural features associated with the intake or inlet assembly is the provision of at least one, but more practically a plurality of guide or blocking members, generally indicated as 200. The blocking members are generally, but not necessarily, in the form of a blocking or guiding bracket including an upstanding leg or finger portion 202. In at least one preferred embodiment, one of the blocking members 200 is disposed adjacent each end of the inlet roller 14. As such, each of the oppositely disposed guide or blocking members 200 and specifically the upstanding legs 202 define the opposite ends of the opening to the intake or inlet where the meat enters the cutting assembly 10 and engages the inlet roller 14. The disposition, configuration and overall structuring of each of the guide or blocking members 200 prevents meat from passing beyond the opposite ends of the inlet. In doing so, the meat is prevented from inadvertently coming into contact with and possibly fouling the gears, linkage, etc. which maintain the rollers or other components in a continuous state of operation. In addition, a pair of the guiding or blocking members 200, including the upstanding arms 202 may be located at the exit or outlet portion of the cutting assembly 10 adjacent opposite ends of the outtake roller 14' in order to restrict the cut meat portions from passing beyond the opposite ends thereof.

Additional structural features, primarily represented in FIG. 2 and associated with both the inlet and outlet portions of the housing 12 is the provision of an in-feed scraper roller 203 and an out-feed scraper roller 205. The in-feed scraper roller 203 is positioned to further guide the incoming meat along the path of travel 16 as it enters into the casing or housing 12. More specifically as the meat passes into the inlet and engages the in-feed roller 14, the meat is additionally forced along the path of travel 16 by the rotation of the in-feed scraper roller 203 in cooperation with the in-feed roller 14. Further the distance between the in-feed scraper roller 203 and the in-feed roller 14 is such as to effectively sandwich the incoming meat as it passes along the path of travel 16, as represented in FIG. 1. As a result the incoming meat will be firmly gripped and continue to pass into the interior of the casing or housing 12 for further processing. Similarly, the out-feed scraper roller 205 serves to aid in the passage of the cut meat as it exits the housing or casing 12 over the out-feed roller 14'. Accordingly the out-feed scraper roller 205 at least partially interacts with the out-feed roller 14' and/or the blade assembly 18 in order to remove any cut meat from the blades and prevent the processed meat from sticking thereto. Similarly, the disposition and structuring of the out-feed scraper roller 205 will prevent the cut meat from sticking or clinging to the ejecting members 42, as also explained in greater detail hereinafter.

As further represented in FIG. 2, the modular cutting unit 10 further includes a mating assembly generally indicated as 26 and comprising a mate roller 28. The mate roller 28 is disposed in cooperative, adjacent relation to both the inlet roller 14 and in direct interacting relation with the cutting roller 20 of the blade assembly 18. More specifically, as the meat product to be processed passes along the path of travel 16 and initially engages the inlet roller 14 it is soon thereafter penetrated by a correspondingly disposed one of the plurality of cutting blades 22. The interaction between the piercing or penetrating cutting blade 22 and the continuous rotation of the in-feed roller 14 forces the meat therebetween and into the area of interaction between the plurality of cutting blades 22 and the mate roller 28. As should be apparent, the in-feed roller 14, the cutting roller 20 and the mate roller 28 are maintained in a continuous, synchronized rotation relative to one another and to the path of travel 16.

As described in greater detail hereinafter, the cutting roller 20 including the plurality of cutting blades 22 connected thereto comprises a combined motion in order to effectively and efficiently provide a predetermined cutting procedure on the meat product passing along the path of travel 16 and between the cutting roller 20 and the in-feed and mate rollers 14 and 28 respectively. Such a combined motion includes both the continuous rotational movement of the cutting roller 20 as well as a concurrent linearly reciprocating motion in a direction which is transverse to the path of travel 16 and substantially parallel to the length of the elongated mate roller 28. Therefore, each of the cutting blades 22, due to this combined motion of the cutting roller 20, will perform both the penetrating or piercing action into the meat product as well as a "slicing" action. Further, the interaction of the cutting blades 22 with the mate roller 28 will define what may be accurately referred to as a "multipoint cutting procedure". The multipoint cutting procedure will serve to cleanly and accurately cut the meat product being processed into meat pieces or portions having a generally predetermined configuration such that the meat pieces or portions are generally consistent with one another after the multipoint cutting procedure has been completed. With primary reference to FIG. 2, as well as FIGS. 4-8, the multipoint cutting procedure is accomplished due to the cooperative structuring and movable interaction of the plurality of cutting blades 22 with both the in-feed roller 14 and mate roller 28.

As generally set forth above, upon entry of the meat product into engagement with the in-feed roller 14, one of the plurality of cutting blades 22 will be disposed so as to pierce or penetrate the meat as it passes over the in-feed roller 14. This initial piercing or penetrating engagement may at least partially define the aforementioned multipoint cutting procedure. Further, the concurrent rotation of the in-feed roller 14 and the cutting roller 20 during their concurrent engagement with the meat will cause a forced travel of the meat product into the interior of the modular cutting unit 10 and eventually between the cutting roller 20 and the mate roller 28. When the meat passes beyond the in-feed roller 14, while still being at least partially in contact therewith, it will eventually engage the mate roller 28. Accordingly, due to the interaction between each of the plurality of cutting blades 22 and each of a plurality of mate slots 30 formed in the outer surface of the mate roller 28, the multipoint cutting procedure will continue and be at least partially defined thereby.

As indicated in FIG. 2 and as successively represented in FIGS. 4-8, the synchronized rotation of the mate roller 28 and the cutting roller 20 will serve to successively dispose correspondingly positioned ones of the cutting blades 22 with correspondingly positioned ones of the mate slots 30 in aligned, receiving relation with one another. Further, each of the mating slots 30 include a cooperative dimensioning and configuring which facilitates the receipt of the outer end and the cutting edge 24 of each of the cutting blades 22 into the interior of the correspondingly disposed mate slots 30. Such a cooperative structuring of the mate slots will aid in the performance of aforementioned multipoint cutting procedure without causing any structural damage or derogatorily effect on the sharpness of the cutting edge 24. Such cooperative configuring and dimensioning of the mate slots 30 specifically include a base portion 32 being disposed in spaced relation to the cutting edge 24 of the cutting blade 22 received within the mate slots 30. Accordingly the cutting edge 24, while piercing or penetrating the meat being cut will not engage any of the interior surfaces and specifically not be grounded or forced into engagement with the base 32 of the mate slot 30. As such, the cutting edge 24 will maintain its sharpness for an extended operational period of time.

Figure 4:
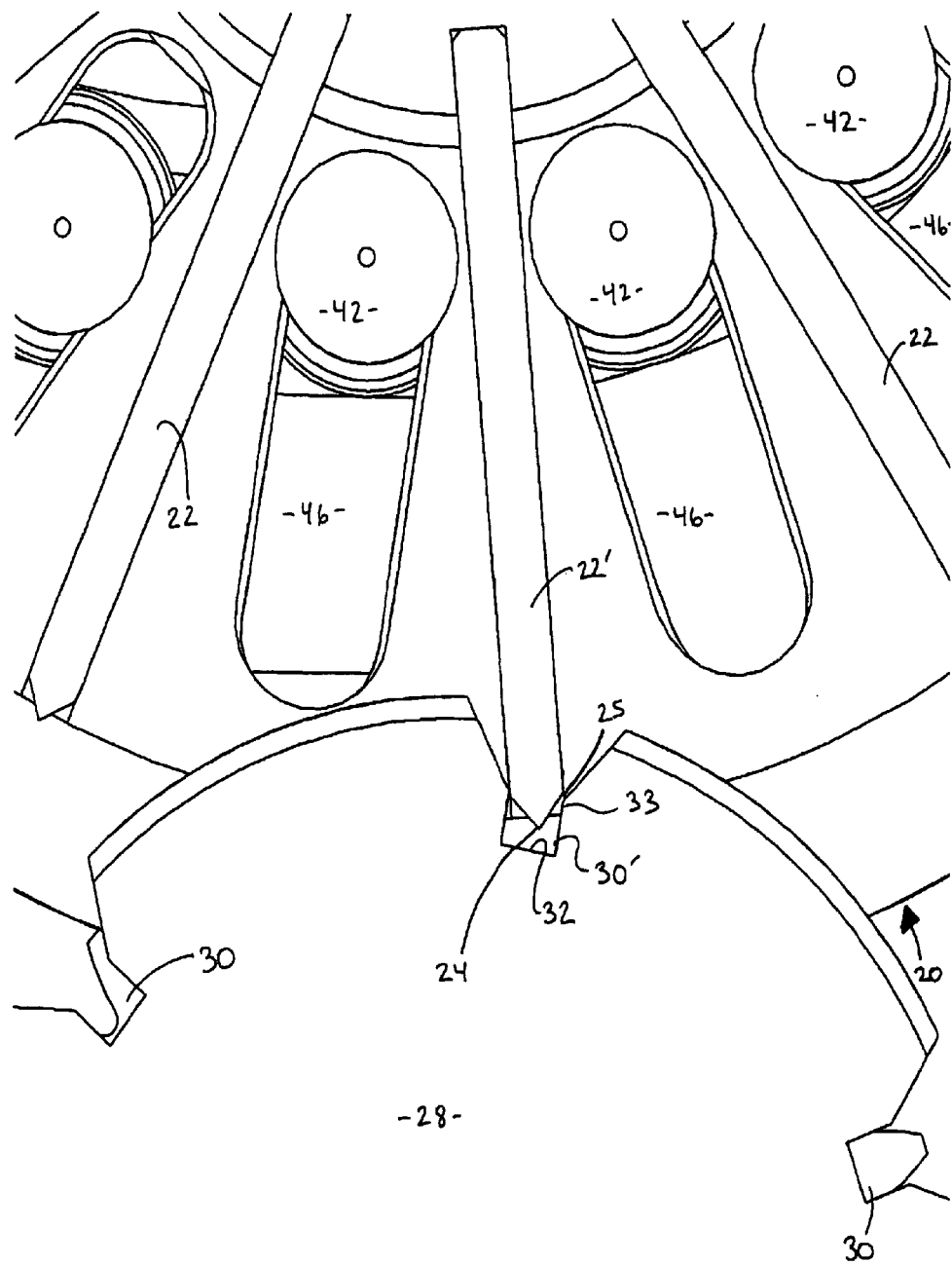
FIG. 4 is an end view of an interaction between at least one cutting blade of a cutting roller interacting with a mating assembly to accomplish a multipoint cutting procedure.
Figure 5:
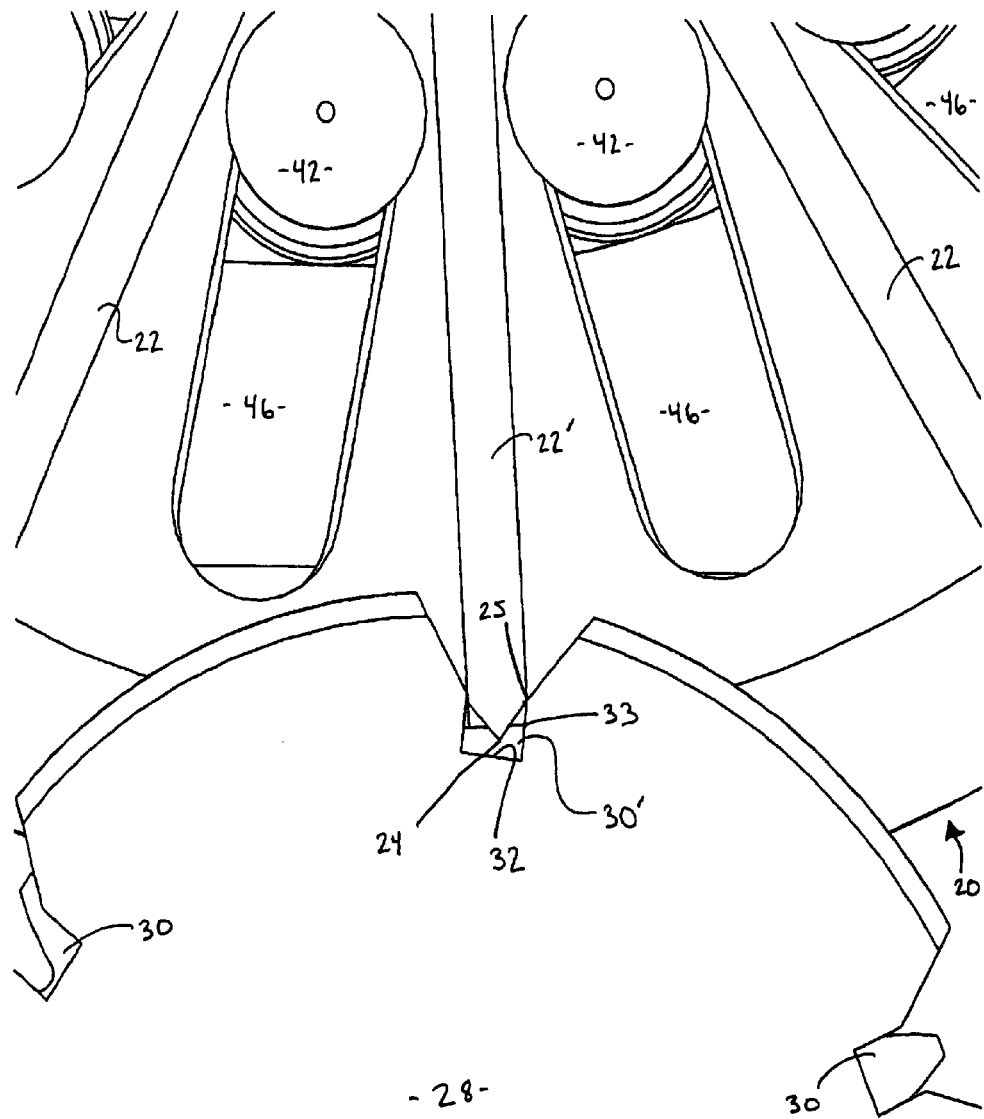
FIG. 5 is a next successive step in the interaction between a cutting blade and a mate assembly from that represented in FIG. 4.

Again with reference to the successive representations of FIGS. 4-8, the multipoint cutting procedure is further and at least partially defined by a "first snip cut" which occurs due to a concurrent cutting orientations of corresponding trailing portions 25 and 33 of an interactive cutting blade 22' with an interactive mate slot 30', as clearly represented in FIGS. 4 and 5. As represented in FIG. 4, when the cutting edge 24 of the interactive cutting blade 22' begins to enter the interactive mate slot 30', the trailing portion of the interactive blade 22' and the trailing portion 33 of the interactive slot 30' both come into a substantially corresponding cutting orientation with one another. As represented in FIG. 5, the cutting edge 24 passes further into the interior of the interactive slot 30' wherein the trailing portions 25 and 33 of the interactive blade 22' and interactive slot 30' pass further into a common, corresponding cutting orientation.

Figure 6:
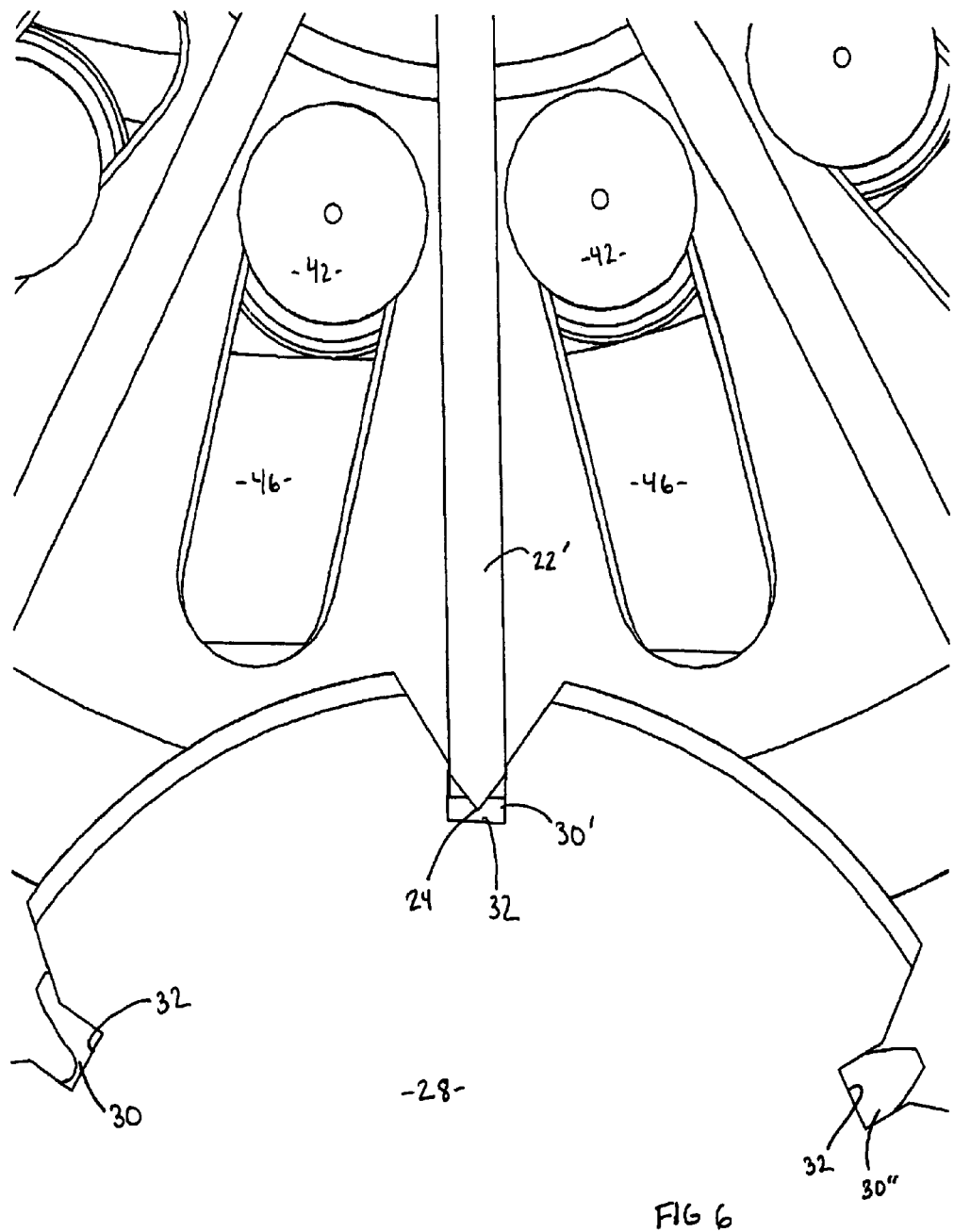
FIG. 6 is a next successive step in a multipoint cutting procedure relative to the embodiment represented in FIG. 5.
Figure 7:
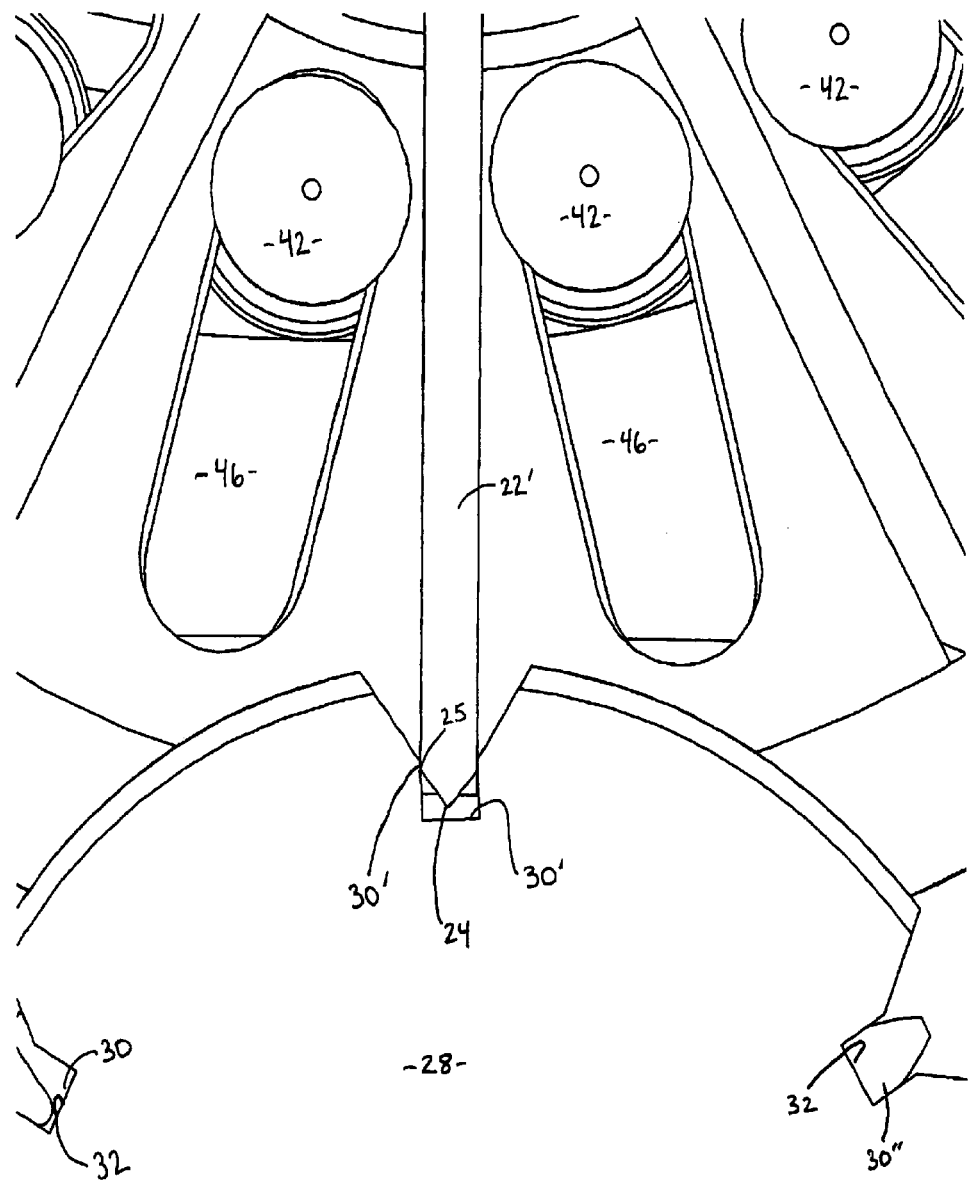
FIG. 7 is a next successive step in the multipoint cutting procedure as represented in FIG. 6.
Figure 8:
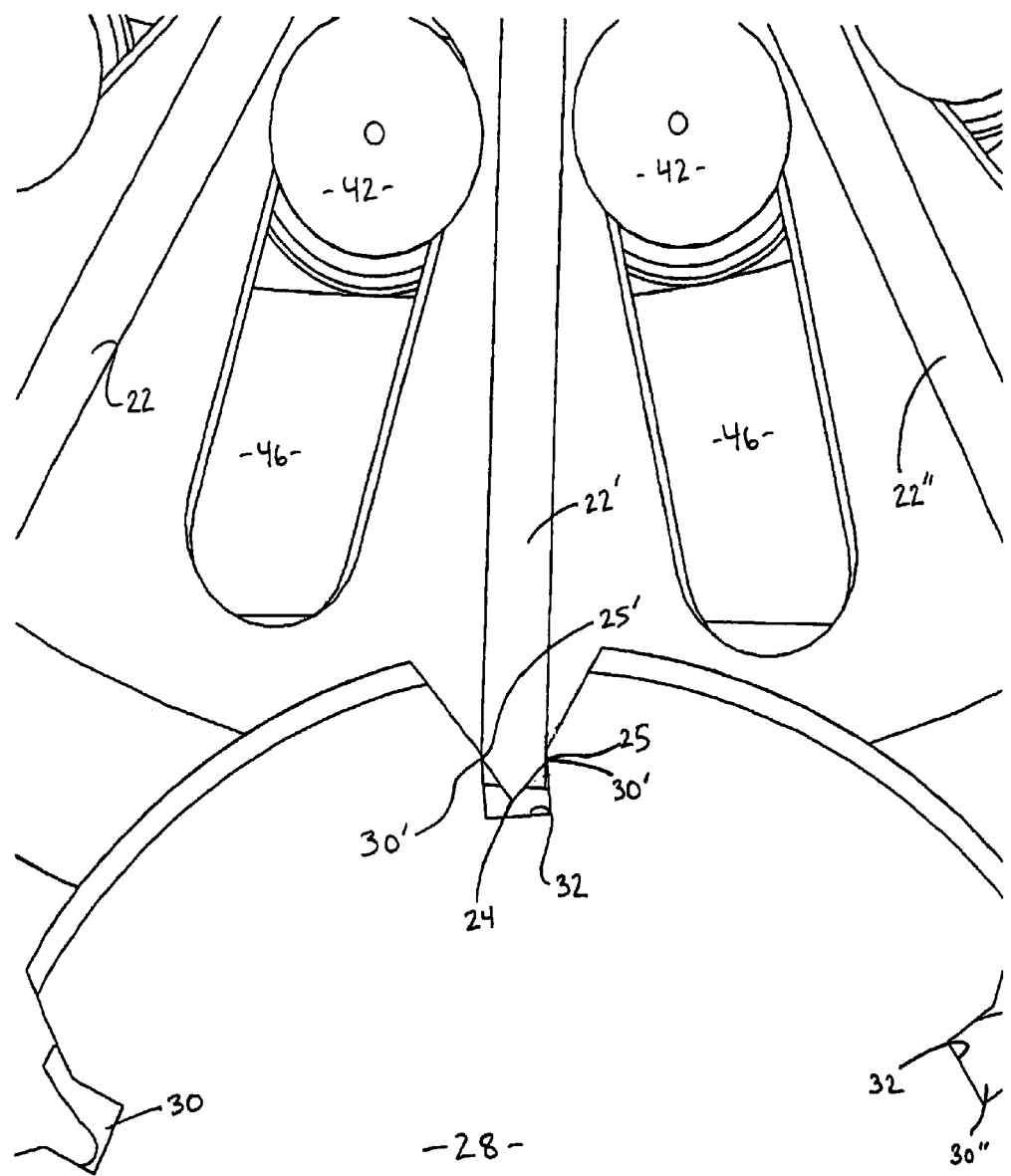
FIG. 8 is a next and final successive step in the multipoint cutting procedure as demonstrated in FIGS. 4-7.
Figure 9:
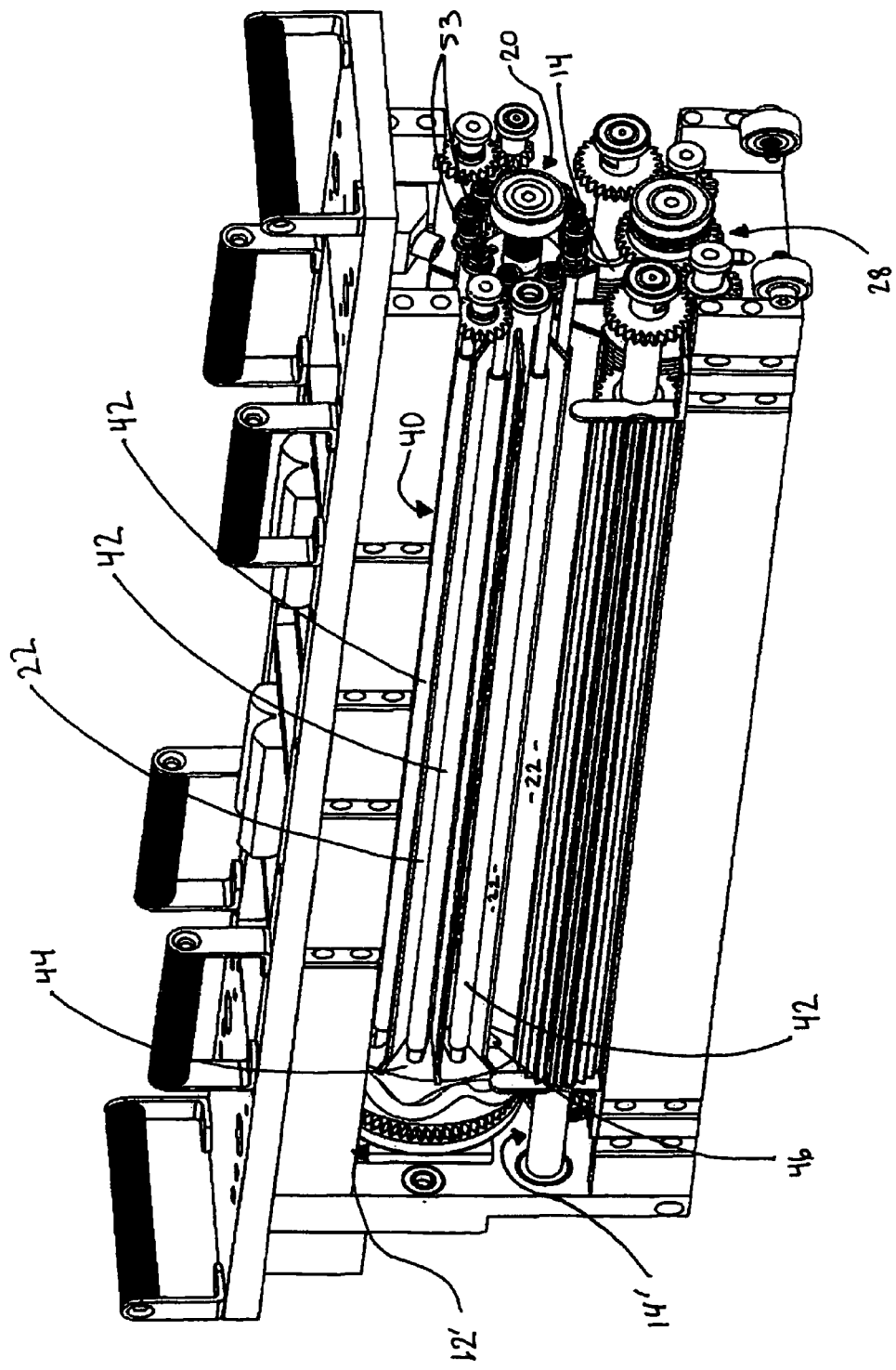
FIG. 9 is a perspective view in partial cutaway of an ejecting assembly portion of the embodiment of the meat cutting assembly represented in FIGS. 1-8.
Figure 10:
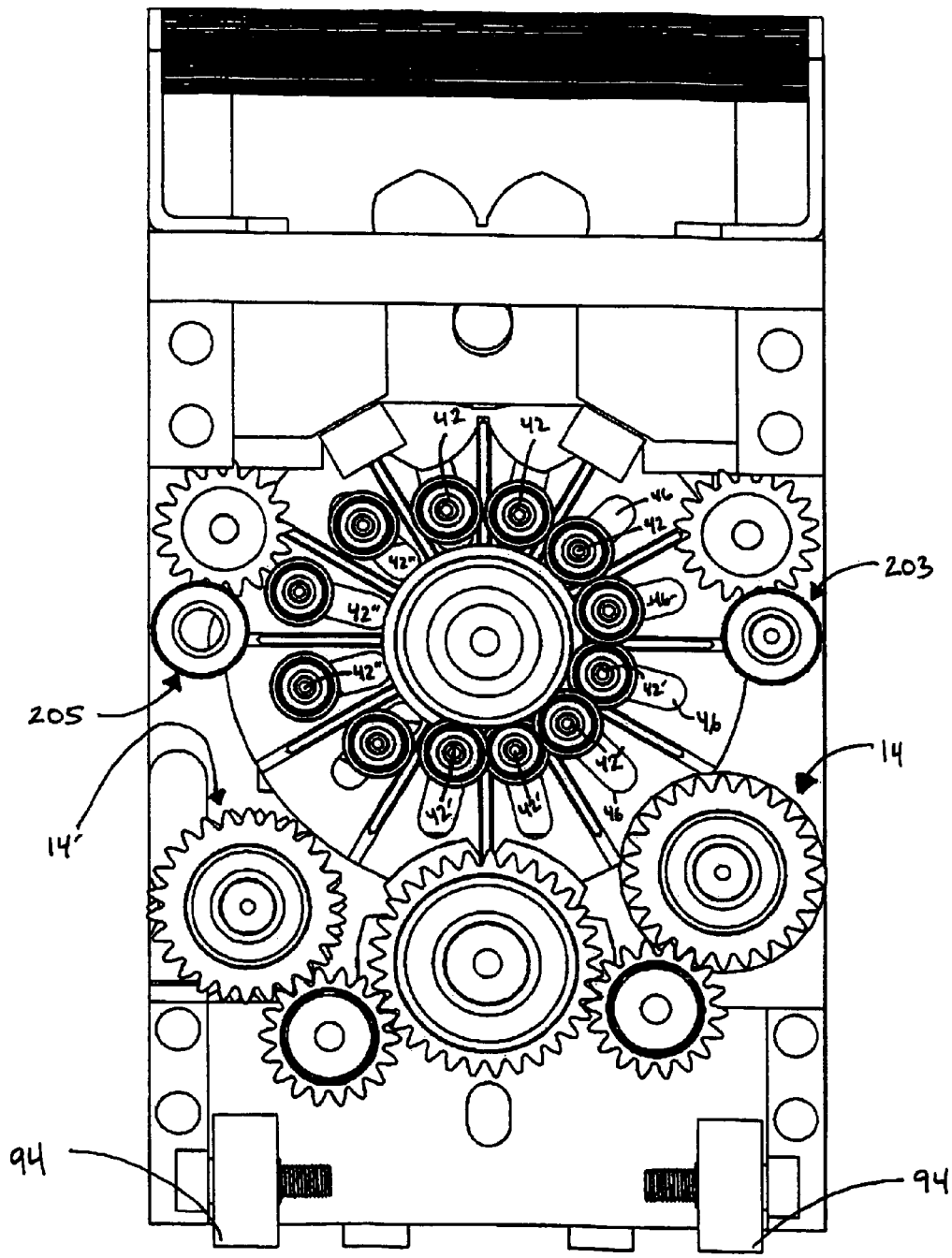
FIG. 10 is an end view of the embodiment of FIG. 9.

FIG. 6 is representative of the cutting edge 24 of the interactive blade 22' being substantially centered within the interactive slot 30' thereby disposing the cutting edge 24 into a full "insertion cut" which also at least partially defines the aforementioned multipoint cutting procedure. As represented in FIG. 7, continued rotation of the cutting roller 20 and the mate roller 28 further moves the cutting edge 24 of the interactive cutting blade 22' through the interior of the interactive mate slot 30' until the leading portions 25' and 30' of the interactive cutting blade 22 and the interactive slot 30 assume common, concurrent cutting orientations and thereby define a "second snip cut". Upon completion of the second snip cut, as generally represented in FIG. 8, the multipoint cutting procedure with respect to the interactive cutting blade 22' and interactive cutting slot 30' will be completed. As also represented in FIGS. 7 and 8, the following the cutting blade 22" will eventually come into registered alignment with the corresponding mate slot 30" to perform the same multipoint cutting procedure on a corresponding portion of the meat product passing between the cutting roller 20 and the mate roller 28.

As set forth above, the initial piercing or penetrating engagement of the cutting edge 24 with the meat product being cut as it is forced between the in-feed roller 14 and the cutting roller 20 will serve to define the initial "penetrating cut" of the aforementioned multipoint cutting procedure. Also, in that each of the plurality of cutting blades 22 are disposed in equally spaced relation to one another and extend radially outward from the core 23 of the cutting roller 20 the cut portions between each of the cutting blades 22 will be substantially equally dimensioned, at least in terms of width. The length of the cut piece will be at least partially determined by the overall corresponding configuration of the meat product being cut.

Yet additional structural features associated with both the in-feed roller 14 and the mate roller 28 is directed to common or substantially equivalent structure which restricts any lateral displacement of the meat product being processed as it engages the cutting roller 20. As set forth above, the cutting motion of the cutting roller 20 is defined by a concurrent rotational movement and a continuous linearly reciprocal movement which enables the plurality of cutting blades 22 to concurrently penetrate or pierce the meat being cut as well as performing a slicing action thereon. However, due to the continuous reciprocal movement of the plurality of cutting blades 22 along with the cutting roller 20, there is a tendency for the meat, once engaged by the cutting blades 22, to be laterally displaced along the length of the outer surface of both the input roller 14 and the mate roller 28. In order to avoid such lateral displacement, the outer surfaces of each of the in-feed roller 14 and mate roller 28 comprise a plurality of successively arranged grooves 15, which are collectively oriented in a direction along the path of travel. As such, a reciprocal movement of the plurality of cutting blades 22 once disposed in penetrating engagement with the meat will not significantly laterally displace the meat being cut, along the length of the in-feed roller 14 and/or mate roller 28.

With primary reference to FIGS. 9-13, yet another feature of the present invention is directed to an ejecting assembly generally indicated as 40 and comprising a plurality of elongated ejecting members 42 each of which are reciprocally disposable between different adjacently disposed cutting blades 22. Such reciprocal movement is more specifically defined by the travel of each of the ejecting members 42 between an inwardly retracted position, adjacent the core 23, and an outwardly extended position, substantially adjacent the cutting edge 24. Further, the outwardly extended position corresponds to and at least partially defines an ejecting orientation of each of the ejecting members. As represented primarily in FIGS. 10 and 11, the inwardly retracted position is assumed by ejecting members 42' and the outwardly extended position or ejecting orientation is defined by the position of ejecting members 42". The remainder of the ejecting members 42 are represented as passing between the aforementioned inwardly retracted and outwardly extended positions. As should be apparent, the purpose and function of the plurality of retracting members 42 is to dislodge or eject any of the cut meat pieces which remain between adjacently disposed cutting blades 22, after the multipoint cutting procedure has been completed as described in detail with primary preference to FIGS. 4-8.

As set forth above, each of the plurality of ejecting members 42 rotate with the cutting roller 20 due to the provision of a drive mechanism, generally indicated as 44. The drive mechanism 44 includes a plate, disk, or other appropriate structure connected to an end or other appropriate portion of the cutting roller 20, so as to concurrently rotate therewith. The drive mechanism 44 also includes a plurality of elongated slots 46 formed between adjacently positioned cutting blades 22 and disposed in movable connecting and/or surrounding relation with corresponding ends, or other appropriate portions, of each of the plurality of ejecting members 22 as shown throughout FIGS. 9-12. Accordingly, upon rotation of the cutting roller 20, the drive structure 44 will also rotate while in movable, driving engagement with each of the plurality of ejecting members 42. Such driving engagement between the drive mechanism 44 and each of the ejecting members 42 occurs by the movable engagement of the plurality of slots 46 with correspondingly disposed ones of each of the ejecting members 42.

Figure 11:
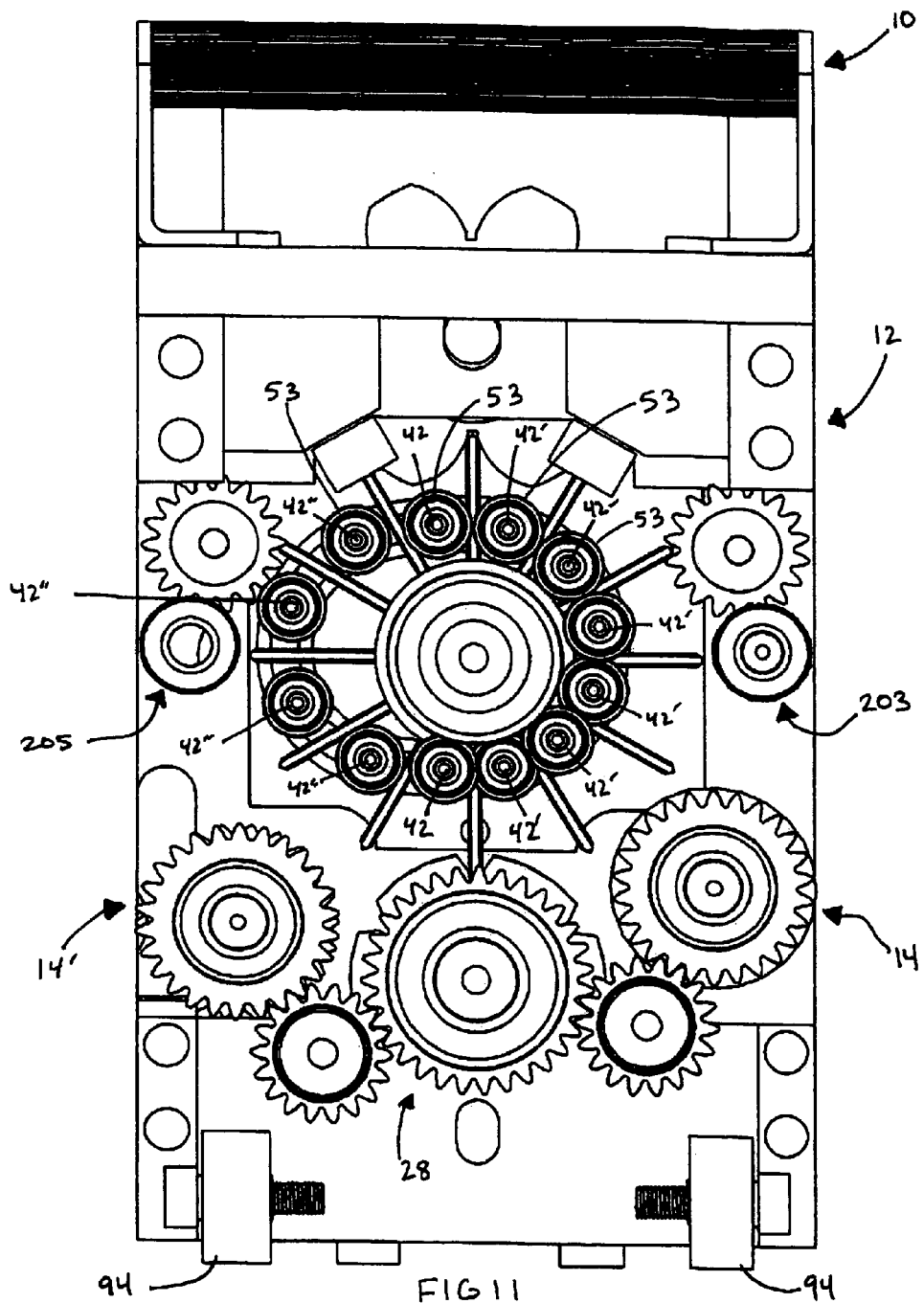
FIG. 11 is a cutaway end view of the embodiment of FIG. 10.
Figure 12:
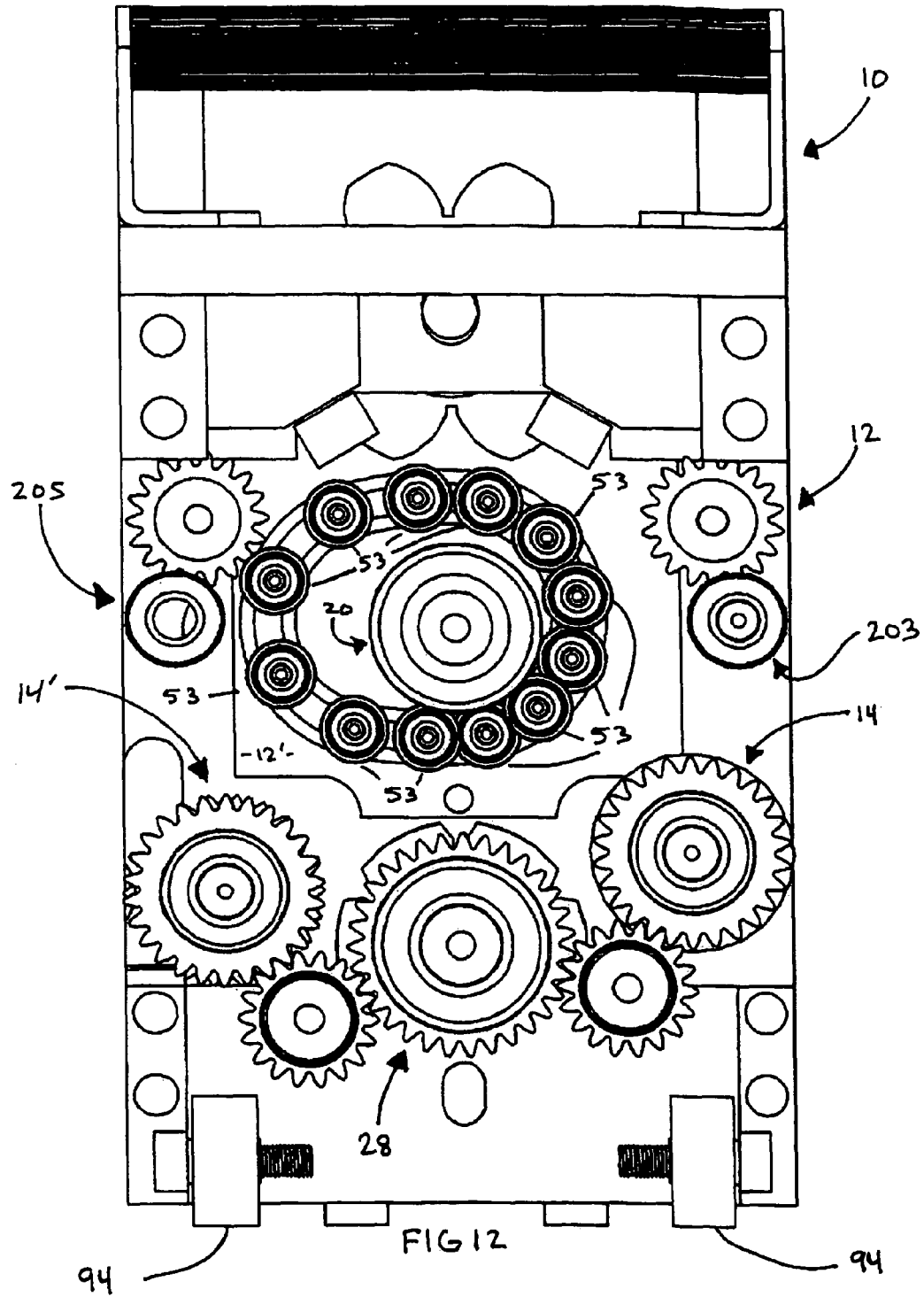
FIG. 12 is an end view in further, partial cutaway of the embodiment of FIGS. 9, 10 and 11 showing additional operative and structural components associated therewith.
Figure 13:
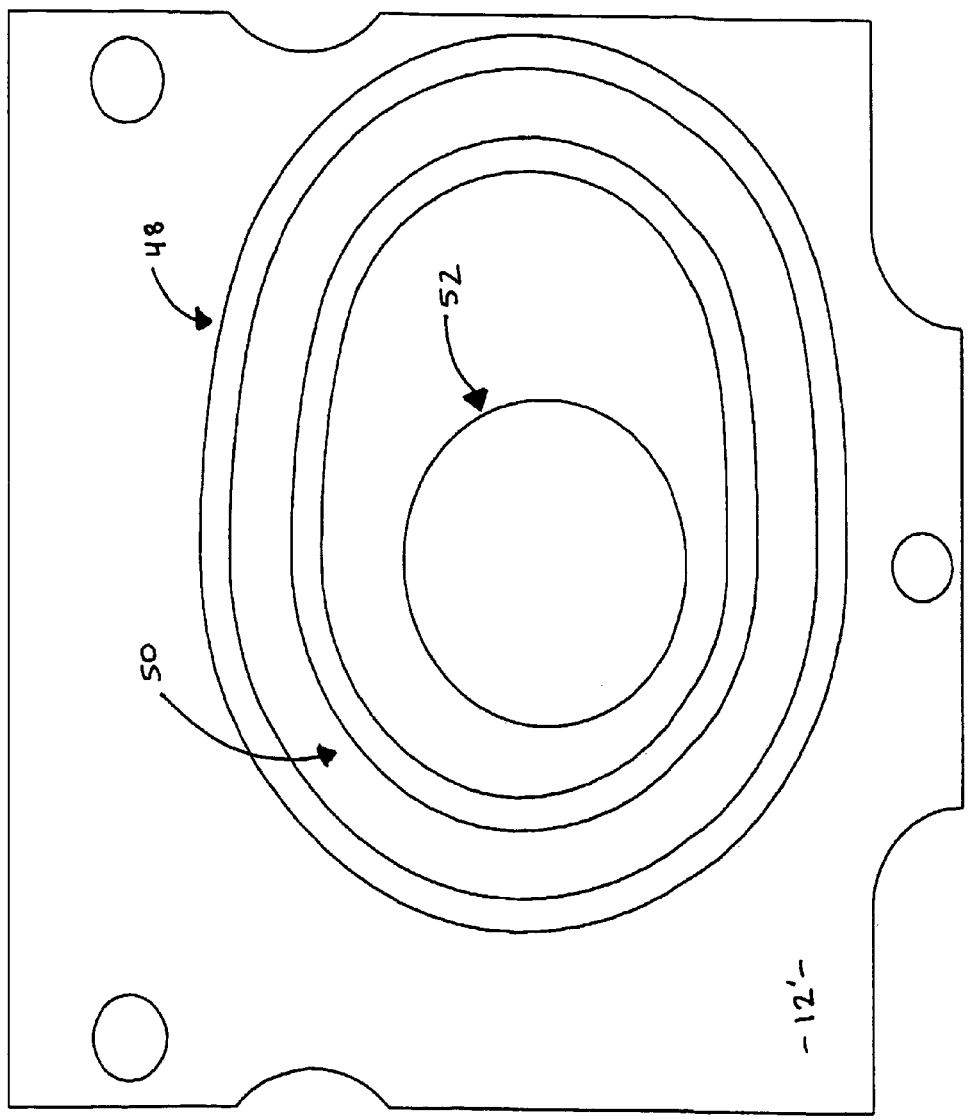
FIG. 13 is a detailed view of a guide assembly associated with the ejecting assembly of the embodiment of FIGS. 9-12.
Figure 14:
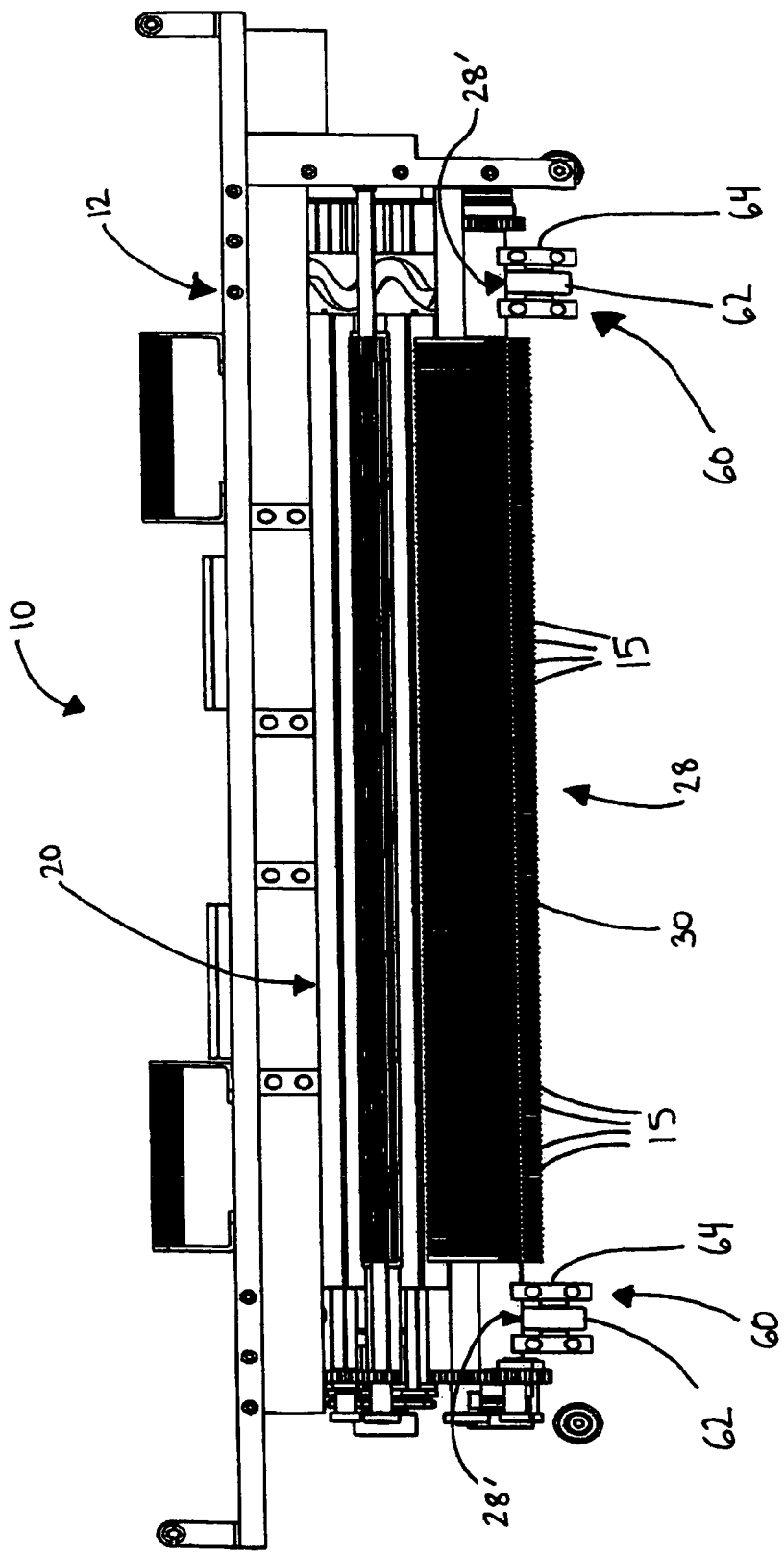
FIG. 14 is a front view of the meat cutting assembly of the preferred embodiment of FIG. 1 in partial cutaway representing at least a portion of a stabilizing assembly.
Figure 15:
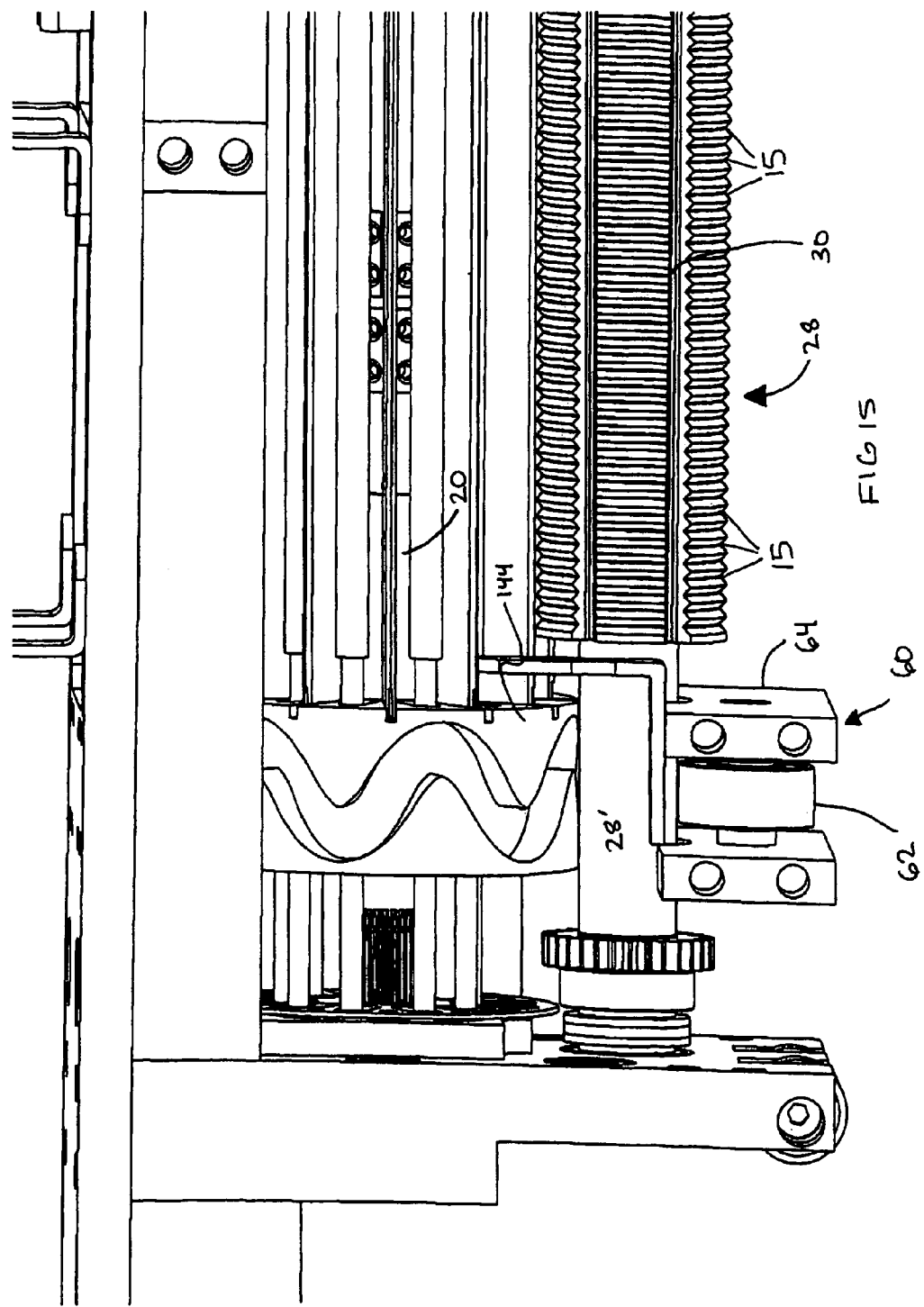
FIG. 15 is a perspective view in partial cutaway showing details of at least a portion of the embodiment of FIG. 14.

In addition, the ejecting assembly 40 also includes a guide assembly generally indicated as 48 in FIGS. 11 and 12 and shown in detail in FIG. 13. The guide assembly 48 is formed on or connected to a portion of the frame or housing, as at 12' and as such is fixedly disposed relative to the cutting roller 20. As represented in FIG. 13, the guide assembly 48 comprises an elongated, continuous guide track 50 having an eccentric configuration along its continuous length. The disposition and eccentric, continuous configuration of the guide track 50 relative to the cutting roller 20 is schematically indicated as at 52 which represents the operative positioning of the cutting roller 20 relative to the guide track 50. With further reference to FIGS. 9-12, each of the ejecting members 42 have their end portions, as at 49, structured to movably travel along the length of the continuous, eccentric guide track 50. More specifically, at least one but more practically each of the opposite ends of each of the ejecting members 42 include a bearing or other roller type structure 53 disposed within or otherwise engaging and traveling along the length of the continuous, eccentric guide track 50, as clearly represented in FIGS. 10-12.

Therefore, each of the plurality of ejecting members 42 will concurrently rotate with the cutting roller 20 due to the fixed connection or attachment of the drive mechanism 44 with the cutting roller 20. Simultaneously, the end bearings or roller portions 53 attached to at least one but more practically each opposite end of each of the ejecting members 42 will ride within and travel along the guide track 50. Due to the continuous, eccentric configuration of the guide track 50 the plurality of ejecting members 42 will be reciprocally disposed between the inwardly retracted position, as represented by the plurality of ejecting members 42' and the outwardly extended position defining the ejecting orientation, as represented by the ejecting members 42". Further, the specific disposition and orientation of the eccentric guide track 50 relative to the cutting roller 20 and the path of travel 16 is such that each of the ejecting members 42 will be disposed into the outwardly extending, ejecting orientation as at 42", subsequent to the meat product being cut into the individual pieces as described in detail with primary reference to FIGS. 4-8.

More specifically as each of the cutting blades 22 leaves the mate roller 28, upon completion of a multipoint cutting procedure, there may be tendency for the cut meat pieces to be inadvertently retained between adjacent ones of the cutting blades 22. In order to eject the cut pieces of meat from between adjacent cutting blades 22, each of the plurality of ejecting members will be disposed in the ejecting orientation along a portion of the path of travel 16 downstream of the mate roller 28. When so ejected, the cut pieces of meat will then fall back onto the conveyor or like system which at least partially defines the path of travel and will continue along the processing line 100 for further cutting, processing, etc. as schematically represented in FIG. 22.

As represented in FIGS. 14-19, additional structural and operative features of the cutting assembly 10 comprise a stabilizing assembly. The stabilizing assembly is disposed and structured to restrict displacement of the cutting roller 20 and mate roller 28 relative to one another and to the path of travel 16. Such "displacement" includes, but is not limited to any type of flexure or distortion of the cutting blades 22 relative to and/or out of their interactive cutting orientation relative to the mate slots 30 formed in the mate roller 28. As should be apparent, in order to provide a clean, consistently accurate multipoint cutting procedure, a predetermined spacing exists and should be maintained between the cutting roller 20 and the mate roller 28 and more specifically between the outer cutting edge 24 of each of the cutting blades 22 with a correspondingly disposed mate slot 30. As such, the aforementioned stabilizing assembly is disposed and structured to restrict any change or "dimensional variance" of the predetermined spacing between the cutting roller 20 and mate roller 28 and more specifically between the cutting edge 24 of each of the cutting blades 22 and the corresponding mate slot 30, when they are disposed in a common or corresponding cutting orientation, as explained in detail primarily with relation to FIGS. 4-8.

Therefore, in the embodiments of FIGS. 14-19, the stabilizing assembly comprises a plurality of stabilizing structures disposed in displacement restricting engagement with the cutting roller 20 and/or the mate roller 28, as well as individual ones of the cutting blades 22 during the multipoint cutting procedure. Moreover, the plurality of stabilizing structures may include a first stabilizing structure in the form of at least one but more practically a plurality of support assemblies generally indicated as 60. Each of the one or more support assemblies 60 includes a roller and/or bearing structure 62 supported by a cradle or other mounting structure 64. Each of the one or more support assemblies 60 is disposed in displacement restricting engagement with different portions of the mate roller 28 as at 28'. The structure and placement of the each of the roller or bearing assembly 62 is such as to continuously and rotationally engage the corresponding portion 28' of the mate roller 28 thereby serving to restrictively engage the cutting roller 28 at a location which will prevent or significantly restrict displacement of the mate roller 28 away from the path of travel 16 and the cutting roller 20. As such, the one or more support assembly 60 can be said to be located in substantially opposed relation to the cutting roller 20 at locations 28' where they restrictively engage the mate roller 28. Again, such opposing displacement restricting engagement of the support assembly 60 with the cutting roller 20 further restricts dimensional variance of the "predetermined spacing" between the cutting roller 20 and the mate roller 28 and more specifically between the cutting edge 24 of each of the cutting blades 22 and the receiving mate slot 30 of the mate roller 28.

Figure 16:
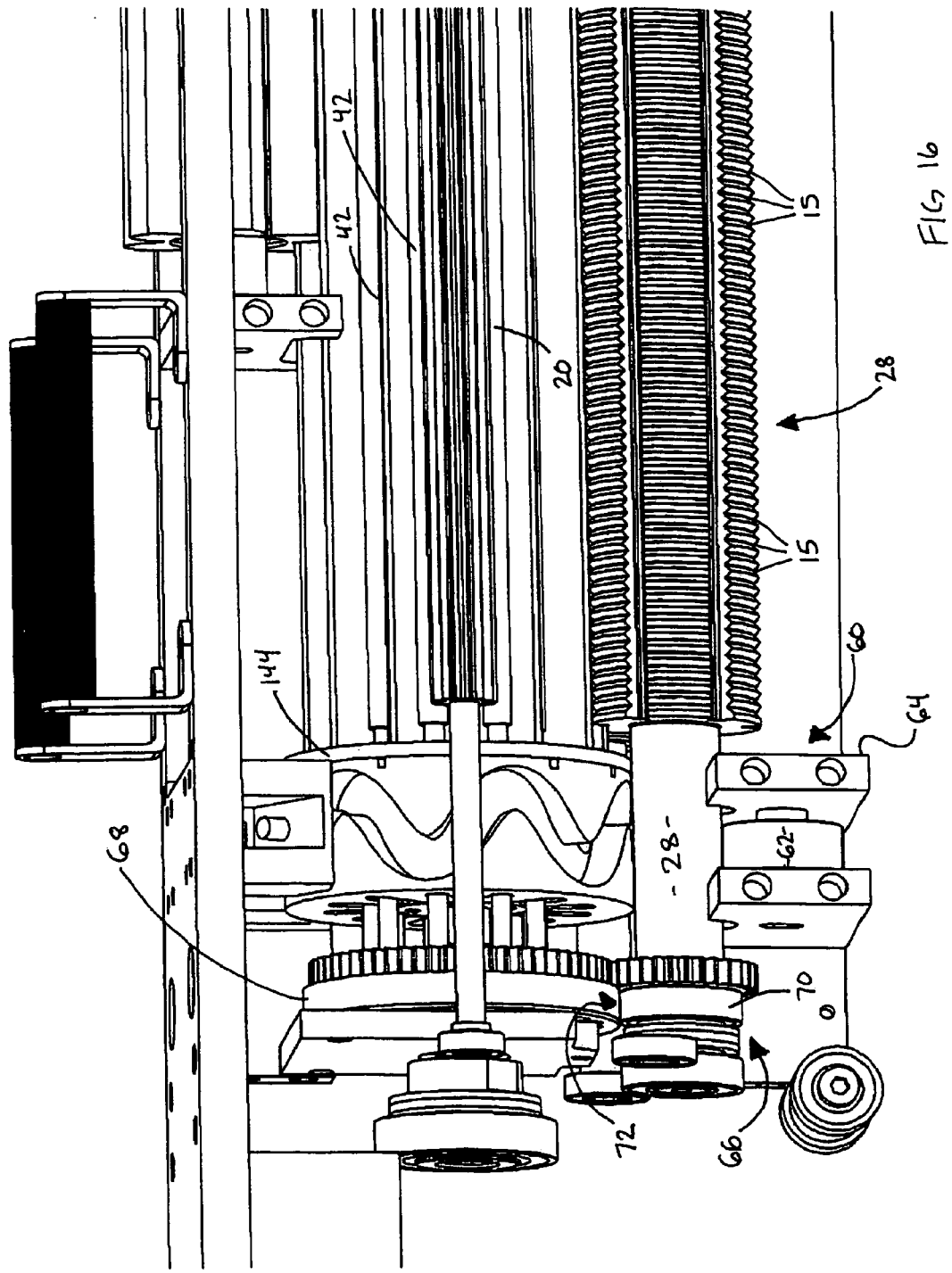
FIG. 16 is a perspective view in partial cutaway showing additional details of the embodiment of FIGS. 14 and 15.

The stabilizing assembly of the present invention further comprises what may be referred to as a second stabilizing structure generally indicated as 66 in FIG. 16. The second stabilizing structure 66 includes a first stabilizing segment 68 connected to and rotatable with the cutting roller 20. In addition, the second stabilizing structure 66 includes a second stabilizing segment 70 connected to and movable with the mate roller 28. While the embodiment of FIG. 16 represents only one second stabilizing structure 66, a more practical application would be the inclusion of first and second stabilizing segment 68 and 70 being connected at opposite ends of the cutting roller 20 and the mate roller 28 respectively.

In operation, upon concurrent rotation of the cutting roller 20 and the mate roller 28 the first and second stabilizing segment 68 and 70 will be brought into rotatable engagement with one another, as at 72. As such, the second stabilizing structure 66 will be disposed in displacement restricting engagement with one another and accordingly will eliminate or restrict displacement between the cutting roller 20 and the mate roller 28. Further, due to the disposition and structure of the one or more support assemblies 60 located substantially opposite to the cutting roller 20, the rotational, displacement restricting engagement 72 between the first stabilizing segment 68 and the second stabilizing segment 70 will prevent displacement of the mate roller 28 towards the path of travel and towards the cutting roller 20. AS such, the intended, predetermined spacing between the cutting roller 20 and the mate roller 28 will be maintained in order to accomplish a precise interaction of the cutting edge 24 of each of the cutting blades 22 with the receiving, mate slots 30.

Figure 17:
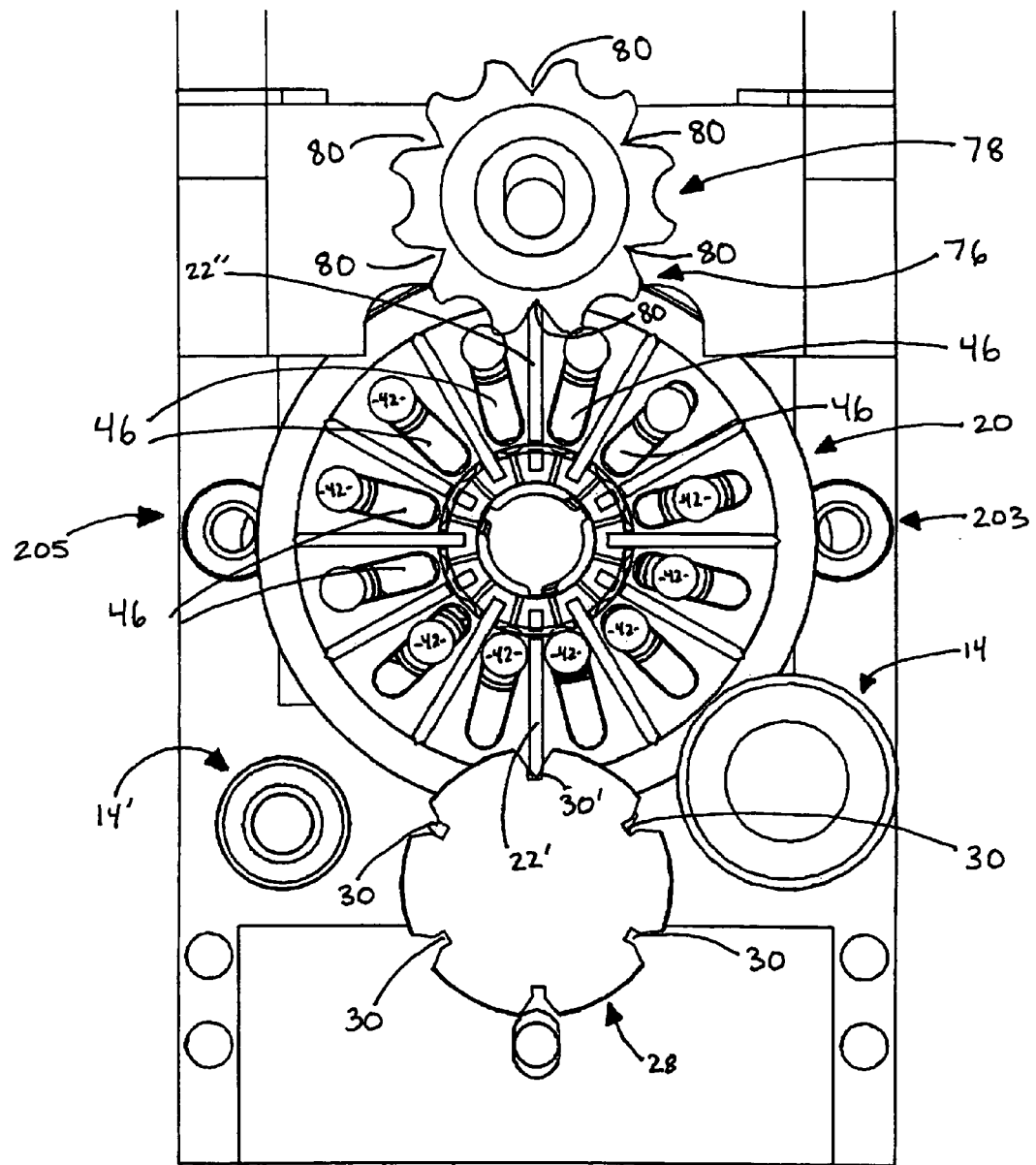
FIG. 17 is an end view representing additional operative and structural components of the stabilizing assembly of the embodiments of FIGS. 14-16.
Figure 18:
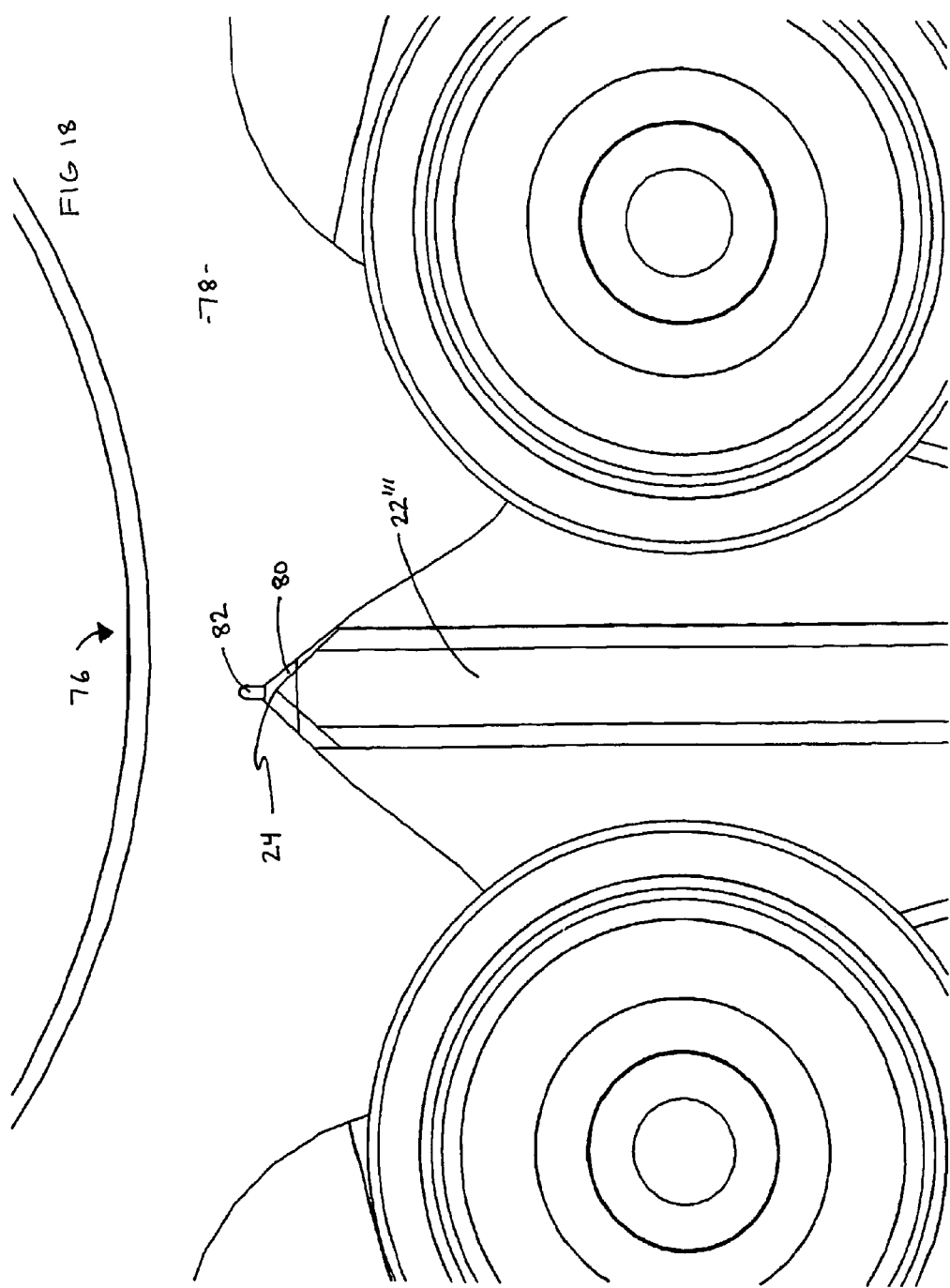
FIG. 18 is representative interaction of the additional components of the stabilizing assembly of the embodiment of FIG. 17.
Figure 19:
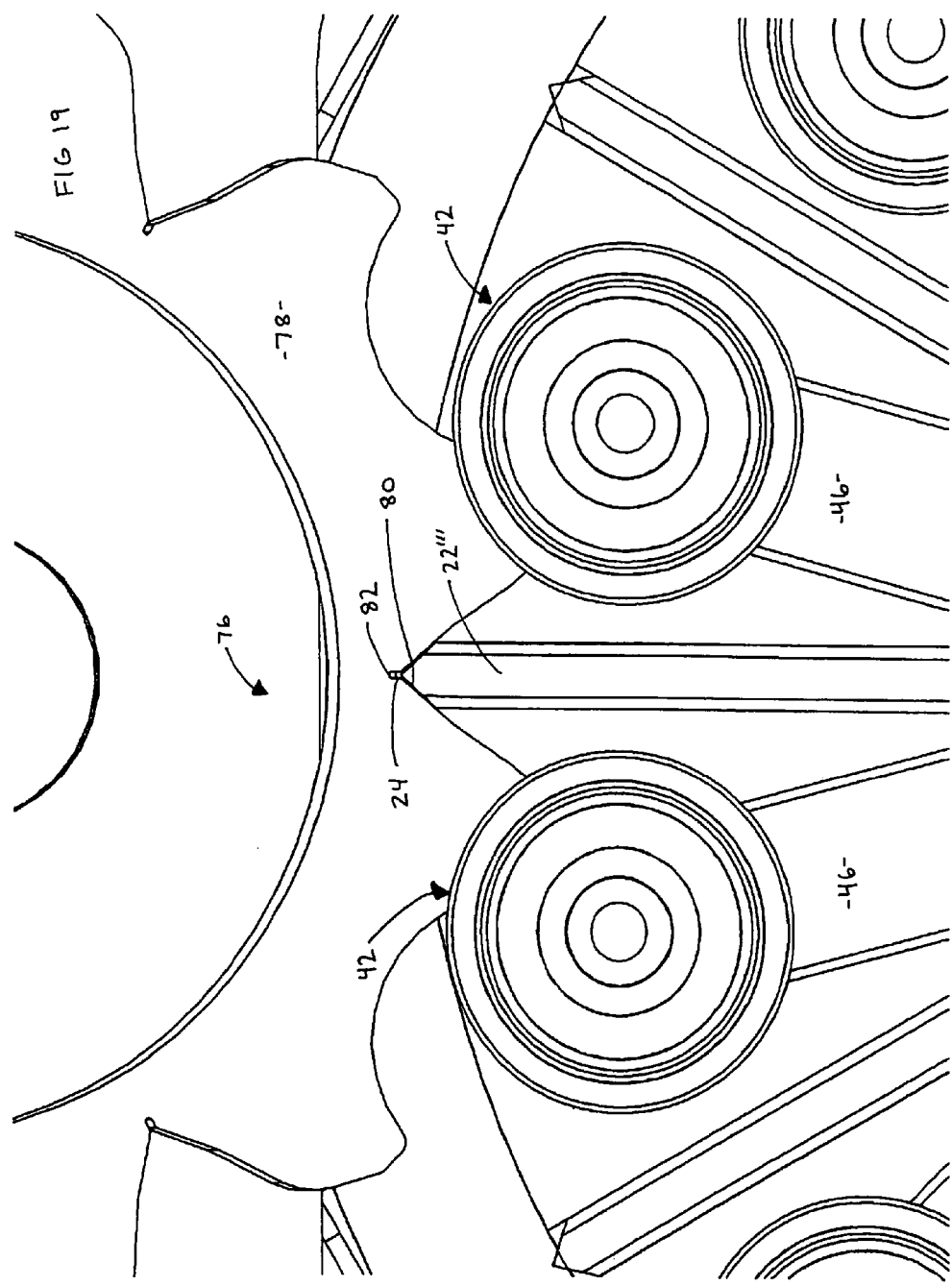
FIG. 19 is an end view of a successive step and position of the stabilizing assembly of the embodiment of FIGS. 17 and 18 from that represented in FIG. 18.
Figure 20:
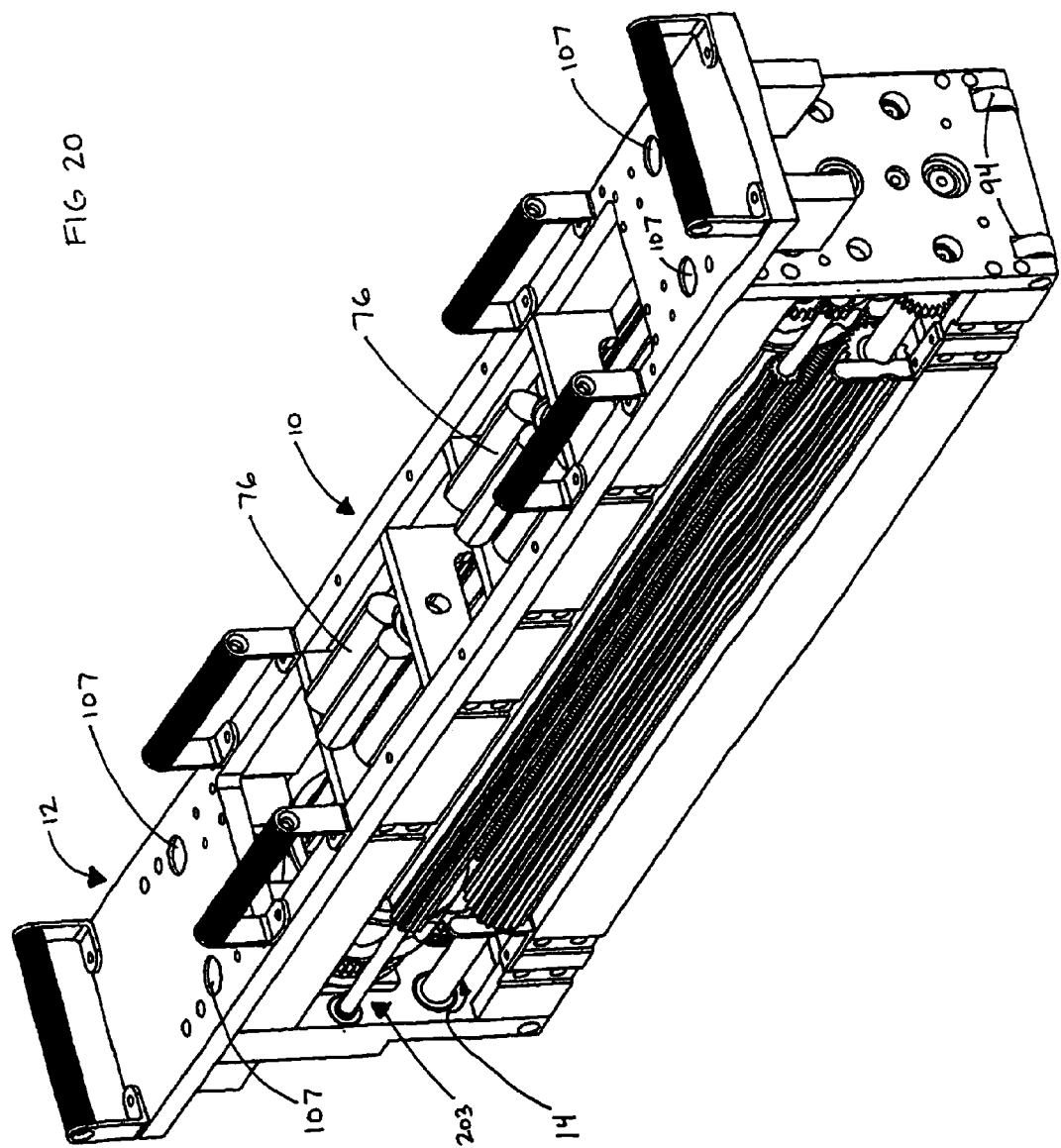
FIG. 20 is a perspective view of the embodiment of FIG. 1 at least partially representing a modular construction of the meat cutting assembly as well as structural components associated with the operation thereof.
Figure 21:
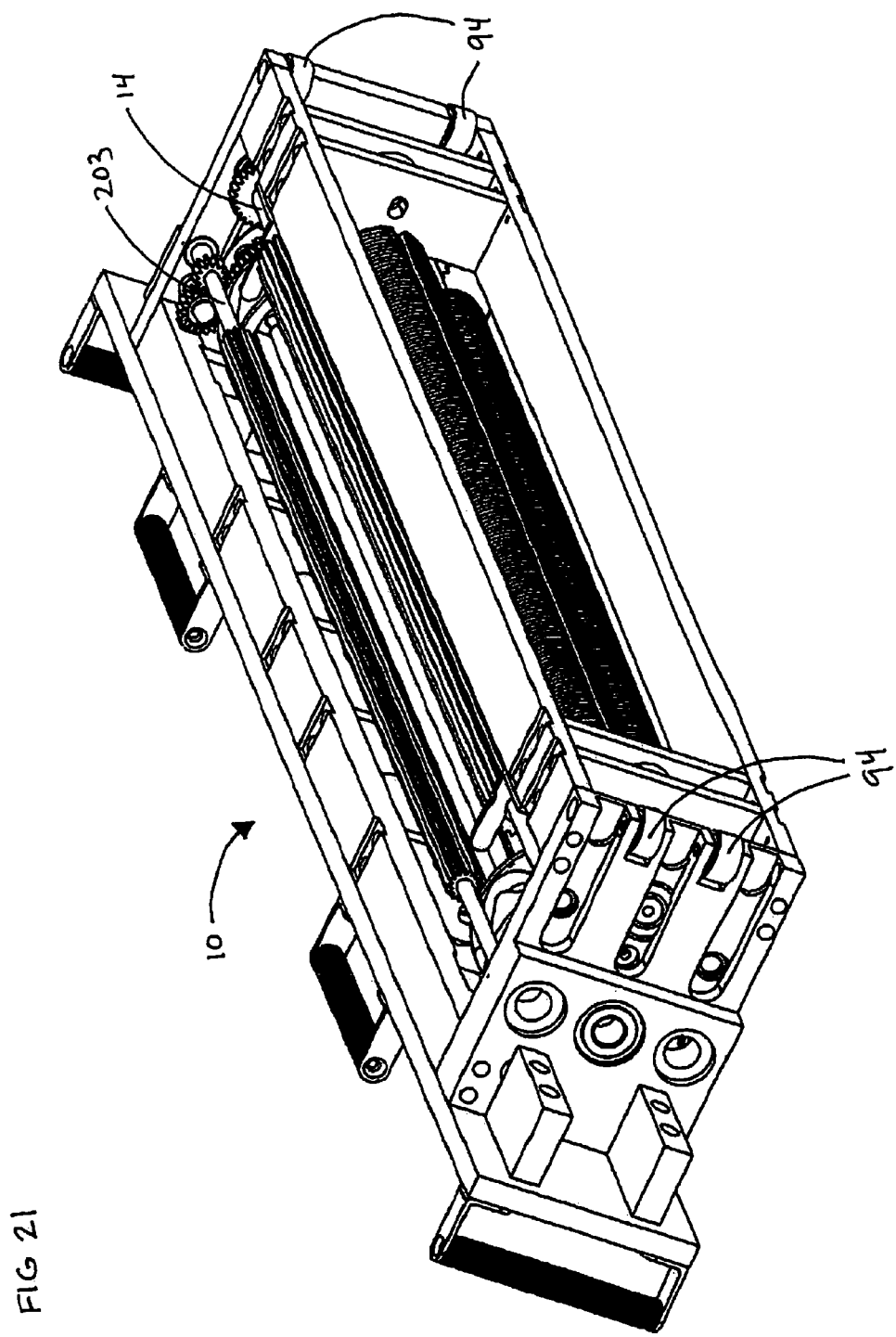
FIG. 21 is a bottom perspective view of the embodiment of FIG. 20.

The stabilizing assembly of the present invention may further include a third stabilizing structure generally represented as 76 in FIG. 17 and shown in detail in FIGS. 18 and 19 in successive, operative positions. More specifically, the third stabilizing structure 76 is disposed in displacement restricting engagement with the plurality of cutting blades 22 and more specifically with a predetermined one of the cutting blades 22'". For purposes of clarity, the "predetermined cutting blade" is represented as 22'" and is at least partially defined as the cutting blade which is diametrically aligned with an interactive cutting blade 22' received within the interactive mate slot 30'. As such, the predetermined cutting blade 22'" is coaxially aligned with the interactive blade 22' which is in the penetrating portion of the multipoint cutting procedure by being received within and aligned with the interactive mate slot 30' as explained in detail with reference to FIG. 6 above. As should be apparent the continuous rotation of the cutting blade 20 will be repeatedly position successive ones of the cutting blades 22 into the position represented by the predetermined cutting blade 22'" in the embodiment of FIG. 7. Accordingly, the third stabilizing structure 76 includes an elongated stabilizing roller 78, substantially parallel to the cutting roller 20 and including a plurality of stabilizing slots 80 dimensioned and configured to receive and engage the outer end of each of the cutting blades 22 once they are disposed in the position of the predetermined cutting blade 22'" as represented in FIG. 17. The synchronized rotation between the cutting roller 20 and the stabilizing roller 78 is such that each of the cutting blades 22 will be received within a correspondingly positioned one of the stabilizing slots 80.

With primary reference to FIGS. 18 and 19, as the outer end of each of the cutting blades 22 reach the position of the predetermined cutting blade 22'", the interior surfaces of the stabilizing slot 80 will come into engaging and/or confronting relation to the outer end of the predetermined cutting blade 22'", as best represented in FIG. 19. Such confronting relation/engagement will define a displacement restricting relation of the interactive cutting blade 22' as it passes through the multipoint cutting procedure and is disposed in axially aligned relation within the interactive mate slot 30' described with reference to FIGS. 4-8 and also represented in FIG. 17.

As should be apparent, the forced travel of the meat product being cut into and between the cutting roller 20 and the mate roller 28 will exert an outwardly directed force on both the cutting roller 20 and the mate roller 28 as well as the specific interactive cutting blade 22'. Such forcible engagement will have the tendency to alter or change the dimension of the predetermined spacing between the cutting roller 20 and the mate roller 28 more specifically between the interactive blade 22' and the interactive slot 30'. Therefore the displacement restricting engagement of the interior surfaces of each of the stabilizing slots 80 with the outer end of the predetermined cutting blade 22'" will prevent or significantly restrict any dimensional variance of the predetermined spacing between the cutting roller 20 and the mate roller 28. It should be noted that the length of the stabilizing roller 78 and each of the plurality of spaced apart stabilizing slots 80 substantially corresponds to the length of each of the cutting blades 22. As such, the displacement restricting engagement between the interior surfaces of the slots 80 and the outer end of the predetermined cutting blades 22'" will result in a force being distributed along substantially the entire length of a cutting blade 22'".

Again with specific reference to FIGS. 18 and 19, each of the stabilizing slots 80 includes a recessed notch as at 82. Notch 82 is disposed and dimensioned to accommodate a non-engaging receipt of the cutting edge 24 so as not to affect the sharpness thereof. Further, direct surface contact or engagement between the cutting edge 24 and the interior surfaces of the stabilizing slot 80 along the entire length of the predetermined cutting blade 22'" as it enters into and passes from the stabilizing slot 80.

Figure 24:
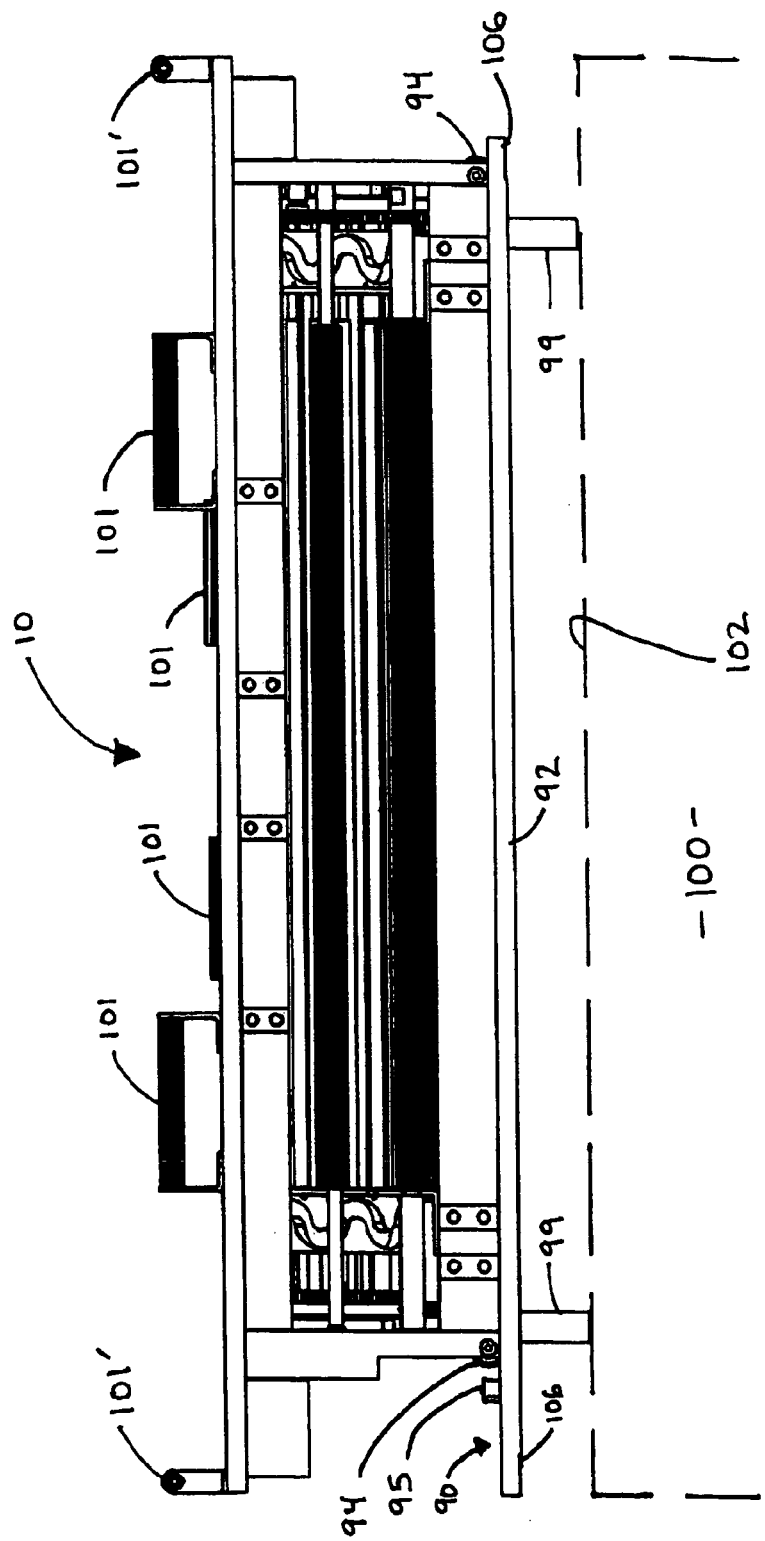
FIG. 24 is a side view of the embodiment of FIG. 23 wherein the modular cutting unit of the cutting assembly of the present invention is supported on the delivery assembly, which is disposed on an upper portion of the processing line of FIG. 22 adjacent the intended operative position in which the modular cutting unit will be installed.

The meat cutting assembly 10 of the present invention demonstrates a numerous structural and operational features including the ability to efficiently and effectively be installed as a modular cutting unit into an appropriate, operative location 88 within and along the processing line 100, as schematically represented in FIG. 22. As such, the processing line 10 includes at least one cavity or chamber 88 which at least partially defines the operative position of the modular cutting unit 10 along the processing line 100. As set forth above, modular cutting unit 10, as well as other components or assemblies associated with the processing line 100 define the path of travel 16 along which the meat or food products being cut or otherwise processed travels, such as by an appropriate conveyor or like transporting structure. Accordingly, in order to facilitate placement of the modular cutting unit 10, as represented in FIGS. 20, 21, 23 and 24, into the appropriate operative position or cavity/chamber 88, a delivery assembly generally indicated as 90 is utilized. The delivery assembly 90 comprises a substantially elongated support platform 92 dimensioned and configured to have the modular cutting unit 10 supported thereon. As such, the overall dimension and configuration of the support platform 92 may at least partially correspond to at least the under portion of the modular cutting unit 10, as represented in FIGS. 23 and 24. In order to facilitate ease and efficiency of placement of the modular cutting unit 10 onto the outer or upper exposed surface 93 of the support platform 92, the modular cutting unit 10 includes a plurality of wheels, rollers or like structures 94 best represented in FIG. 21. The wheels, rollers, etc. 94 are positioned so as to movably engage the outer exposed surface 93 of the support platform 92. In addition, stop members or bumpers 95 are disposed on the exposed surface 93 and extend upwardly or outwardly there from so as to engage appropriate portions, as at 95', on the outer surface of the ends of the housing or frame 12 of the modular cutting unit 10. The inclusion of the stop members 95 thereby prevents inadvertent displacement or falling of the end of the frame 12 from the corresponding end of the support platform 92 as the modular cutting unit 10 is rolled onto the support platform 92 in the direction indicated by arrow 97.

Additional structural features associated with the delivery assembly 90 and in particular the support platform 92 includes a plurality of spacers or legs 99 extending outwardly or downwardly from the under surface of the support platform 92 as represented in FIGS. 23, 24 and 24A. The purpose of the spacer legs 99 will be made apparent hereinafter with regard to the efficient positioning of the modular cutting unit 10 into its operative position represented by the chamber or cavity 88 along the processing line 100. Further facilitating the handling, carrying and/or selective positioning of the modular cutting unit 10 is the provision of a handle assembly including a plurality of handles, as at 101. It will be noted that the plurality of handles 101 are disposed in spaced relation to one another and vary in orientation. More specifically at one or more of the handles 101 extend longitudinally along the length of the modular cutting assembly 10 wherein others of the plurality of handles, as at 101', are located transverse to such length. The different orientations of the various handles 101 thereby allows for efficient carrying and/or positioning of the modular cutting assembly 10 by one or more individuals.

As represented in FIG. 23A, another embodiment of the delivery system is generally indicated as 90' and comprises a support platform 92' including a plurality of spacers or legs 99 extending outwardly or downwardly from the undersurface of the support platform 92'. However, one structural modification at least partially defining the embodiment of the support platform 92' is the provision of a stopper channel or groove 97 formed in the supporting surface 93 and disposed generally closer to but in spaced relation from one end 92" of the support platform 92'. Stopper groove or channel 97 is disposed, dimensioned and configured to receive the wheels or rollers 94 of the housing or frame 12 of the modular cutting unit 10. As such, the stopper groove or channel 97 will restrict movement of the housing or frame 12 in either direction once it is mounted on the supporting surface 93 in a location such that the wheels or rollers 94 are disposed within the stopper groove or channel 97. This will prevent or significantly restrict unintentional movement of the housing or frame 12 along the length of the support surface 93 in either direction. As a result, the stopper or bumper members 95 are absent from the embodiment of the support platform 92' and are operationally and structurally replaced by the stopper groove or channel 97. It is emphasized that the delivery system 90' comprising the support platform 92' can be substituted for the delivery system 90 and specifically the support platform 92, as represented in FIG. 23.

Accordingly with primary reference to FIGS. 22, 24 and 24A, placement of the modular cutting assembly 10 in its operative position and within a chamber or cavity 88 of the processing line 100 involves a first placement of the support platform 92 in the delivering position generally indicated as 102 and represented in phantom lines in FIG. 22. Secure and stable placement of the support platform 92 on the upper portion of the processing line 100 may be facilitated by recessed portions 106, when the upper area of the processing line 100 is not structured to support the spacer legs 99. When the support platform 92 is disposed in the delivering position 102, the modular cutting unit 10 is carried and lifted by an adequate number of individuals, such as at least two individuals, using the handle structures 101. By way of example, the individuals may carry the modular cutting unit 10 to the processing line 100 by approaching it from a single side, such as at 103. The modular cutting unit 10 is then lifted onto the support platform 92 such that one end thereof 104, as represented in FIG. 23, is placed on the exposed, supporting surface 93. When so positioned the modular cutting assembly 10 is then rolled along the length of the support platform 92 in accord with directional arrows 105.

With reference to FIG. 24, once the modular cutting assembly 10 is disposed along the full length of the support platform 92 and further when the support platform 92 is disposed in the delivering position 102 on the upper surface of the processing line 100, the modular cutting assembly 10 then lifted upwardly from the support platform 92 by personnel or individuals located on opposite sides of the processing line 100 as at 103 and 103'. The provision of transverse handles 101' facilitates handling of the modular cutting unit 10 from such opposite sides 103 and 103'. The modular cutting unit 10 is then lowered into the operative position defined by the cavity or chamber 88. With reference to FIG. 22, the operative placement of the modular cutting unit 10 is indicated in phantom lines as 10'.

Subsequent to the placement of the modular cutting 10, 10' in the operative position defined by the cavity 88, it may be necessary to place an additional cutting assembly or other processing component in the adjoining chamber or cavity as at 88'. Accordingly, as represented in FIG. 24A, the support platform 92 is moved from the delivering position 102, as represented in FIGS. 22 and 24 and placed on top of the modular cutting assembly 10' already located within its intended operative position within the cavity 88. When the mounting the platform 92 is disposed on top of the operatively placed modular cutting assembly 10', the spacer legs 99 will be disposed within recessed areas 107 formed on the upper or outer surface of the frame or housing 12 of the modular cutting assembly 10, 10' as clearly represented in FIGS. 20, 23 and schematically represented in FIG. 24A, to provide stability. The second or auxiliary processing component 10", represented in FIG. 24A, is then rolled on to the support platform 92 which rests on the operatively disposed modular cutting unit 10'. Thereafter the second modular unit 10" is lifted, using the transversely oriented handle structures 101', and lowered into the adjacent cavity or chamber 88' associated with the processing line 100. When the processing line 100 is ready for operation the support platform 92 is then removed from the processing line 100.

As set forth above, an operative advantage of the meat cutting assembly 10 of the present invention is the performance of a clean cut on the meat product passing along the path of travel 16. Further, such a clean and efficient cut is accomplished through the performance of the referred to multipoint cutting procedure. In turn, the multipoint cutting procedure is more efficiently accomplished by a combined motion of the cutting roller 20 and plurality of cutting blades 22 associated therewith. Such a combined motion comprises a concurrent rotation and reciprocal movement of the cutting roller 20 and cutting blades 22, as generally set forth above.

Figure 25:
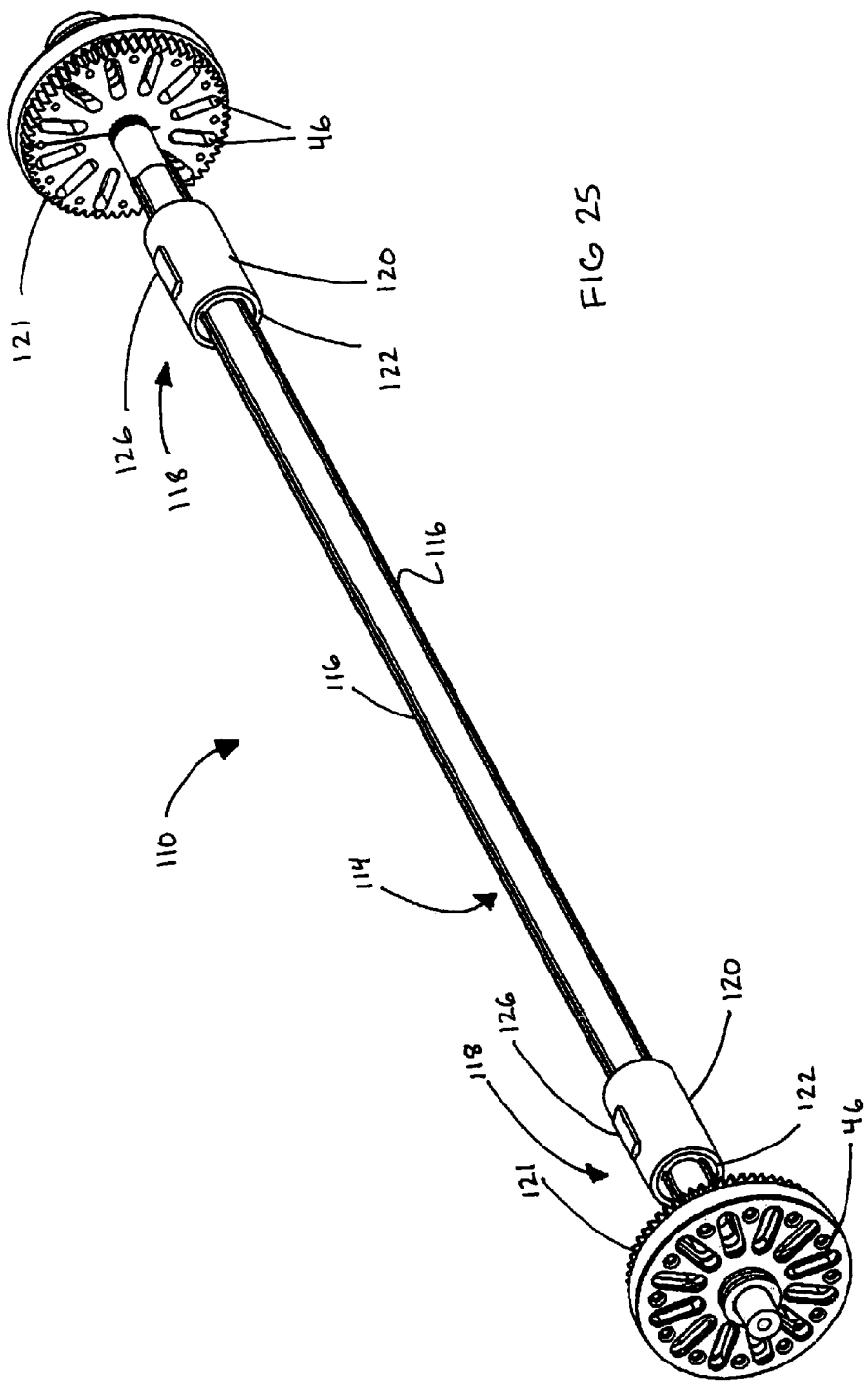
FIG. 25 is a perspective view of a drive shaft comprising a component of a first drive assembly of the preferred embodiment of the cutting assembly as represented in FIGS. 1-24.
Figure 26:
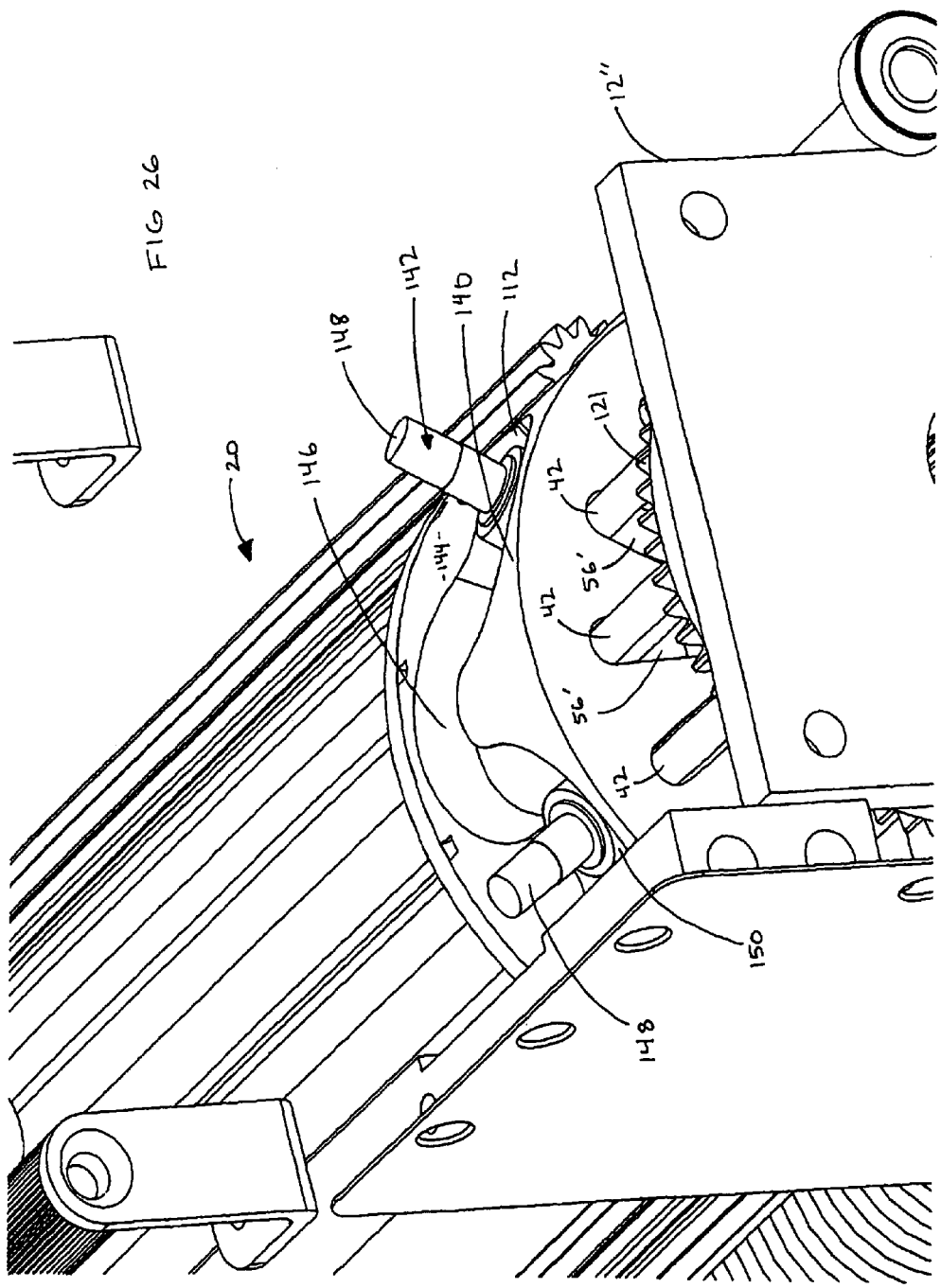
FIG. 26 is a perspective view in partial cutaway of at least a portion of a secondary drive assembly associated with the preferred embodiments of FIGS. 1-24 of the meat cutting assembly of the present invention.

Therefore, the combined, concurrent rotational and reciprocal motion of the cutting roller 20 is at least partially accomplished through the provision a primary drive assembly generally indicated as 110 in FIG. 25 and a secondary drive assembly generally indicated as 112 in FIG. 26. More specifically, the primary drive assembly comprises a drive shaft 114 having an elongated configuration and diametrically dimensioned to pass within the interior of the core or base 23 of the cutting roller 20 as represented in detail in FIG. 34. In addition, the exterior surface of the drive shaft 114 includes at least one but more practically a plurality of key structures 116 which are disposed, dimensioned and structured to fit within and drivingly engage an attachment assembly generally indicated as 118. The attachment assembly 118 includes at least one but more practically a plurality of attachment members 120. The attachment members 120 include an interior bushing or like structure 122 fixedly secured to the outer shell of the one or more attachment members 120. Each of the bushings 122 includes a plurality of receiving, channels or slots 124 disposed, dimensioned and configured to receive correspondingly disposed ones of the keys 116. As an alternative embodiment, the bushing 122 and the outer shell of the attachment members 120 may be a single, integral, one-piece construction or may be otherwise fixedly secured to one another. However, due to the interconnection of the plurality of keys 116, formed on the outer surface of the drive shaft 114, with the receiving grooves 124 formed on the interior surface or interior structural portion of the attachment members 120, the drive shaft 114 will be connected in rotationally driving engagement with the one or more attachment members 120. Moreover, due to the interconnection and interaction of the keys 116 and receiving spots 124, each of the one or more drive members 120 will also be able to move linearly along at least a portion of the length of the drive shaft 114. As will be explained in greater detail hereinafter, the ability of the attachment members 120 to rotate with the drive shaft 114 and concurrently reciprocally move along at least a portion of the length of the drive shaft 114 will facilitate the aforementioned concurrent and combined rotation and linear reciprocal movement of the cutting roller 20 and the cutting blades 22 associated therewith. Other features of the primary drive assembly 110 includes at least one but more practically a plurality of drive gears or like mechanical linkage 121 disposed and structured for interconnection, through other gear arrangements not shown for purposes of clarity, which serve to interconnect the drive gears 121 to an appropriate power take off. The power take off may be associated with the processing line 100 and/or may be considered a part of the modular cutting assembly 10.

Figure 28:
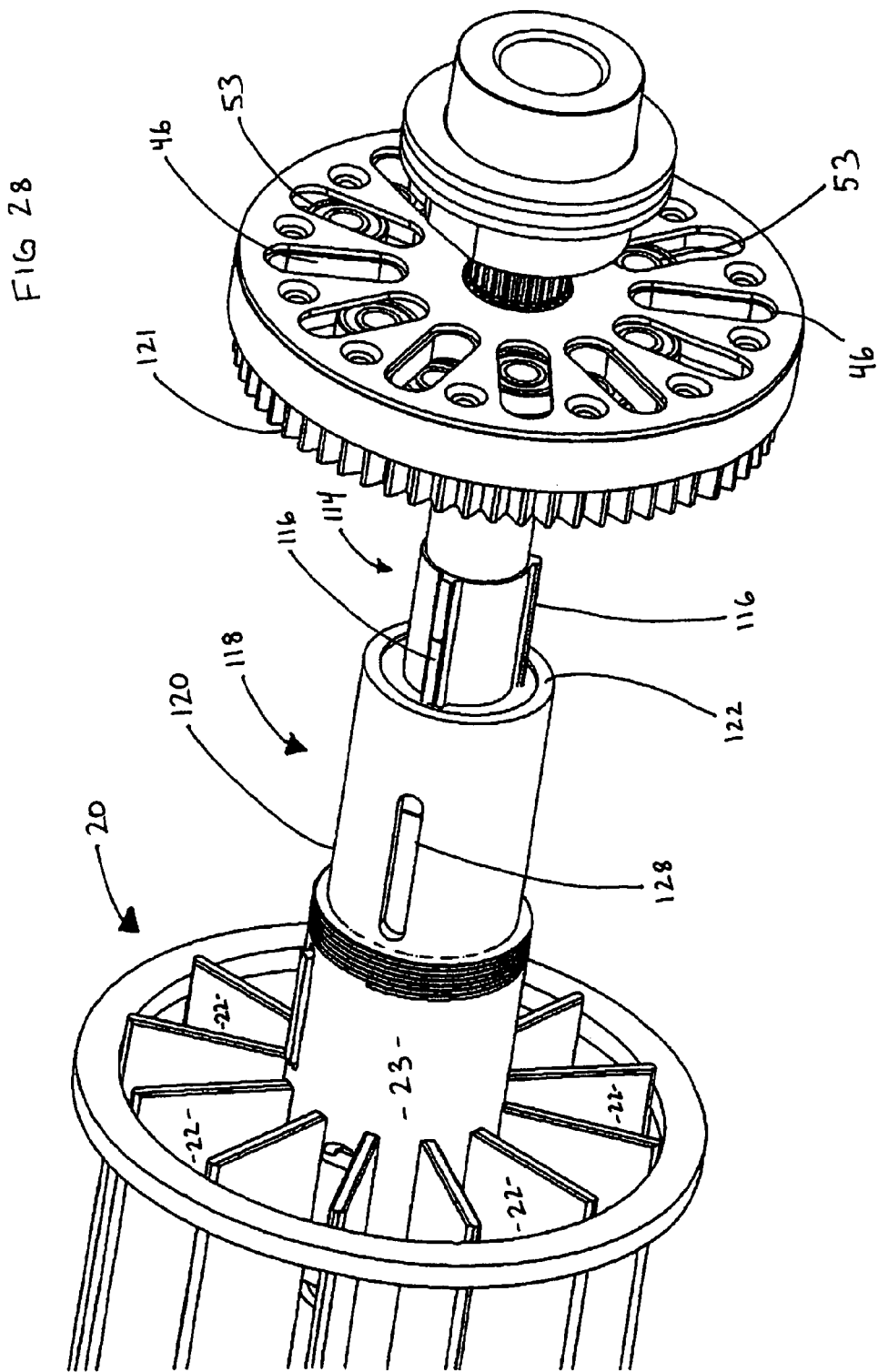
FIG. 28 is a perspective view in partial cutaway representing a partially assembled view of a drive shaft with a portion of the blade assembly of the preferred embodiment of the present invention.
Figure 29:
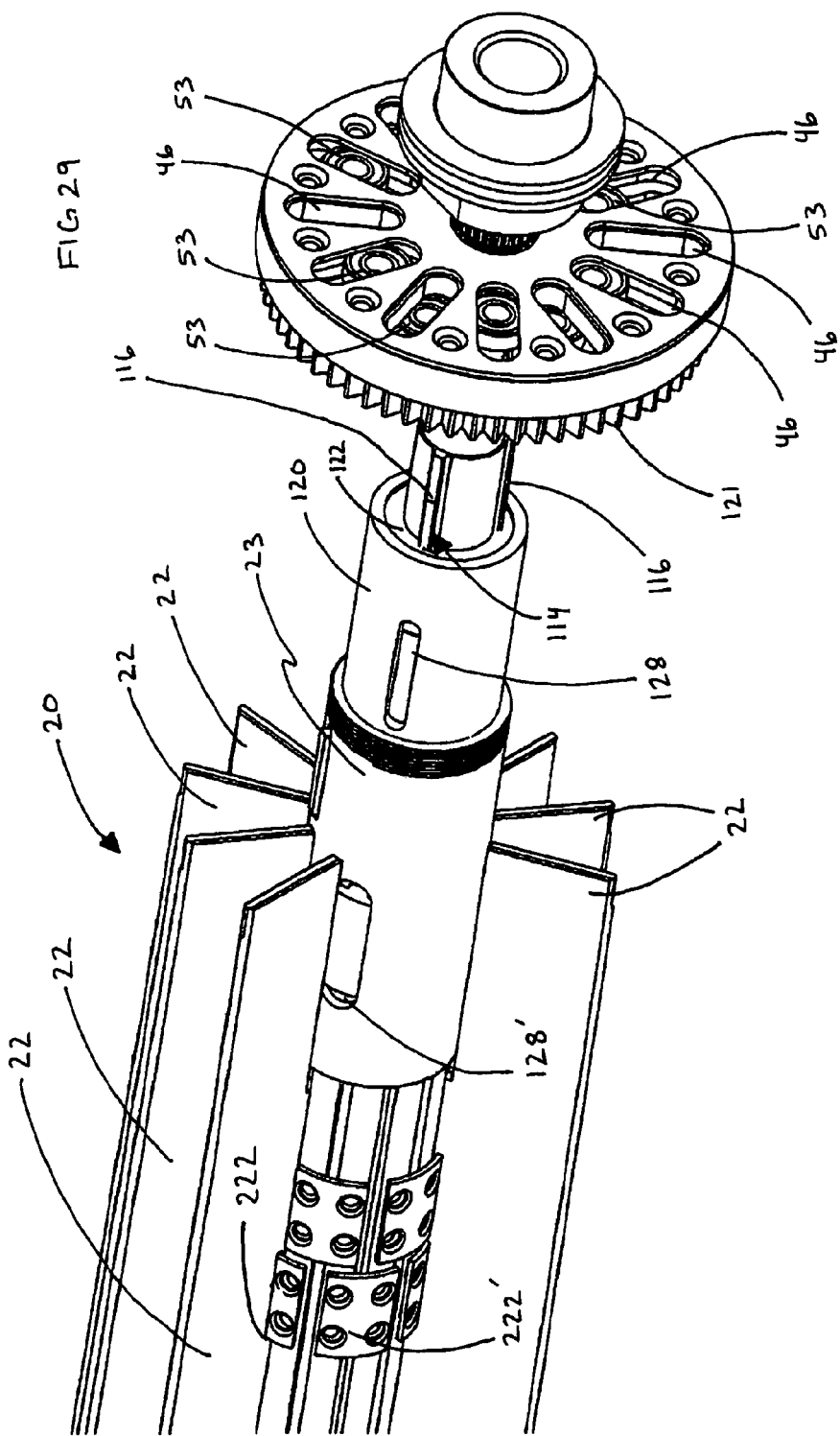
FIG. 29 is a perspective view in partial cutaway showing additional details of the at least partially unassembled view of the embodiment of FIG. 28.
Figure 34:
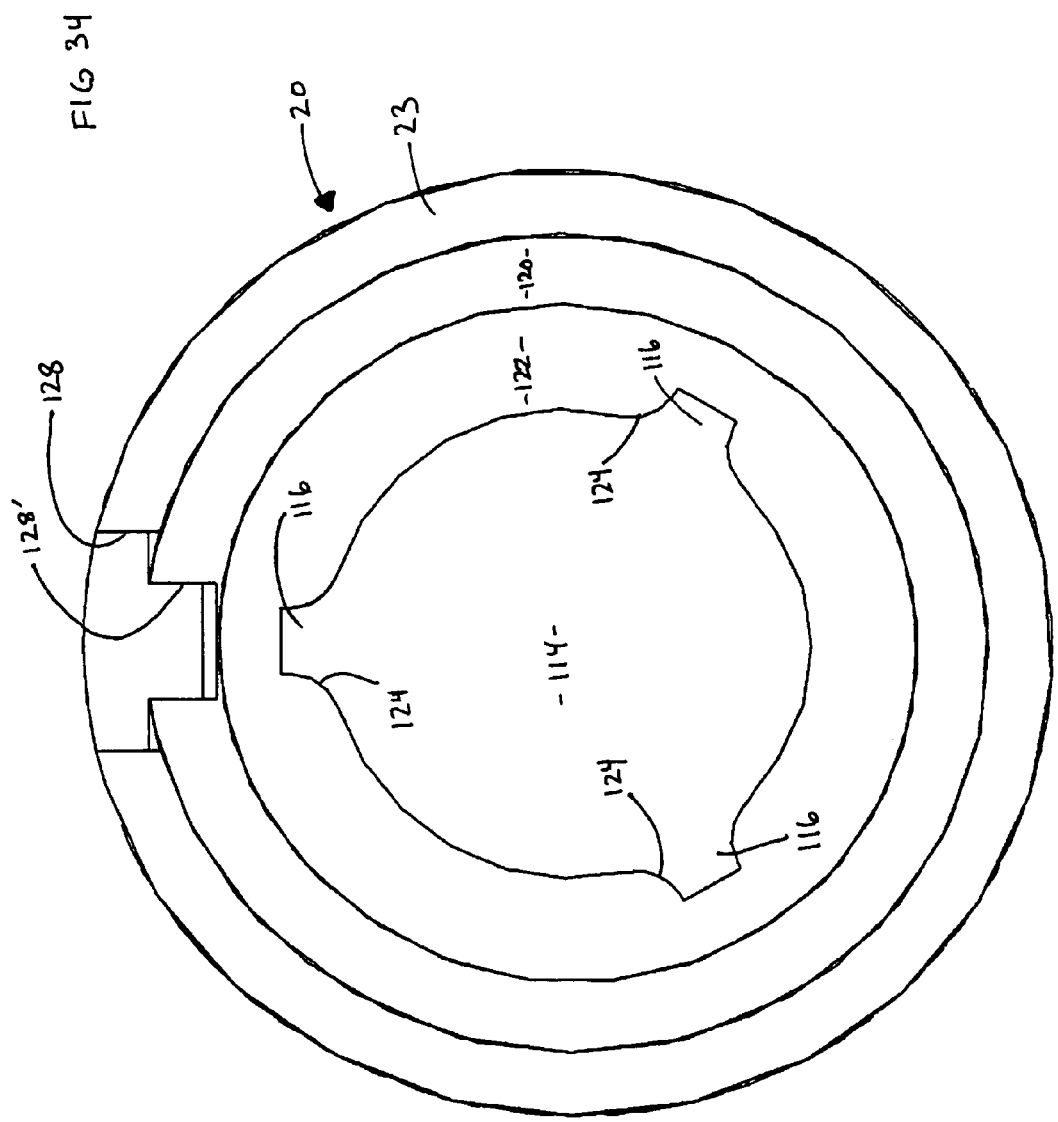
FIG. 34 is a sectional view of the interconnection between the attachment assembly and the drive shaft as represented in FIG. 25.

With additional reference to FIGS. 28 and 29, the drive shaft 114 and the attachment assembly 118 including at least one of a possible plurality of attachment members 120 are represented in an at least partially operative attachment to the cutting roller 20. More specifically, the attachment assembly 118 including the one or more attachment members 120 are operatively disposed at least partially on the interior of the core 23 of the cutting roller 20 and thereby serve to drivingly interconnect the drive shaft 114 to the cutting roller 20. As represented in FIGS. 25, 28, 29 and 34, interconnection between the one or more attachment members 120 and the core 23 of the cutting roller 20 is accomplished through the provision of locking or connecting key members 126. Moreover, once the one or more attachment members 120 are disposed concentrically within the interior of the core 23 of the cutting roller 20, receiving apertures or openings 128 formed in the attachment members 120 and corresponding receiving apertures 128' formed on the core 23 are disposed in aligned relation with one another. When so aligned, the locking key(s) 126 is passed through the receiving apertures 128 and 128' as represented in FIG. 34. Accordingly, the fixed insertion of the locking keys 126 in the aligned opening or apertures 128 and 128' will serve to interconnect each of the one or more attachment members 120 with the core 23 of the cutting roller 20. As such the attachment members 120 will rotate with both the drive shaft 114 and the cutting roller 20. This same connection between the attachment members 120 and the core 23 will also facilitate a concurrent movement of both the attachment members 120 and the cutting roller 20 along at least a portion of the length of the drive shaft 114 simultaneous to the rotation of the drive shaft 114, attachment members 120 and cutting roller 20.

Therefore, the aforementioned primary drive assembly 110 including the drive shaft 114 and attachment assembly 118 serves to rotationally drive the cutting roller 20 concurrently to the aforementioned linearly reciprocal motion of the cutting roller 20 due to the provision of the secondary drive assembly 112 as primarily represented in FIGS. 26, 27, 30-33 and 35. More specifically, the secondary drive assembly 112 includes at least one movable portion generally indicated as 140 and at least one fixed portion generally indicated as 142. The movable portion 140 preferably comprises a drive track assembly including at least one but more practically a plurality of drive track structures 144 fixedly connected to the cutting roller 20 and movable therewith. As represented throughout the indicated Figures, the one or more drive track structure 144 formed of a disk like members which include a drive channel 146 extending continuously about the periphery thereof and at least partially recessed into the interior of the drive track structure 144. As explained in greater detail hereinafter, the configuration of the continuous drive channels 146 is determinative of the aforementioned linear reciprocal movement of the cutting roller 20 and the cutting blades 22 concurrent to the rotation thereof. More specifically, each of the one or more drive channels 146, having the aforementioned continuous sinusoidal configuration, is driven by the fixed portion 142.

More specifically, the fixed portion 142 includes at least one but more practically a plurality of drive members 148 each including a roller or bearing assembly 150 disposed within the drive channels 146 in movable engagement with the interior surfaces thereof. Therefore, as should be apparent the plurality of drive members 148 are at least partially disposed within the interior of the drive channel 146 and, due to their fixed disposition on the frame or housing 12 they will pass along the continuous length of the channel 146 upon rotation of the cutting roller 20. The roller or bearing assemblies 150 will reduce any friction between the exterior surface of the rollers or bearings 150 and the interior surface of the drive channel 146. Accordingly, upon continuous rotation of the cutting roller 20 the plurality of fixed members 148 will serve to reciprocally drive the cutting roller 20, concurrent to its rotation and along a linear path which is transverse to the path of travel 16.

Figure 35:
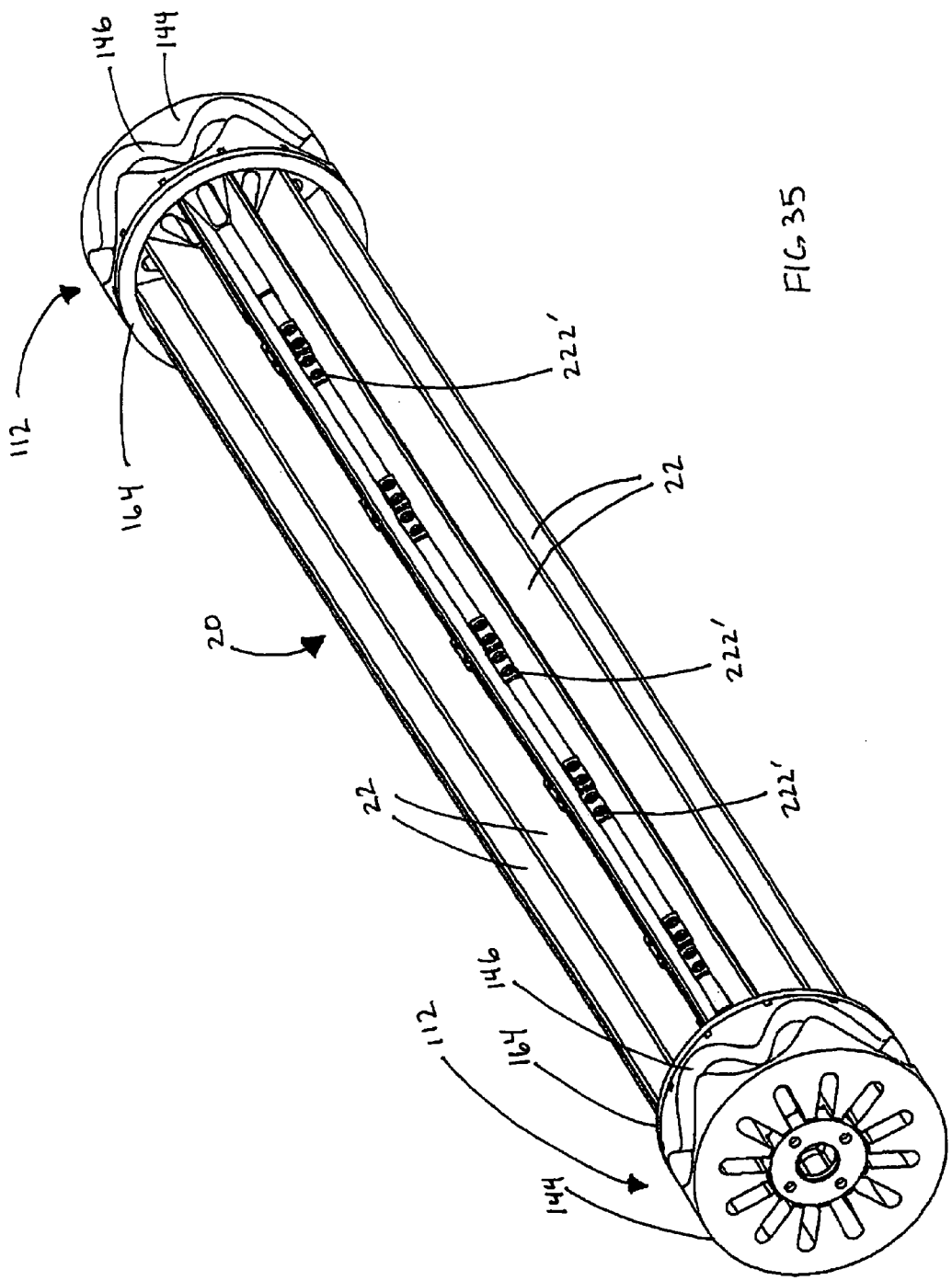
FIG. 35 is a perspective view of the assembled first and second drive assemblies with the blade assembly and/or cutting roller associated therewith.

As represented in FIG. 35, one preferred embodiment of the present invention includes the secondary drive assembly 112 having a plurality of drive track structures 144 fixedly attached to the cutting roller 20 at opposite ends thereof. Therefore, the fixed portion 112 may be accurately defined as including a first plurality of fixed members 148 disposed in driving engagement with one of the drive track structures 144 and a second plurality of drive members 148 disposed in driving engagement with the opposite drive track structure 144 located at the other end of the drive roller 20. It should be apparent that cooperative disposition of the first and second plurality of fixed members 148 relative to the oppositely disposed drive structures 144 are such as to cooperatively drive the cutting roller 120 so as to accomplish the linear, reciprocal motion of the cutting roller 20 concurrent to its rotation. Similarly, the continuous sinusoidal configurations of the drive channels 146 will be cooperatively oriented to be driven by the first and second plurality of drive members 148 in the manner to efficiently accomplish this linear, reciprocal motion of the cutting roller 20 concurrent to its rotation. In addition, as represented in FIG. 27, the plurality of fixed members 148 are fixedly secured to interior or other appropriate portions of the housing or frame 12 by mounting blocks or like mounting members 149.

Figure 27:
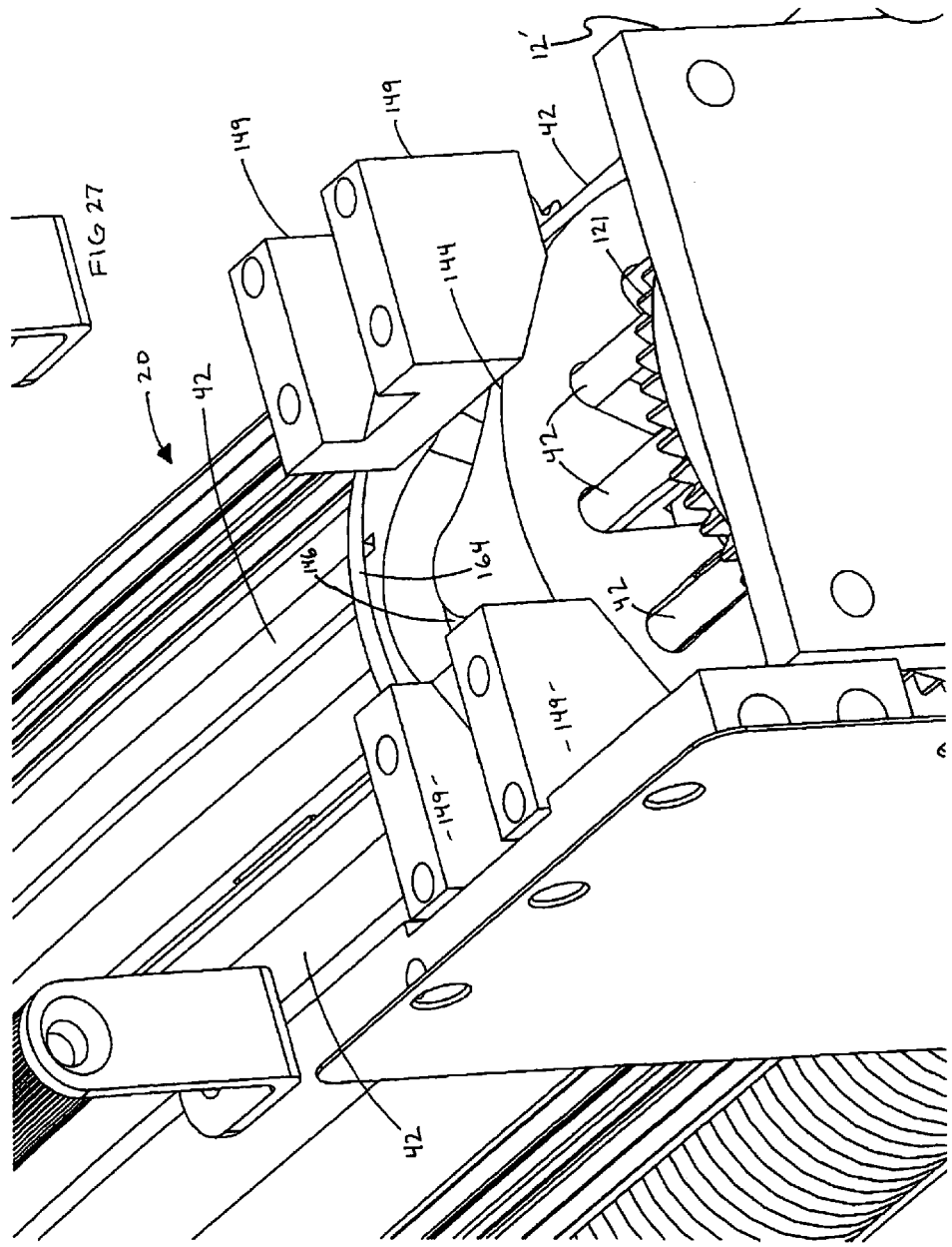
FIG. 27 is a perspective view in partial cutaway representing details of the embodiment of FIG. 26.
Figure 30:
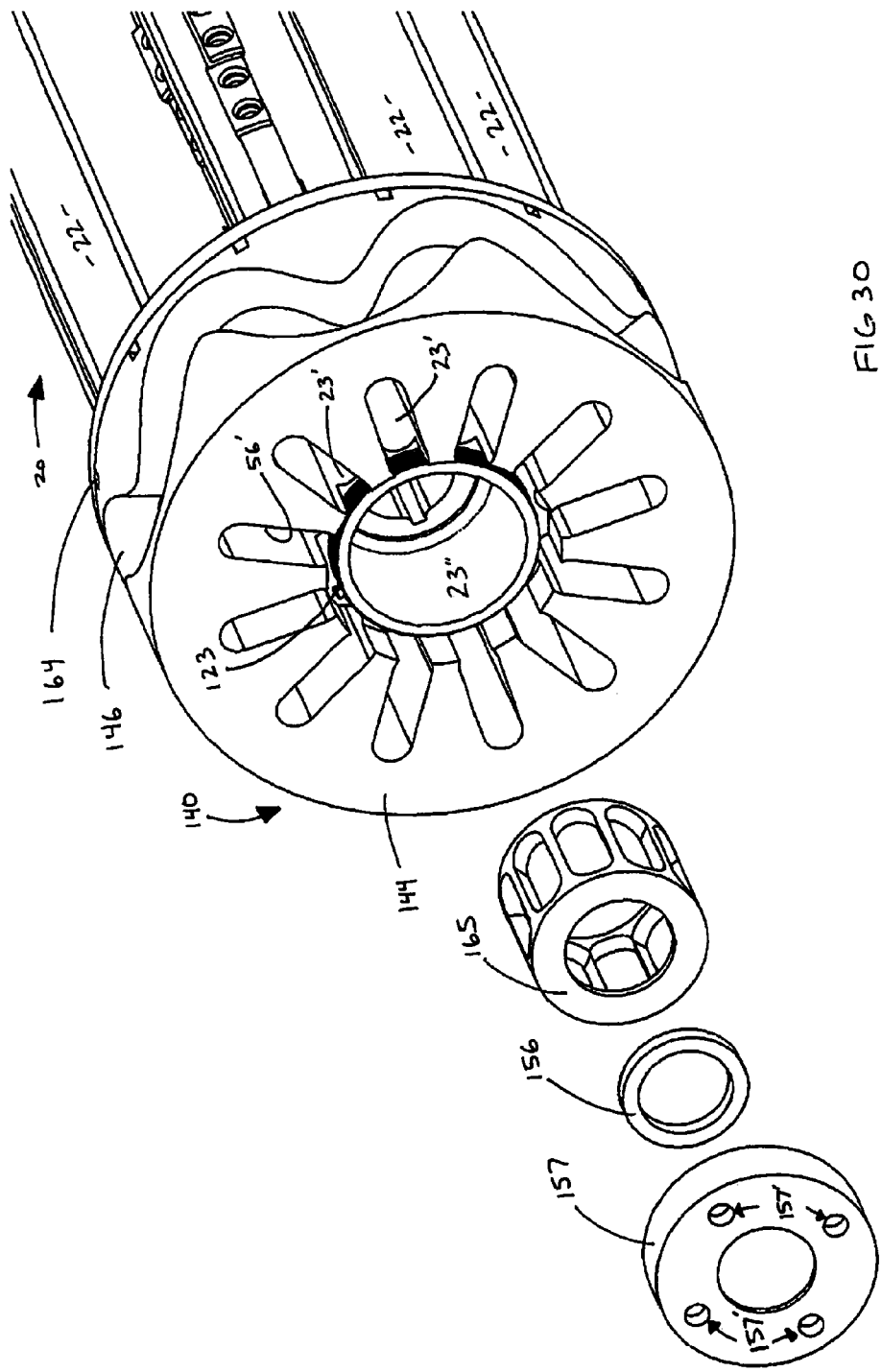
FIG. 30 is a perspective view in partial cutaway and exploded form representing an attachment of at least a portion of the secondary drive assembly to the blade assembly and/or cutting roller associated therewith.

As also represented in FIG. 27, the one or more drive track structures 144 are mounted at the opposite ends of the cutting roller 20 and inwardly of the position of the drive gears 21 associated with the drive shaft 114. Accordingly, as best represented in FIG. 30 attachment of each drive track structure 144 to the corresponding end of the cutting roller 20 is accomplished by the inclusion of a central opening or aperture in the disk like drive track structures 144 which is dimensioned to receive an extremity of the end portion 23' of the core 23 of the cutting roller 20. Such attachment is stabilized through the provision of a cage like spacer member 155, bushing 156 and connecting closure or cap ring 157. Cap ring 157 is provided with a plurality of apertures 157' for receipt of appropriate connectors there through. More specifically, the cage like spacer 155 passes into the interior of the extremity 23', as at 23" and a bushing 156 serves to facilitate a firm interconnection and covering relation of the cap ring 157 over and in enclosing relation to the cage like spacer 155. Further, a plurality of elongated slots or channels as at 56' are provided in each of the drive track structures 144 for the passage of the plurality of ejector members 42 there through.

Figure 31:
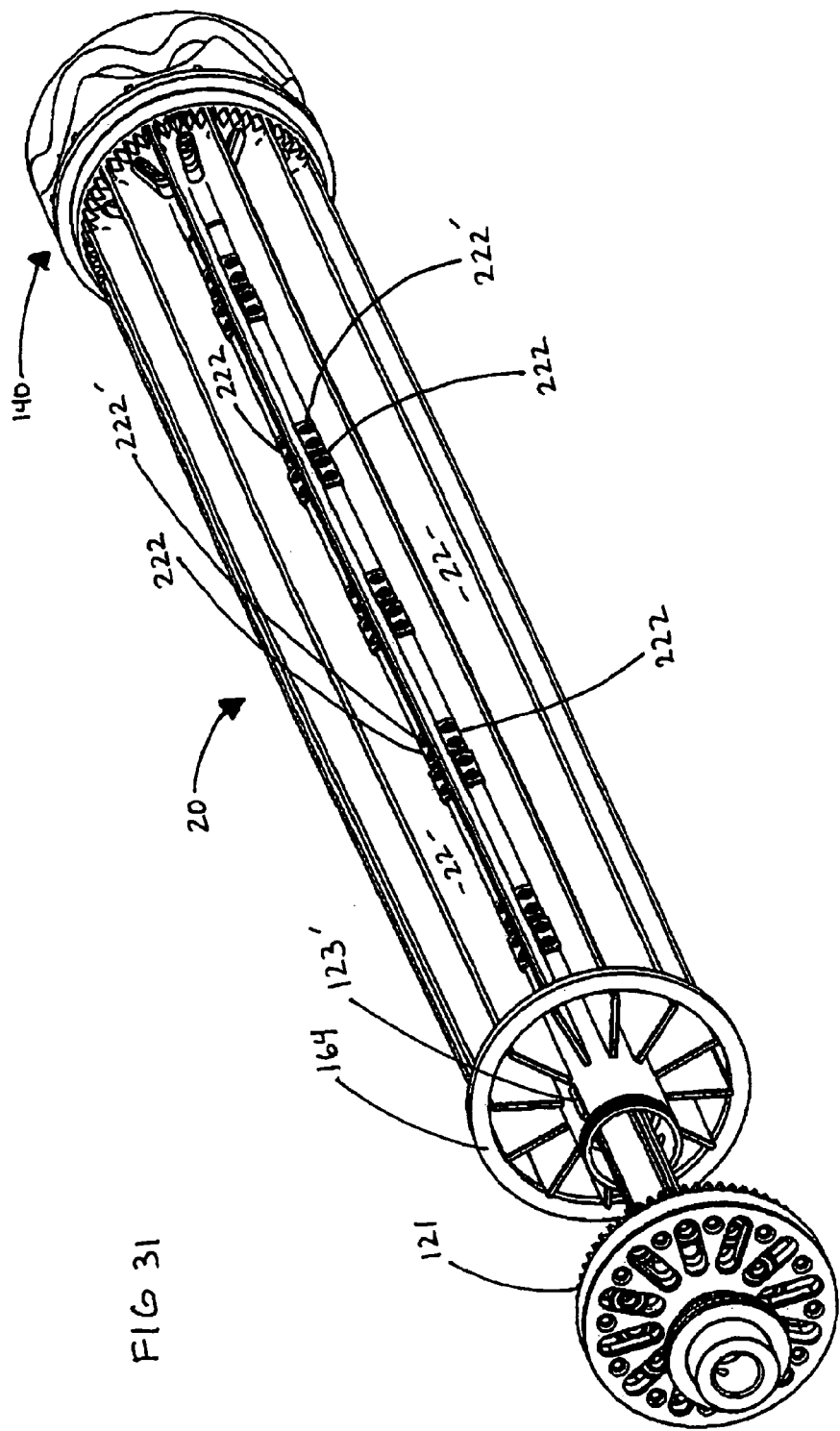
FIG. 31 is a perspective view in partial cutaway of further detail showing interconnection of the drive shaft of the embodiment of FIG. 25 to a blade assembly including a cutting roller associated therewith.
Figure 32:
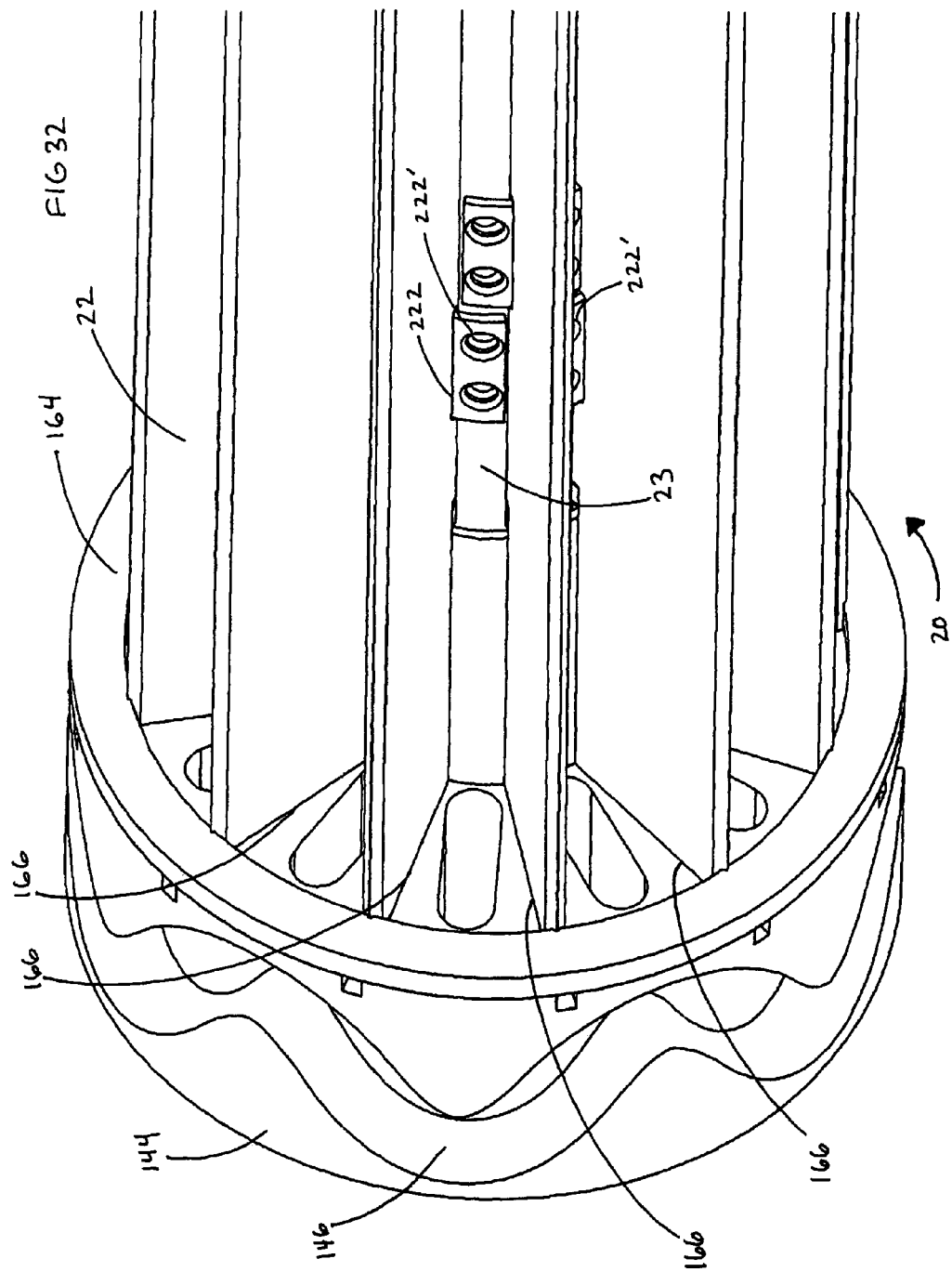
FIG. 32 is a perspective end view in partial cutaway showing interconnection between a plurality of blades of the blade assembly and the cutting roller with at least a portion of the secondary drive assembly.

With further reference to FIGS. 30 and 31, proper alignment between the drive track assembly 140 and the cutting blade 20 on which it is mounted is accomplished by an alignment assembly. More specifically, a keyway or key slot 123 is formed on an interior surface or other appropriate portions of the drive track structure 144. This keyway 123 is disposed, dimensioned and configured to receive a key member 123' formed on and extending at least minimally outward from the outer surface of the extremity 23' of the cord 23 as represented in FIG. 31. Placement of the key 123' within the keyway 123 serves to properly align and/or orient the drive track structure 144 relative to the cutting blades 22 and the remainder of the cutting roller 20.

Further alignment structures associated with the cutting roller 20 includes each of the cutting blades 22 having spaced apart, recessed grooves or slots as at 222 formed along the length or inner edge of each of the blades 22, as clearly represented in FIG. 31. Each of the slots 222 are disposed, dimensioned and configured to receive an outwardly projecting member 222' integrally or otherwise fixedly secured to the outer surface of the core 23. Accordingly, the positioning of each of the outwardly projecting members 222' into a correspondingly disposed receiving slot or recess 222 serves to accurately and securely align each of the cutting blades 22 relative to one another and to their intended location and orientation on the core 23 of the cutting roller 20 in the manner clearly represented in FIG. 31.

Another structural modification which facilitates a smooth and quite running operation of the various components of the cutting assembly of the present invention is also provided, as represented in FIG. 36. More specifically, one or more of the rollers, such as the cutting roller 20, may include the provision of a damper assembly 250 formed on one or both ends of the core 23, as at 23'. Each damper assembly is formed of an at least partially resilient and/or flexible force absorbing material. The damping assembly 250 may be formed of a single piece of material or a multi-layered piece of material, as at 252, laminated or otherwise integrally or fixedly disposed into the orientation represented in FIG. 36. Accordingly, the combined rotational and linear reciprocal motion of the cutting roller 20 and possibly the mate roller 28 may result in an undesirable sound such as a "rattling" noise. As such, the damper assembly 250 is disposed to engage other fixed portions of the cutting assembly 10 and in doing so will eliminate or significantly reduce or restrict any undesirable noise or sounds caused by the continuous and combined concurrent rotation and linear reciprocal motion of the cutting roller 20 itself or relative to other cooperative components such as, but not limited to, the mate roller 28. Therefore, a damping assembly 250 as generally represented in FIG. 36 may be mounted on one or both ends of the cutting roller 20 as well as other rollers including, but not limited to the mate roller 28.

Figure 33:
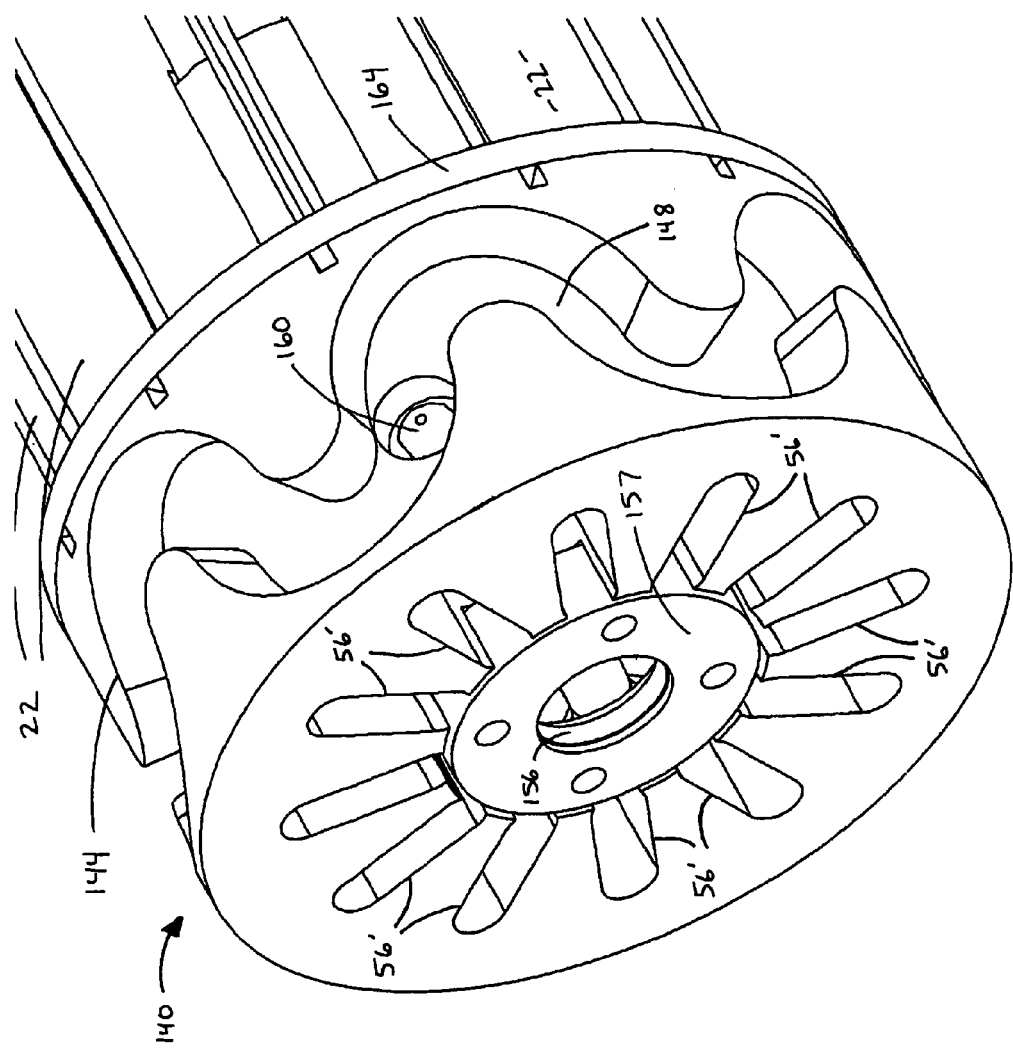
FIG. 33 is a top perspective view in partial cutaway showing lubricating structure associated with at least a portion of the secondary drive assembly.

As represented in FIG. 26, the guide track 50 associated with the ejecting assembly is mounted on the interior of the frame or housing portion 12', such that the plurality of rollers or bearing members 53 will ride in the fixed guide track 50, as described above. As represented in FIG. 33, a lubricating port or like facility 160 may be disposed on the interior of the drive groove 146 in a readily accessible location to facilitate lubrication of the cooperative moving parts associated with the cutting roller 20 and the primary and secondary drive assemblies 110 and 112 as described above.

Additional structural features associated with the drive track structures 144 of the drive track assembly 140 is the inclusion of mounting plates 164 with each of the drive track structure 144. More specifically, the mounting or connecting plates 164 are fixedly connected to each of the oppositely disposed drive track structures 144 so as to rotate therewith. In addition the plurality of mounting plates 164 include radial connecting recesses 166 for the receipt of correspondingly disposed ends of each of the cutting blades 22 of the cutting roller 20.

Accordingly, the cooperative structuring of the primary and secondary drive assemblies 110 and 112 accomplishes an efficient combined cutting motion of the cutting roller 20 defined by a rotation of the cutting roller 20 relative to the path of travel 16 concurrently to a linearly reciprocal motion of the cutting roller 20 in a direction which is transverse to the path of travel 16. As such both a piercing or penetrating cut as well as a "slicing" cut will be concurrently established during the aforementioned multipoint cutting procedure.

Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

Now that the invention has been described,

What is claimed is:

1. An assembly for cutting meat passing along a path of travel, said assembly comprising:
   a blade assembly comprising a rotatable cutting roller extending transversely across the path of travel;
   a plurality of elongated cutting blades mounted on and rotatable with said cutting roller, each of said cutting blades having an outer elongated cutting edge,
   each of said plurality of blades and corresponding ones of said cutting edges extending along at least a majority of the length of said cutting roller in spaced relation to one another,
   an in-feed assembly comprising at least one rotatable in-feed roller disposed in receiving relation to correspondingly positioned meat; said in-feed roller and said plurality of cutting blades concurrently engaging the meat and being relatively positioned to establish a concurrent driving engagement with the meat,
   a mating assembly comprising a rotatable elongated mate roller extending transversely across the path of travel in engaging relation to the meat, a plurality of elongated mate slots each formed in an outer surface of said mate roller and extending along at least a majority of the length of said mate roller, said plurality of mate slots and said plurality of cutting blades concurrently rotatable in interactive relation to one another, said interactive relation comprising each of said cutting edges disposed within a correspondingly positioned one of said mate slots and through correspondingly disposed meat passing between said mate roller and said cutting roller, and each of said mate slots cooperatively configured and dimensioned with each of said cutting edges to define a multi-point cutting procedure of the meat by correspondingly disposed cutting edges and mate slots, when disposed in said interactive relation with one another.

2. An assembly as recited in claim 1 wherein said at least one in-feed roller includes an outer surface configuration comprising a plurality of grooves extending along a length of said one in-feed roller in transverse relation thereto and in engaging relation with the meat, said plurality of grooves disposed and structured to restrict lateral displacement of the meat along the length of said one in-feed roller concurrent to engagement of the meat by the blade assembly and the plurality of grooves.

3. An assembly as recited in claim 1 wherein said concurrent rotation of said plurality of mate slots and said plurality of cutting blades comprises said plurality of cutting edges successively disposed in penetrating engagement through the meat and in received relation within successive, correspondingly positioned ones of said mate slots.

4. An assembly as recited in claim 1 wherein said plurality of cutting blades are movable in a linearly reciprocal manner along a length of said cutting roller concurrent to penetration of the meat and concurrent to rotation of said cutting blades with said cutting roller.

5. An assembly as recited in claim 1 wherein said multi-point cutting procedure comprises a first snip cut defined by concurrent cutting orientations of corresponding trailing portions of interactive, correspondingly positioned ones of said plurality of cutting edges and said plurality of elongated mate slots.

6. An assembly as recited in claim 5 wherein said multi-point cutting procedure further comprises an insertion cut defined by a substantially centered concurrent cutting orientation of said cutting edge and said mate slot of interactive, correspondingly disposed ones of said plurality of cutting edges and said plurality of mate slots.

7. An assembly as recited in claim 6 wherein each of said plurality of mate slots comprises a base portion, said multi-point cutting procedure further comprising said base portion of each of said plurality of mate slots being disposed in spaced non-engaging relation to a corresponding, interactive one of said cutting edges disposed therein.

8. An assembly as recited in claim 6 wherein said multi-point cutting procedure further comprises a second snip cut defined by concurrent cutting orientations of leading portions of interactive, corresponding ones of said plurality of cutting edges and said plurality of elongated mate slots.

9. An assembly as recited in claim 8 wherein interactive ones of said cutting edges and said elongated mate slots are cooperatively disposed and relatively movable to perform said first snip cut, said insertion cut and said second snip cut in successive fashion.

10. An assembly as recited in claim 9 wherein said multi-point cutting procedure further comprises correspondingly disposed ones of said cutting edges disposed in penetrating relation to the meat concurrent to engagement of the meat with said one in-feed roller.

11. An assembly for cutting meat passing along a path of travel, said assembly comprising:

a blade assembly comprising a rotatable cutting roller extending transversely across the path of travel;

a plurality of elongated cutting blades mounted on and rotatable with said cutting roller, each of said cutting blades having an outer elongated cutting edge, each of said plurality of blades and corresponding ones of said cutting edges extending along at least a majority of the length of said cutting roller in spaced relation to one another, an in-feed assembly comprising at least one rotatable elongated in-feed roller disposed in engaging relation to the meat; said in-feed roller and said plurality of cutting blades concurrently engaging the meat and being relatively positioned to establish a concurrent driving engagement with the meat, a mating assembly comprising a rotatable elongated mate roller extending transversely across the path of travel in engaging relation to the meat, a plurality of elongated mate slots each formed in an outer surface of said mate roller and extending along at least a majority of the length of said mate roller, said plurality of mate slots and said plurality of cutting blades concurrently rotatable in interactive relation to one another and to correspondingly positioned meat, said interactive relation comprising each of said cutting edges disposed within a correspondingly positioned one of said mate slots and through correspondingly disposed meat passing between said mate roller and said cutting roller, each of said mate slots being cooperatively configured and dimensioned with each of said cutting edges to define a multi-point cutting procedure by each of said cutting edges disposed within correspondingly disposed ones of said mate slots, when said mate slots and said cutting edges are disposed in said interactive relation with one another, and said cutting edges of corresponding ones of said cutting blades and said mate slots being concurrently rotated and relatively disposed to further define said multi-point cutting procedure of the meat as comprising a first snip cut, an insertion cut, and a second snip cut in successive fashion.

12. An assembly as recited in claim 11 wherein each of said plurality of cutting blades include a length substantially corresponding to the length of each of said plurality of elongated mate slots.

13. An assembly as recited in claim 11 wherein said multi-point cutting procedure comprises said first snip cut defined by concurrent cutting orientations of corresponding trailing portions of interactive, correspondingly positioned ones of said cutting edges of said plurality of cutting blades and said plurality of elongated mate slots.

14. An assembly as recited in claim 13 wherein said multi-point cutting procedure further comprises said insertion cut defined by substantially centered concurrent cutting orientations of said cutting edge of interactive, correspondingly positioned ones of said plurality of cutting blades and interior surfaces of interactive, correspondingly disposed ones of said plurality of mate slots.

15. An assembly as recited in claim 14 wherein said multipoint cutting procedure further comprises said second snip cut defined by concurrent cutting orientations of correspondingly positioned interactive ones of said cutting edges and said plurality of elongated mate slots.

16. An assembly as recited in claim 15 wherein interactive ones of said cutting edges and said elongated mate slots are cooperatively disposed and concurrently rotatable with said cutting roller and said mating roller respectively to perform said first snip cut, said insertion cut and said second snip cut in successive fashion.

17. An assembly as recited in claim 11 wherein each of said plurality of cutting blades extend radially outward in spaced relation to one another and in transverse relation to the path of travel; each of said cutting edges of said plurality of cutting blades successively disposed into and out of a cutting orientation relative to the meat upon rotation of the cutting roller.

18. An assembly as recited in claim 11 wherein said in-feed roller includes an outer surface disposed in engaging relation with the meat, said outer surface of said in-feed roller comprising a plurality of grooves collectively extending transversely to and along the length of said one in-feed roller, said plurality of grooves structured to restrict lateral displacement of the meat relative to and along the length of said in-feed roller, concurrent to penetrating engagement of the meat by said cutting blades.

19. An assembly as recited in claim 11 wherein each of said cutting roller and said mate roller have an elongated configuration of sufficient length to extend transversely across at least a majority of a width of the path of travel.

20. An assembly as recited in claim 19 wherein each of said plurality of cutting blades and said plurality of mate slots have an elongated configuration of sufficient length to extend transversely across at least a majority of a width of the path of travel.

* * * * *